US010540139B1

(12) United States Patent
Janes

(10) Patent No.: US 10,540,139 B1
(45) Date of Patent: Jan. 21, 2020

(54) DISTANCE-APPLIED LEVEL AND EFFECTS EMULATION FOR IMPROVED LIP SYNCHRONIZED PERFORMANCE

(71) Applicant: Clayton Janes, Studio City, CA (US)

(72) Inventor: Clayton Janes, Studio City, CA (US)

( * ) Notice: Subject to any disclaimer, the term of this patent is extended or adjusted under 35 U.S.C. 154(b) by 0 days.

(21) Appl. No.: 16/377,182

(22) Filed: Apr. 6, 2019

(51) Int. Cl.
*G06F 3/16* (2006.01)
*H04R 3/00* (2006.01)
*G10K 15/02* (2006.01)
*H04R 29/00* (2006.01)

(52) U.S. Cl.
CPC ............. *G06F 3/165* (2013.01); *G10K 15/02* (2013.01); *H04R 3/00* (2013.01); *H04R 29/004* (2013.01)

(58) Field of Classification Search
CPC .. H04N 21/4307; H04N 5/04; H04N 21/4392; G06F 3/017; G06F 16/5854; G06F 3/165; G10K 15/02; H04R 5/02; H04R 29/004; H04R 3/00
See application file for complete search history.

(56) References Cited

U.S. PATENT DOCUMENTS

| 4,961,177 A * | 10/1990 | Uehara ............... G07C 9/00158 340/5.52 |
|---|---|---|
| 6,154,665 A | 11/2000 | Briffett et al. |
| 6,853,850 B2 * | 2/2005 | Shim ..................... H04M 1/605 379/432 |
| 7,697,702 B2 | 4/2010 | Akino |
| 9,024,168 B2 | 5/2015 | Peterson |
| 9,424,859 B2 | 8/2016 | Campbell et al. |
| 10,034,111 B1 | 7/2018 | Barbier et al. |
| 10,140,966 B1 | 11/2018 | Edwards |
| 10,148,241 B1 | 12/2018 | Peeler et al. |
| 10,199,022 B1 | 2/2019 | Greenlee |
| 2005/0232447 A1 | 10/2005 | Shinozuka et al. |

(Continued)

FOREIGN PATENT DOCUMENTS

| CA | 2792074 C | 9/2017 |
|---|---|---|
| JP | 02230896 A | 9/1990 |

(Continued)

OTHER PUBLICATIONS

East search.*

(Continued)

*Primary Examiner* — Akelaw Teshale
(74) *Attorney, Agent, or Firm* — Stone Creek Services LLC; Alan M Flum

(57) ABSTRACT

A system and method for creating more realistic lip syncing to pre-recorded vocal tracks during live performance, music videos, film, television, and the like. During a lip synchronized performance, the system and method simulates signal level, proximity effect, and other parameters normally associated with a live performance. A proximity sensor attached in a fixed relationship with a microphone dynamically detects the distance between a microphone and the vocalist. A control data stream that includes dynamic distance information sensed by the proximity sensor is used to increase the signal level of the pre-recorded vocal track as the sensed distance between the microphone and vocalist decreases and decrease the signal level of the vocal track as the distance between the microphone and vocal track increases.

21 Claims, 39 Drawing Sheets

(56) References Cited

U.S. PATENT DOCUMENTS

| | | | | |
|---|---|---|---|---|
| 2006/0165240 A1* | 7/2006 | Bloom | | G10H 1/366 |
| | | | | 381/56 |
| 2011/0019863 A1* | 1/2011 | Kearns | | G10H 1/361 |
| | | | | 381/394 |
| 2012/0236160 A1* | 9/2012 | Rezek | | H04N 5/222 |
| | | | | 348/207.11 |
| 2014/0112483 A1* | 4/2014 | Etter | | H03G 3/3005 |
| | | | | 381/56 |
| 2014/0142928 A1* | 5/2014 | Campbell | | G10H 1/0091 |
| | | | | 704/201 |
| 2018/0310108 A1 | 10/2018 | Sharbaugh et al. | | |

FOREIGN PATENT DOCUMENTS

| | | | | | |
|---|---|---|---|---|---|
| JP | 2007114239 A | | 5/2007 | | |
| JP | 4826509 B2 | | 9/2008 | | |
| JP | 4487909 B2 | | 6/2010 | | |
| KR | 20090008032 A | * | 1/2009 | | H03G 7/007 |
| KR | 101323386 B1 | * | 10/2013 | | |
| KR | 20170106165 A | | 12/2017 | | |

OTHER PUBLICATIONS

Optogate PB-05, Axel Joost Elektronik, Rhade, Germany, downloaded from the Internet from http://www.optogate.com/pb05_uk.html on Feb. 10, 2019.

Optogate PB-06, Axel Joost Elektronik, Rhade, Germany, downloaded from the Internet from http://www.optogate.com/pb06_uk.html on Feb. 10, 2019.

Optogate PB-07, Axel Joost Elektronik, Rhade, Germany, downloaded from the Internet from http://www.optogate.com/pb07_uk.html on Feb. 10, 2019.

Posi-Gate PB-08, Axel Joost Elektronik, Rhade, Germany, downloaded from the Internet from http://www.optogate.com/posi_gate_uk.html on Feb. 10, 2019.

Optogate PB-09, Axel Joost Elektronik, Rhade, Germany, downloaded from the Internet from http://www.optogate.com/pb09_uk.html on Feb. 10, 2019.

STEVAL-BCN002V1B BlueNRG-Tile-Bluetooth LE enabled sensor node development kit Data brief, DB3697—Rev 4, Nov. 2018, STMicroelectronics, Geneva, Switzerland.

Lip Sync, Wikipedia, Wikimedia Foundation, San Francisco, California, downloaded from the Internet from: https://en.wikipedia.org/wiki/Lip_sync on Feb. 15, 2019 (redownloaded on Apr. 6, 2019).

CYW43903: WINCED IEEE 802.11 B/G/N SoC with an Embedded Applications Processor, Apr. 2017, Cypress Semiconductor Corporation, San Jose, California.

VL53L0X Datasheet, DocID029104 Rev 2, Apr. 2018, STMicroelectronics, Geneva, Switzerland.

AirFX Reference Manual, Nov. 2000, InMusic Brands, Inc. Cumberland, Rhode Island.

Sangwon Suh, Jeong-Seob Lee, and Woon Seung Yeo, A Gesture Detection with Guitar Pickup and Earphone, Proceedings of the International Conference on New Interfaces for Musical Expression 2014, pp. 90-93, Jun. 2014, Goldsmith University, London, England, downloadable on the Internet from: http://www.nime.org/2014/technical-programme/proceedings/.

* cited by examiner

DISTANCE-APPLIED LEVEL AND EFFECTS EMULATION FOR IMPROVED LIP SYNCHRONIZED PERFORMANCE

BACKGROUND

The present disclosure relates to audio signal processing including lip synchronization of vocal performance in pre-recorded music.

Lip synchronization, also known as lip synching, or lip sync, is the practice of a performer simulating a vocal performance of pre-recorded audio. Lip syncing is commonly used in film, television, music videos, as well as live concert performance. Lip synching is a form of performance and musical pantomime. One of the goals of lip synching is to create the illusion that the performer is actually singing.

Modern live performance attempts to create a consistent, pleasing, and entertaining audio and visual experience for the audience. With this in mind, musical performers use lip synching during live performance to help produce a high-quality performance for the audience. During a lip-synced performance, the performer may either mimic singing or actually sing, but the vocal performance transmitted to the audience is pre-recorded. The pre-recorded acoustic instrument or vocal tracks are known as backing tracks or pre-recorded backing tracks. Pre-recorded backing tracks can be used to either replace or supplement portions of a live performance. Some performances may use a combination of lip sync and live performance. For example, much of the song or performance may be live, but more vocally challenging portions of the performance may be lip synched to a pre-recorded backing track. In this example, the live sound engineer would mix in the live vocals during most of the song and fade out the pre-recorded vocal backing track. During the more vocally challenging parts of the performance, the sound engineer will mix in the pre-recorded vocal backing track while fading out the live vocal performance.

SUMMARY

The inventor runs a performance technology company that produces and arranges backing tracks for well-known musical acts. The inventor observed that during lip synchronized performances, the desired level of realism was not being accomplished because the sound level of the pre-recorded backing track did not correspond to the position of the microphone with respect to the performer. For example, a performer may grab the microphone stand and rock it back and forth or move it with the beat of the music. Alternatively, the performer may step back from or toward a stand-mounted microphone. He or she may also move a handheld microphone toward or away from their mouth. Under those circumstances, the sound level of the singer's voice would not match the sound level of the pre-recorded vocal backing track.

The inventor discovered that he could add realism to a lip synced performance by automatically adjusting the sound level of the pre-recorded vocal backing track, in real-time, inversely with the distance of the vocalist from the microphone. He accomplished this by using a proximity sensor to dynamically measure the distance between the vocalist and the microphone in real-time. Using data from the proximity sensor, the sound level of the pre-recorded vocal backing track dynamically decreases as the microphone moves away from the vocalist. The sound level of the pre-recorded vocal backing track dynamically increases as the microphone moves closer to the vocalist. In addition, the pre-recorded vocal backing track can be turned off when the proximity sensor detects that the vocalist is not present.

The proximity sensor is secured a fixed distance from a reference point on the microphone. For example, the proximity sensor can be secured to the microphone or the microphone clip a fixed distance from the end of the microphone grille. A control data stream that includes dynamic distance information sensed by the proximity sensor is used to increase the signal level of the pre-recorded vocal track as the distance between the microphone and vocalist decreases. Likewise, the dynamic distance information sensed by the proximity sensor is used to decrease the signal level of the vocal track as the distance between the microphone and vocal track increases. The control data stream can be a serial data stream or other standard computer protocol. The control data stream can be transmitted wired or wirelessly. For example, by Bluetooth, 802.11, Z-wave, BLE, ZigBee, or other wireless data communication capable of transmitting real-time data. Wired protocols could include USB, ThunderBolt, FireWire, Ethernet, or Musical Instrument Digital Interface (MIDI). The data stream could be transmitted over standard audio control protocols such as MIDI, or Open Sound Control (OSC). It could be transmitted using a proprietary protocol, or could be transmitted simply as a serial data stream.

The control data stream is transmitted to an audio processing device. The audio processing device may be within, for example, a dedicated box, a digital audio workstation or a digital audio mixing console. The digital audio workstation may be a dedicated device or implemented via software within a computer or mobile device. The proximity sensor may be integrated within a microphone wireless transmission system. The microphone wireless receiver can receive the dynamic position data and either process it internally or send the data out to a computer via standard computer interface such as USB, Wi-Fi, or Ethernet.

The inventor also noted that the lip-synchronized performance could be made more realistic by adjusting the frequency response of the vocal backing track to simulate proximity effect. Proximity effect is an exaggerated low frequency response, for example a booming sound, that occurs as the vocalist moves close to the microphone. Proximity effect occurs on microphones typically used for live performance known as cardioid or hyper-cardioid microphone. These microphones are popular for live performance because they tend to pick up sound mostly from in front of the microphone and reject unwanted sound from behind the microphone.

The inventor discovered that he could simulate distance-dependent proximity effect to add realism to a lip-synchronized performance by automatically adjusting the frequency response of the pre-recorded vocal backing track, in real-time, inversely with the distance of the vocalist from the microphone. The frequencies typically associated with proximity effect would dynamically adjust as the microphone moved closer or further away from the vocalist. In addition, the inventor envisions that distortion effects (i.e., distance-dependent microphone distortion), typical of overloading a microphone, could be simulated by dynamically using the proximity sensor. For example, when the vocalist is too close to the microphone and singing too loudly, the proximity sensor can generated dynamic distance data that can activate a feedback effects emulation module or a distortion effects emulation module to apply these effects to the pre-recorded vocal backing track. While proximity effect, distortion effects, and feedback effects are typically undesirable, a selected use of them can add realism to a lip-synced performance. The inventor believes that part of his contribution to the art is to simulate effects that are typically undesirable, but nonetheless present in a live performance, to create realism with a lip-synchronized performance.

The inventor envisions that the above described distance simulated sound level, proximity effect, distortion effect, and feedback effects (i.e., simulated microphone feedback) can also be applied to acoustic instruments that are "lip-synced" or mimed to a pre-recorded audio back track. For example, a saxophone or trumpet player may be lip syncing his or her performance. While performing they may be improvising movements and changing their distance in relationship to the microphone.

This Summary introduces a selection of concepts in simplified form that are described the Description. The Summary is not intended to identify essential features or limit the scope of the claimed subject matter.

DRAWINGS

DESCRIPTION

The terms "left," "right," "top, "bottom," "upper," "lower," "front," "back," and "side," are relative terms used throughout the Description to help the reader understand the figures. Unless otherwise indicated, these do not denote absolute direction or orientation and do not imply a particular preference. When describing the figures, the terms "top," "bottom," "front," "rear," and "side," are from the perspective of the audience located front and center of the performer. Specific dimensions are intended to help the reader understand the scale and advantage of the disclosed material. Dimensions given are typical and the claimed invention is not limited by the recited dimensions.

The following terms are used throughout this disclosure and are defined here for clarity and convenience.

Lip Syncing: As defined in this disclosure, lip syncing or lip synchronization means miming or mimicking to a pre-recorded performance using a microphone or a prop microphone that is visible to the audience. As defined in this disclosure, lip syncing or lip synchronization is not limited to miming or mimicking pre-recorded vocal performances, but may also include miming or mimicking pre-recorded acoustic instrument where the microphone or prop microphone associated with that acoustic musical instrument is visible to the audience.

Stage Microphone: Throughout this disclosure, stage microphone means refers to a microphone or a prop microphone that is identifiable to an audience member or observer as a microphone.

Prop Microphone: Throughout this disclosure a "prop microphone" or a "microphone prop" is a device that mimics the appearance of a microphone but is not capable of functioning as a microphone or is a functioning microphone with the sound producing capabilities disabled.

Non-transitory computer-readable medium: As used in this disclosure, the term "non-transitory", means that the medium is tangible and not a signal. The term "non-transitory computer readable medium" encompasses storage devices that do not necessarily store information permanently, for example, random access memory (RAM). Program instructions and data stored on a non-transitory computer-readable storage medium may be transmitted by transmission media or electrical signals. These signals may be conveyed by wires, signal traces, or wirelessly.

Performer: As defined in this disclosure, a performer refers to a vocalist or to an acoustic instrument in combination with the musician playing the acoustic instrument.

Throughout this disclosure the term "sound engineer" refers to a generic user of the systems and methods described within this disclosure.

Figure 1:
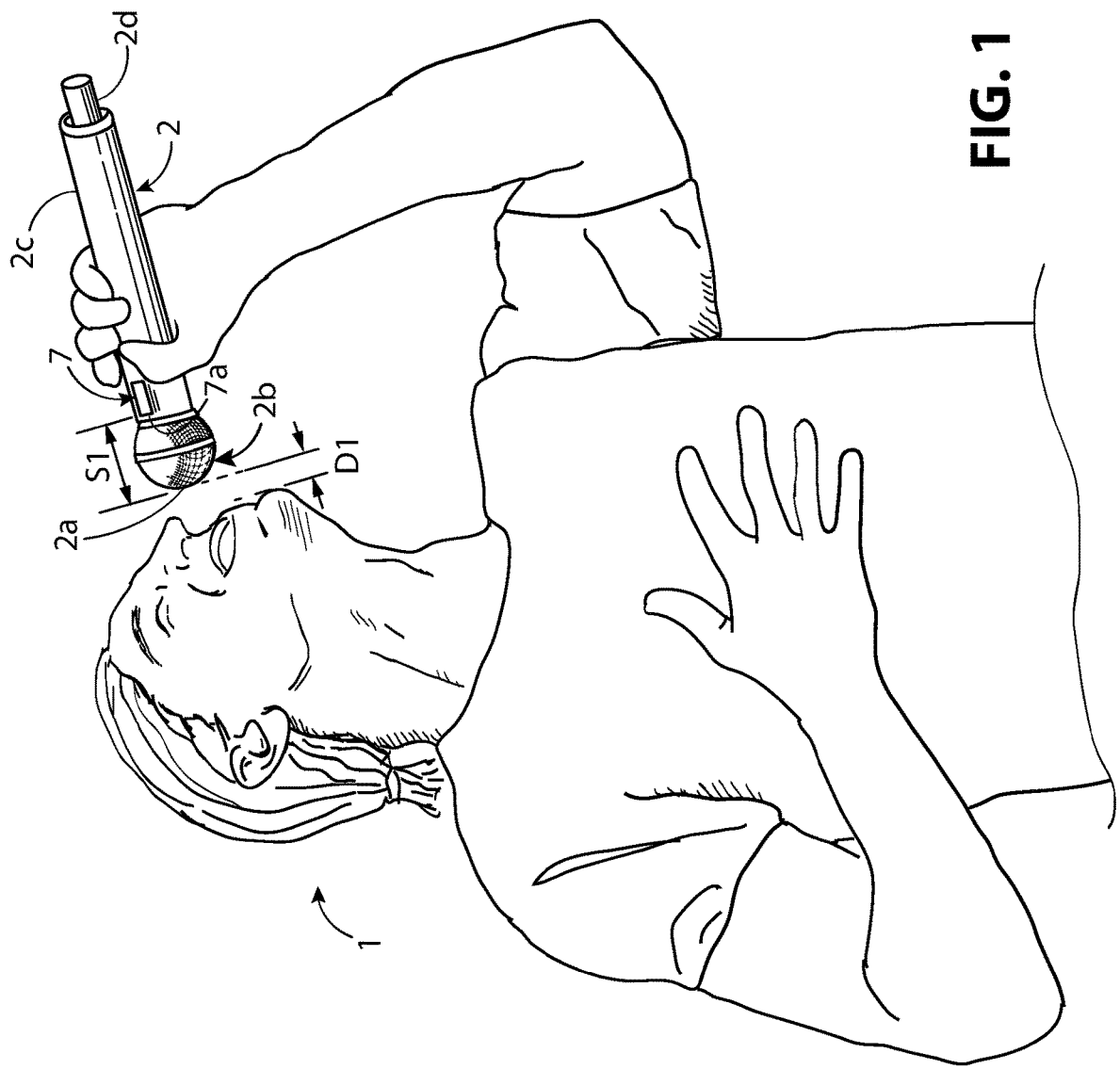
FIG. 1 illustrates a vocalist holding a handheld microphone with a proximity sensor mounted to the microphone where the microphone is a distance D1 from his mouth.
Figure 2:
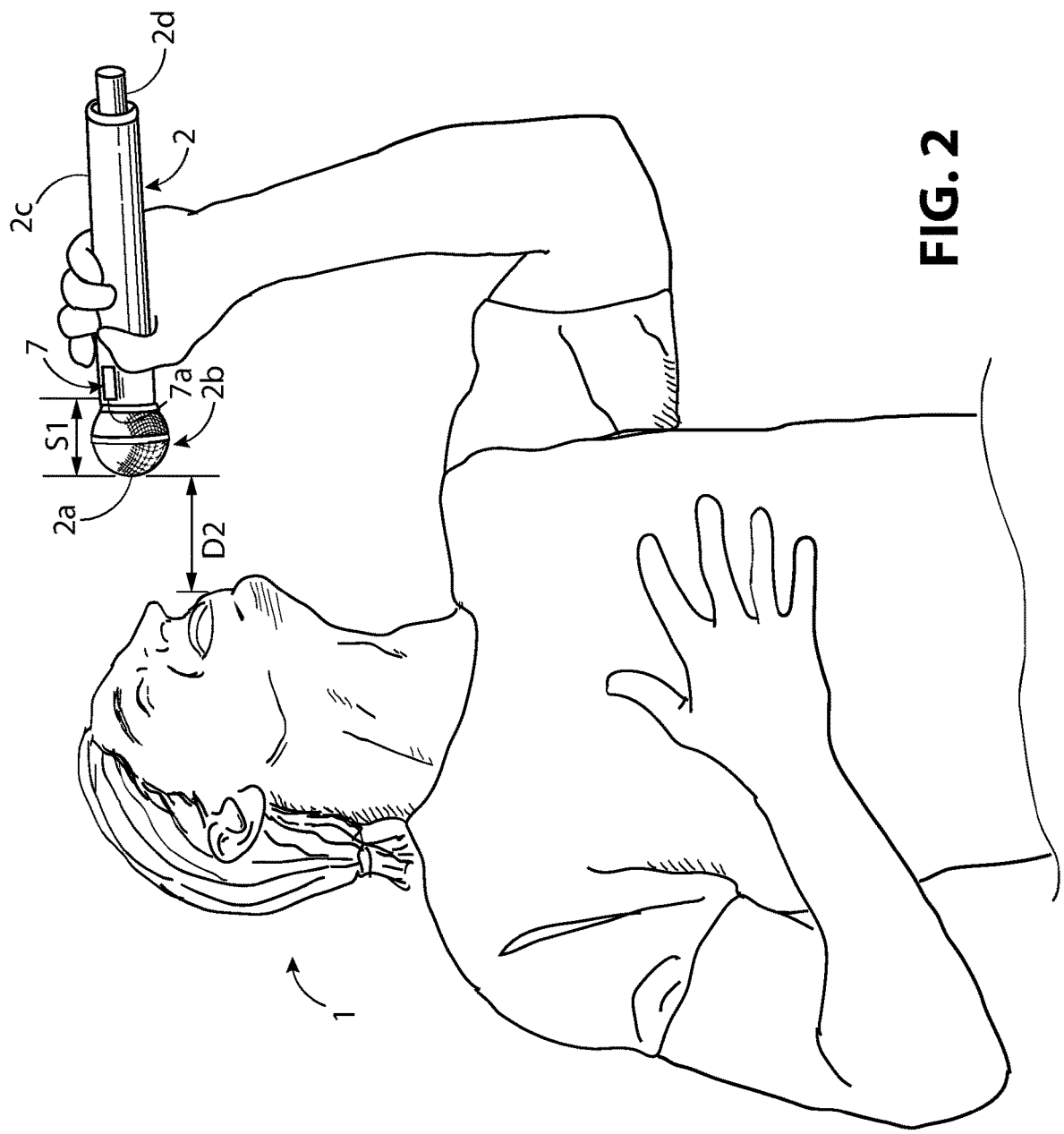
FIG. 2 illustrates the vocalist, microphone, and proximity sensor of FIG. 1 with the vocalist holding the microphone at a distance D2 from his mouth.
Figure 4:
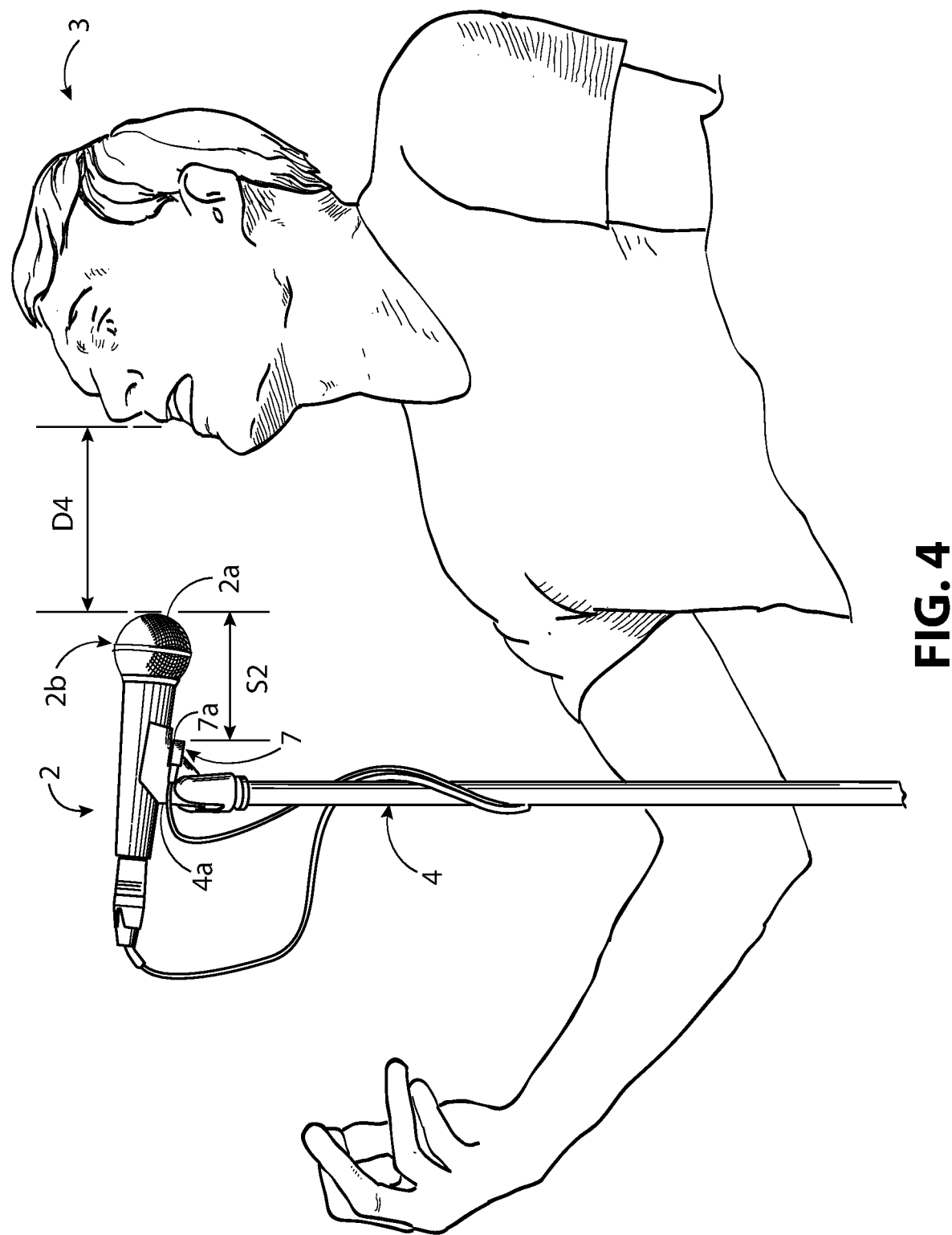
FIG. 4 illustrates the vocalist, microphone, proximity sensor, and microphone stand of FIG. 3 singing at a distance D4 away from the microphone.
Figure 5:
FIG. 5 illustrates a musician with the sound-producing end of his musical instrument a distance D5 from a microphone where the microphone and a proximity sensor are mounted to a microphone stand.
Figure 6:
FIG. 6 illustrates the musician, microphone, microphone stand, and proximity sensor of FIG. 5 with the sound-producing end of his musical instrument a distance D6 from the microphone.

As noted in the Background, modern live performance attempts to create a consistent, pleasing, and entertaining audio and visual experience for the audience. With this in mind, vocalists use lip synching during live performance to help produce a high-quality performance for the audience. During a lip-synced performance, the performer may either mimic singing or actually sing, but the vocal performance transmitted to the audience is pre-recorded. The pre-recorded music or vocal tracks are known as backing tracks, or pre-recording audio backing tracks, as they can be used to either replace or supplement portions of a live performance. As discussed in the Summary, the inventor runs a live performance technology company that produces and arranges backing tracks for well-known musical acts. The inventor observed that during lip synchronized performances, the desired level of realism was not being achieved because the sound level of the pre-recorded backing track did not correspond to the position of the microphone with respect to the performer. Referring to FIGS. 1 and 2, a vocalist 1 may move the stage microphone 2 toward their mouth as in FIG. 1, or away from their mouth as in FIG. 2. When the stage microphone 2 is mounted on a microphone stand 4, as in FIGS. 3 and 4, the vocalist 3 may step toward the stage microphone 2, as in FIG. 3, or step back from the stage microphone 2, as in FIG. 4. The vocalist movements described for FIGS. 1-4 may not match the pre-recorded vocal backing tracks being played to the audience. This may cause the audience to perceive that the performance is not live. The inventor made a similar observation for musicians playing acoustic instruments that are supported or replaced by a pre-recorded backing track of their instruments. Referring to FIG. 5, the musician 6 might hold the sound-producing end 5a of his acoustic instrument 5 close to the stage microphone 2 and microphone stand 4, shown here as distance D5. Referring to FIG. 6, the musician 6 may step back from the stage microphone 2 and microphone stand 4. If the musician's movements described for FIGS. 5 and 6 did not match the performance of the pre-recorded backing track, this could also cause the perception among the audience that the performance is not live.

Referring to FIGS. 1-6, the inventor discovered that he could compensate for the movement of vocalists 1, 3 with respect to the stage microphone 2, as exemplified in FIGS. 1-4, or the movement of the musicians 6 with respect to the stage microphone 2, as exemplified in FIGS. 5 and 6, by automatically adjusting the signal level of the pre-recorded backing track, in real-time, inversely with the distance of the vocalists 1, 3 or musician 6 from the microphone. The distance can be measured using a proximity sensor 7a. The signal level would dynamically decrease as the microphone is moved away from the vocalist or dynamically increase as the microphone moves closer to the vocalist. For example, in FIGS. 1 and 2, the signal level of the pre-recorded vocal backing track would dynamically decrease as the stage microphone 2 is moved from distance D1 in FIG. 1 to distance D2 in FIG. 2, from distance D3 in FIG. 3 to distance D4 in FIG. 4, and from distance D5 in FIG. 5 to distance D6 in FIG. 6. Distances D1, D2, D3, D4 being the distance from the end 2a of the microphone grille 2b to the mouth of the vocalist 1, 3. Distances D5, D6 being the distance between the end 2a of the microphone grille 2b to the sound-producing end 5a of the acoustic instrument 5. For example, in FIGS. 5 and 6, the sound-producing end 5a is the bell of the trumpet. In addition, the pre-recorded vocal backing track can be turned off when the proximity sensor 7a detects that the vocalist is not present.

The inventor discovered, through experimentation, that in order to realistically track the movement of the vocalist 1 (FIGS. 1, 2) and vocalist 3 (FIGS. 3 and 4) or a musician 6 (FIGS. 5 and 6), the proximity sensor must have sufficient sensitivity and speed. The inventor discovered that time-of-flight sensors are generally satisfactory for use as a proximity sensor 7a within the meaning of this disclosure. Time-of-flight sensors typically have sampling periods of 20 milliseconds or less. An example of a satisfactory time-of-flight sensor for use as a proximity sensor 7a is the VL53LOX by ST Microelectronics. The inventor found that ultrasonic sensors with sampling periods of 250 milliseconds or greater were not satisfactory. Time-of-flight sensors measure distance to an object based on the time it takes for light emitted by the sensor to be reflected back from the object. Time-of-flight sensors typically use one or more infrared lasers to measure time-of-flight.

Continuing to refer to FIGS. 1-6, the proximity sensor 7a is housed within a proximity sensor assembly 7. The proximity sensor assembly 7 is attached in a fixed relationship with the stage microphone 2. That is, it maintains a fixed distance from a reference point on the stage microphone 2 such as the end 2a of the microphone grille 2b. In FIGS. 1 and 2, the proximity sensor assembly 7 is shown positioned on the microphone body 2c. The microphone in FIGS. 1 and 2 is a wireless microphone with a wireless transmitter 2d projecting out of the end of the microphone body 2c. In FIGS. 3-6, the proximity sensor assembly 7 is attached to the microphone clip 4a. The microphone clip 4a, or microphone mount, is a mechanical device that attaches the stage microphone 2 to the microphone stand 4. Typically, microphone clips 4a allow the microphone to swivel in relation to the microphone stand.

In FIGS. 1-6, and throughout this disclosure, for a purely lip-synchronized performance, i.e., where the stage microphone 2 is not being used to transmit a live audio signal, the stage microphone 2 can be a "prop microphone," or "dummy microphone."

Figure 7:
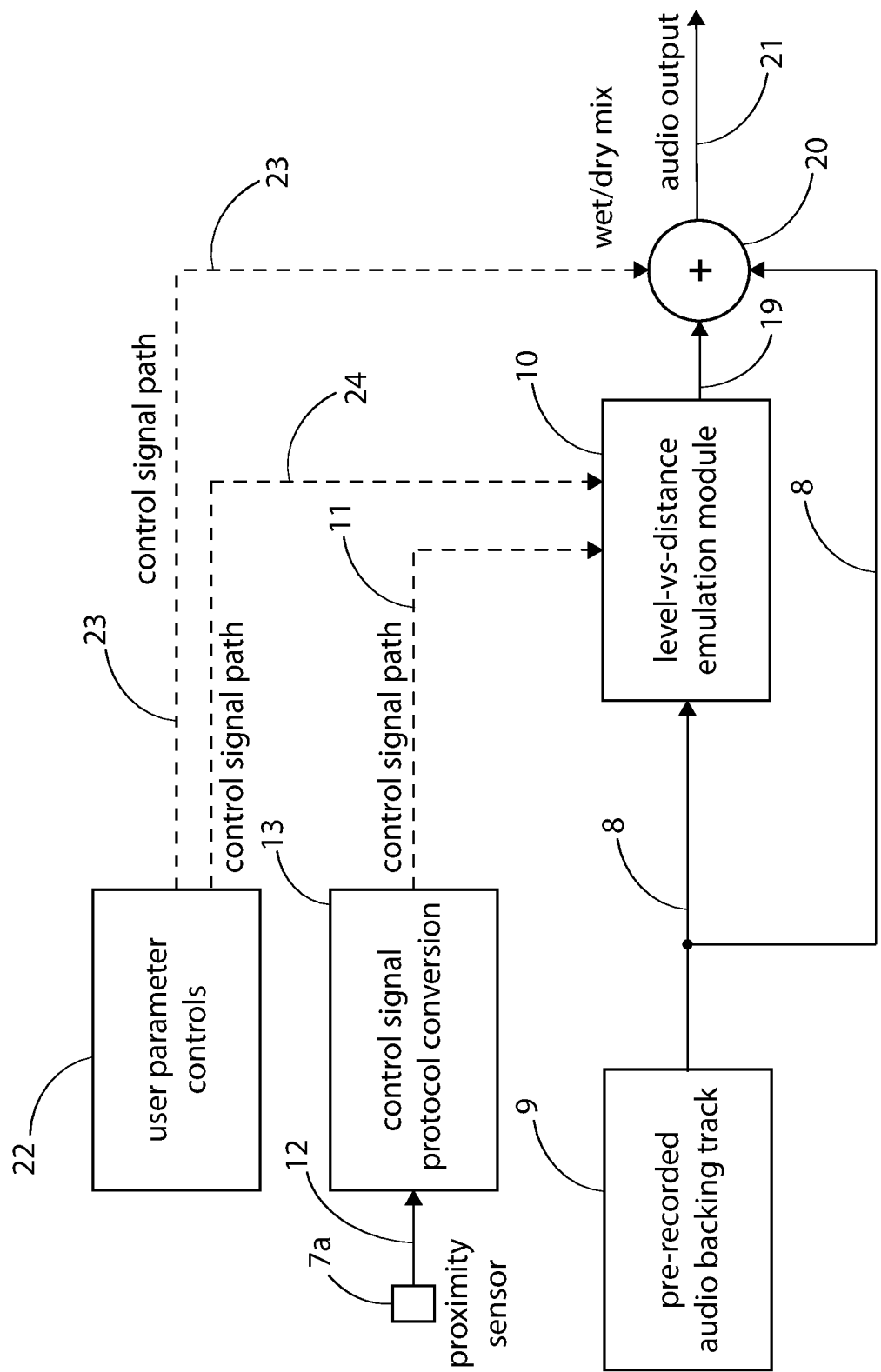
FIG. 7 illustrates a simplified block diagram of a real-time level-versus-distance emulation system applied to a pre-recorded audio backing track.

FIGS. 7-12 illustrates an example of how the system works. Referring to FIG. 7, the audio data stream 8 of the pre-recorded audio backing track 9 feeds a level-versus-distance emulation module 10. The level-versus-distance emulation module 10 adjusts the signal level of the audio data stream 8 inversely with distance using control signal 11 to provide distance information. The control signal 11 is based on the dynamic distance data stream 12 generated by the proximity sensor 7a. With the proximity sensor 7a mounted in a fixed distance relationship with respect to the stage microphone 2 of FIGS. 1-6, the dynamic distance data stream 12 is generated by movement of the stage microphone 2 with respect to the vocalist 1, 3, as in FIGS. 1-4, or movement of the stage microphone 2 with respect to the sound-producing end 5a of the acoustic instrument 5, as in FIGS. 5 and 6. In some embodiments, the level-versus-distance emulation module 10 can be controlled directly by the dynamic distance data stream 12. In other embodiments, such as a digital audio workstation, the dynamic distance data stream 12 may need to be first converted to an audio industry control protocol, such as MIDI or OSC. In FIG. 7, the dynamic distance data stream 12 is converted to the control signal 11 by the control signal protocol conversion module 13. The control signal protocol conversion module generates a control signal 11 such as the above-mentioned audio industry control protocol or other standard control protocol.

Figure 8:
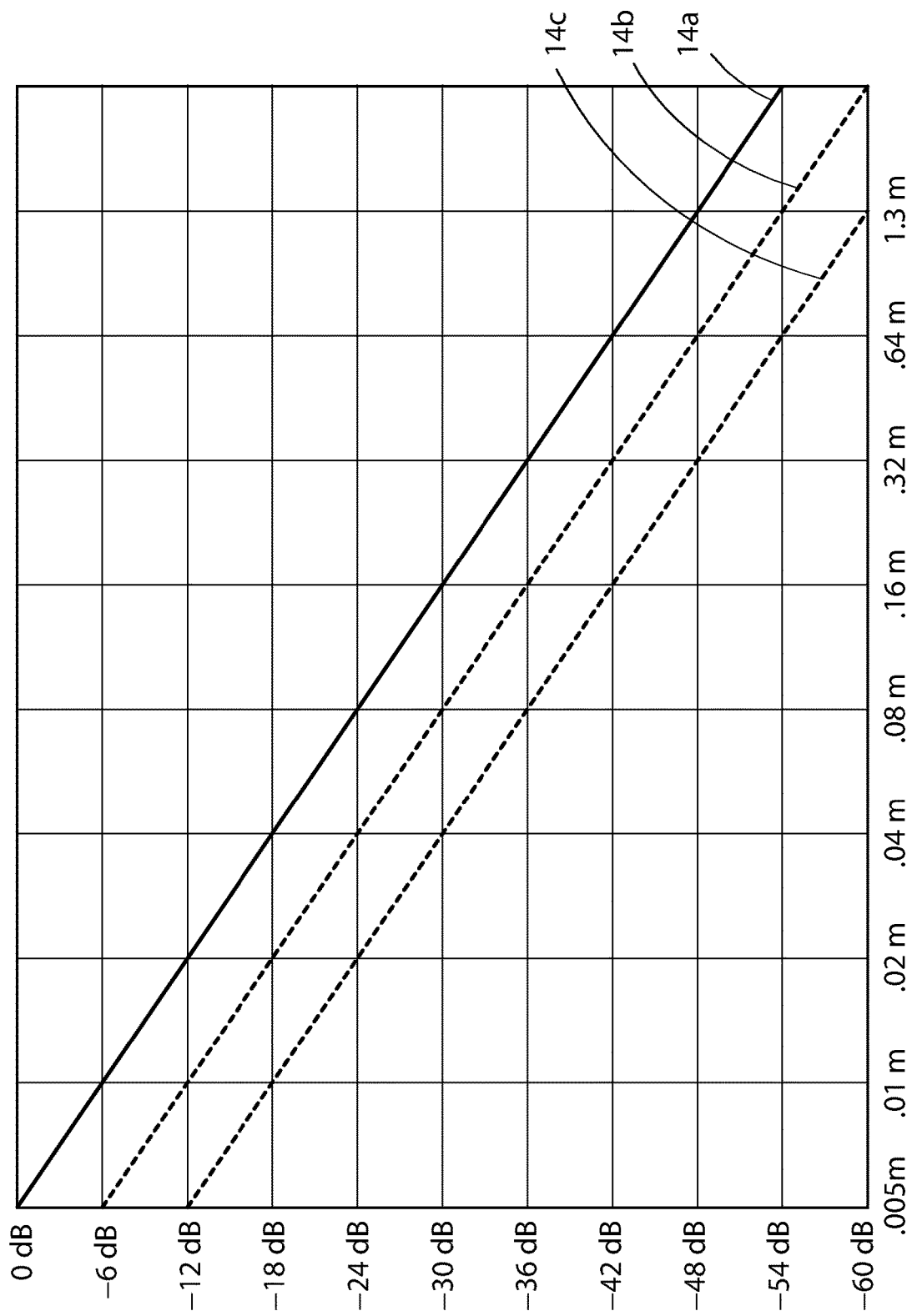
FIG. 8 illustrates a first graph demonstrating a first set of examples of how distance versus level emulation can be applied to the recorded audio track.
Figure 9:
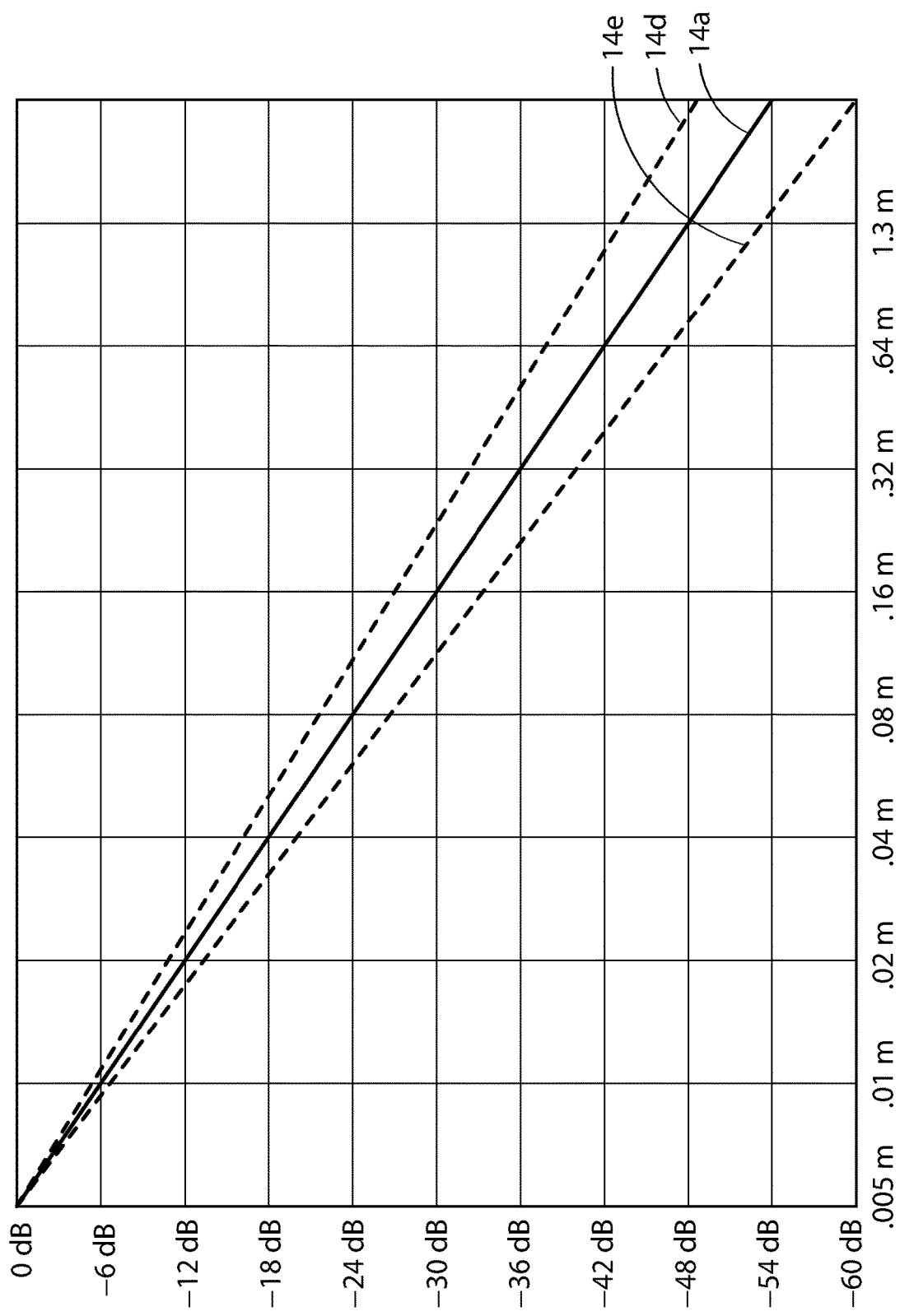
FIG. 9 illustrates a second graph demonstrating a second example of how distance versus level emulation can be applied to the recorded audio track.

The level-versus-distance emulation module 10 uses the dynamic distance data stream 12 provided by the control signal 11 to adjust the audio data stream 8 of the pre-recorded audio backing track 9 inversely with distance. The level-versus-distance emulation module 10 typically adjusts the audio data stream 8 according to the inverse square law. That is, for each doubling of distance, the signal level falls by half or by −6 dB and for each halving of distance, the signal level increases by 6 dB. This emulates what the audience would likely hear if they were listening to a live performance. This is because microphone signal levels decrease with the square of the distance that the sound source is from the stage microphone 2. Referring to FIGS. 8 and 9, this is represented by level-versus-distance curve 14a illustrated as a solid level-versus-distance curve. FIGS. 8 and 9 represent typical level-versus-distance adjustment laws followed by the level-versus-distance emulation module 10 of FIG. 7. The vertical scale shows relative signal levels in decibels (dB), with the top of the scale being 0 dB. The horizontal scale shows distance in meters.

Figure 10:
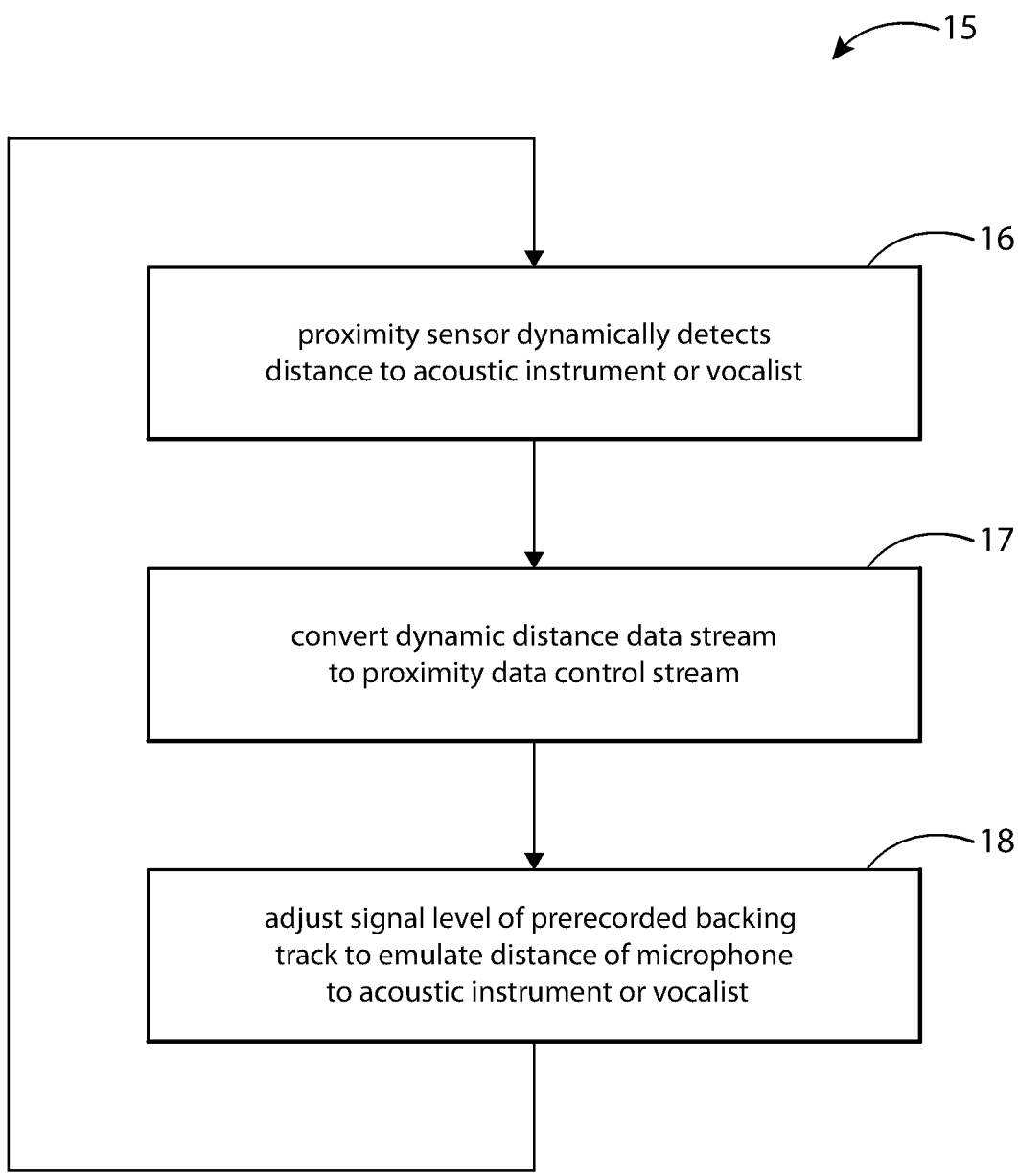
FIG. 10 illustrates a simplified flow chart of FIG. 7.

This process of dynamically adjusting the signal level of a pre-recorded audio signal according to distance between a stage microphone 2 and acoustic instrument 5 (FIGS. 5 and 6) or vocalist 1, 3 (FIGS. 1-4) can be summarized by the flow chart 15 of FIG. 10. Referring to FIGS. 1-7 and 10, in step 16 (FIG. 10), the proximity sensor 7a (FIG. 7) dynamically detects distance to acoustic instrument 5 (FIGS. 5 and 6) or vocalist 1, 3 (FIGS. 1-4). In step 17 (FIG. 10), the dynamic distance data stream 12 (FIG. 7) is converted to the control signal 11 (FIG. 7). In step 18 (FIG. 10), the signal level of the audio data stream 8 of the pre-recorded audio backing track 9 (FIG. 7) is adjusted inversely with distance to emulate distance between the stage microphone 2 and acoustic instrument 5 (FIGS. 5 and 6) or vocalist 1, 3 (FIGS. 1-4). The process is continuously repeated as illustrated in FIG. 10.

Referring to FIG. 7, it may be desirable to provide a mixture of the emulated output 19 from the level-versus-distance emulation module 10 and the audio data stream 8. This is known as a wet/dry mix. To facilitate this, the audio data stream 8 and the emulated output 19 are summed 20 or mixed, creating the audio output 21. The ratio of emulated output 19 (i.e., "wet output") to the audio data stream 8 (i.e., "dry output") can be controlled by the sound engineer by user parameter controls 22 via control signal path 23.

The level-versus-distance emulation module 10, the control signal protocol conversion module, as associated summing and mixing can be implemented by a processor, or more than one processor, executing instructions stored a non-transitory computer readable medium such as ROM, RAM, or FLASH memory, or memory embedded in the processor. The processor can be a digital signal processor (DSP), an FPGA, a PLD, ASIC, a microprocessor, or a microcontroller, or any other processor capable of executing the instructions and performing the functions described. The pre-recorded audio backing track 9 can be stored and transmitted to the processor from memory such as a hard drive, flash memory, DVD, a dedicated digital audio storage unit, or transmitted over a network from a non-transitory computer readable medium. Alternatively, one or more of these elements can be implemented in dedicated hardware.

Referring to FIGS. 7-9, the user parameter controls 22 (FIG. 7) can also control the behavior of the level-versus-distance emulation module via control signal path 24. For example, the level-versus-distance curve can be scaled as illustrated by level-versus-distance curves 14b, 14c in FIG. 8. Level-versus-distance curves 14a, 14b, 14c all follow the inverse square law, but level-versus-distance curves 14b, 14c are attenuated −6 dB and −12 dB, respectively as compared with level-versus-distance curve 14a. This may be helpful for setting the 0 dB based on the habits of the performer. For example, some vocalist 1 like to habitually hold the microphone close to their lips, as shown in FIG. 1, while others, like the vocalist 3 in FIG. 3 do not. The sound engineer may also find it helpful to change the slope or even the shape of the distance versus level curve. For example, in FIG. 9, the user parameter controls 22 of FIG. 7 is used to adjust the slope of the level-versus-distance curve 14d, 14e. Level-versus-distance curve 14d has a shallower slope than level-versus-distance curve 14a (i.e., shallower than the inverse square law). Level-versus-distance curve 14e has a steeper slope than level-versus-distance curve 14a (i.e., steeper than the inverse square law).

Figure 11:
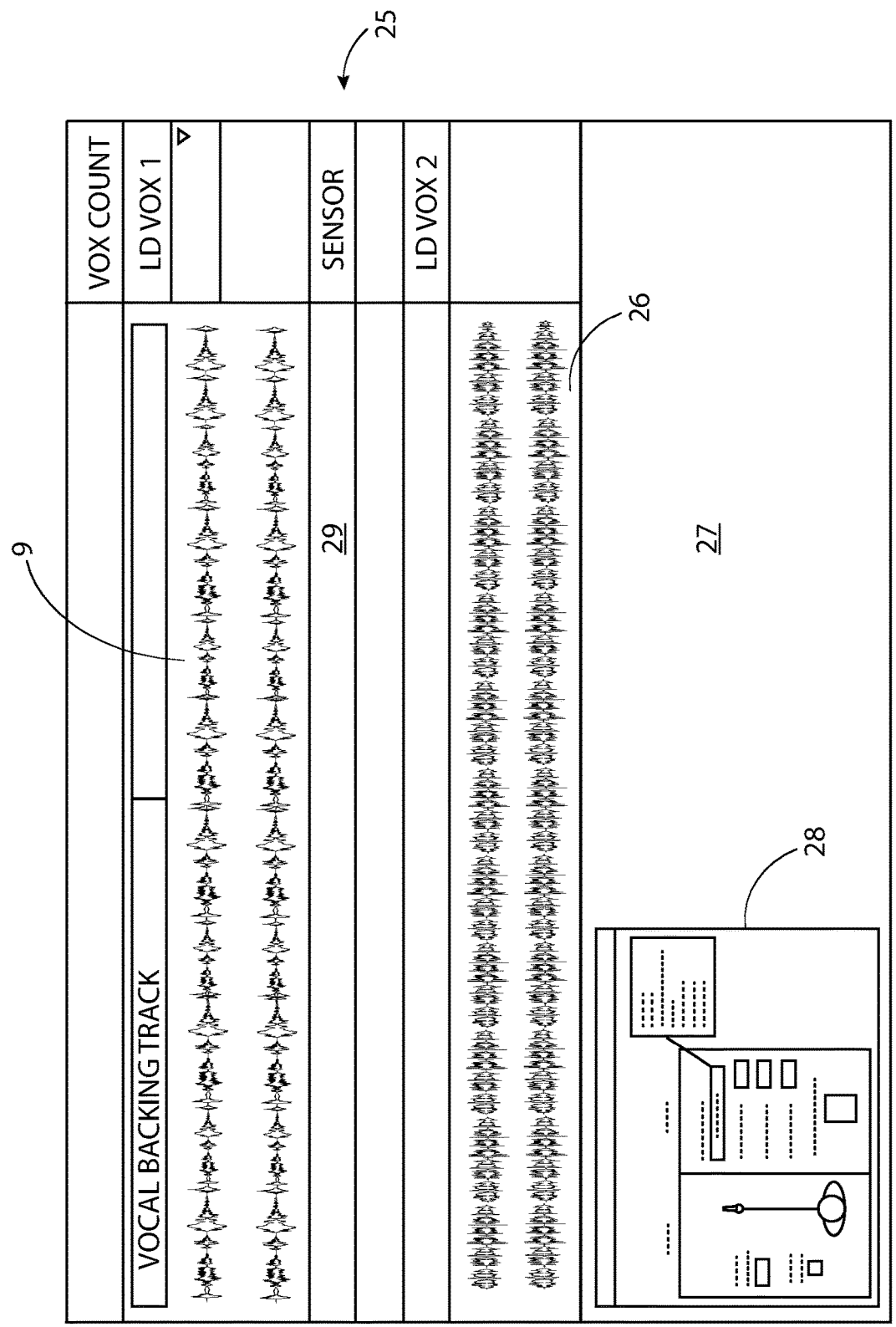
FIG. 11 illustrates a typical graphical user interface with distance versus level emulator section shown as an audio plugin or module.

Referring to FIG. 7, the user parameter controls 22 can be implemented as hardware controls. For example, rotary or linear potentiometers, rotary or linear encoders, switches, as well as other controls typically found on audio control interfaces. The user parameter controls 22 can be implemented as soft controls on a graphical user interface such as software controls on a digital audio workstation graphical user interface. The user parameter controls 22 can be implemented as a combination of hardware controls and soft controls. For example, a digital audio workstation with both a graphical user interface and a hardware control surface. FIG. 11 shows a simplified view of graphical user interface 25 of a digital audio workstation. Referring to FIG. 11, the graphical user interface 25 includes various audio tracks and MIDI or OSC control tracks. For example, the audio data stream 8 of the pre-recorded audio backing track 9 and an audio track 26. The audio track 26 can be pre-recorded or a live audio stream. Both tracks are represented by audio waveforms. Below audio track 26 is the plugin area 27. In this example, the dynamic distance control plugin 28 includes the level-versus-distance emulation module 10 and user parameter controls 22, both from FIG. 7. The dynamic distance control plugin 28 receives the control signal 11 from FIG. 7 as control track 29. Control track 29, in this example, would be MIDI track containing MIDI information that represents the distance data received from the proximity sensor 7a of FIG. 7. For a digital audio workstation, the control track 29 is typically MIDI, OSC, or the program's proprietary API. The dynamic distance control plugin 28 applies dynamic level control to the audio data stream 8 using the level-versus-distance emulation module 10 of FIG. 7. The dynamic distance control plugin 28 also can include the user parameter controls 22 of FIG. 7.

Figure 12:
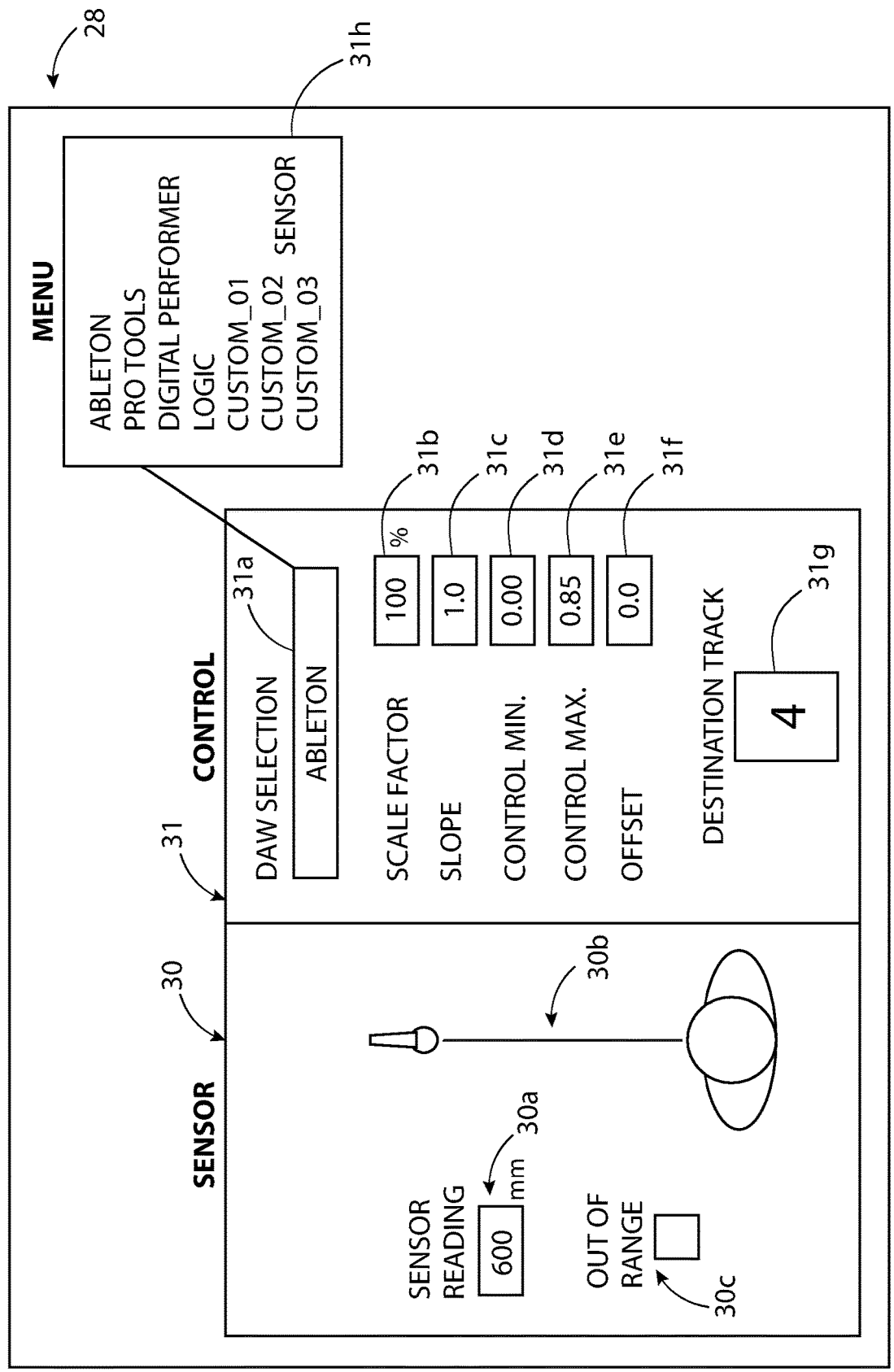
FIG. 12 illustrates the graphical user interface of the distance versus level emulator section of FIG. 11.

FIG. 12 illustrates the user interface of the dynamic distance control plugin 28 of FIG. 11 in more detail. Referring to FIG. 12, the dynamic distance control plugin 28 is illustrated with a sensor display portion 30 and user controls 31. The sensor display portion 30 includes a sensor reading 30a that dynamically displays the distance the proximity sensor 7a of FIGS. 1-7 is from the vocalist 1, 3 of FIGS. 1-4 or the sound-producing end 5a of the acoustic instrument 5 of FIGS. 5 and 6. Along with the sensor reading 30a is a sensor distance graphic 30b that dynamically shows the distance the vocalist or instrument is from the microphone. The sensor display portion 30 also includes an out of range indicator 30c that indicates that the object (i.e. vocalist or acoustic instrument) are out of range. The user controls 31 can include a DAW selector 31a, a scale factor 31b, slope control 31c, minimum distance control 31d, maximum distance control 31e, offset distance control 31f, and destination control 31g. The DAW selector 31a that allows the sound engineer to select which digital audio workstation to apply the dynamic distance control plugin 28. Here, the digital audio workstation is selected via a menu 31h. The scale factor 31b can scale down the maximum signal level similar to level-versus-distance curves 14b, 14c of FIG. 8. The slope control 31c can adjust the level-versus-distance law. The default would typically be the inverse square law. This control can make the level-versus-distance law shallower or steeper in a similar manner as illustrated for level-versus-distance curves 14d, 14e of FIG. 9. The minimum distance control 31d, and maximum distance control 31e set the minimum and maximum distance detectable from the proximity sensor 7a of FIGS. 1-7, respectively. The offset distance control 31f of FIG. 12 compensates for the distance the proximity sensor 7a is away from the end 2a of the microphone grille 2b also in FIGS. 1-7. For example, the offset distance control 31f of FIG. 12 can compensate for offset distance 51 in FIGS. 1 and 2 or offset distance S2 in FIGS. 3-6. Offset distances 51, S2 being the distance between the end 2a of the microphone grille 2b and the proximity sensor 7a. Referring to FIG. 12, the destination control 31g selects which track the dynamic distance control plugin 28 will be applied to. For most Digital Audio Workstation software, the destination control 31g will be mapped directly to the pre-recorded audio backing track 9. In some software it may be necessary to map the destination control 31g to a MIDI or instrument track to host the dynamic distance control plugin.

Figure 13:
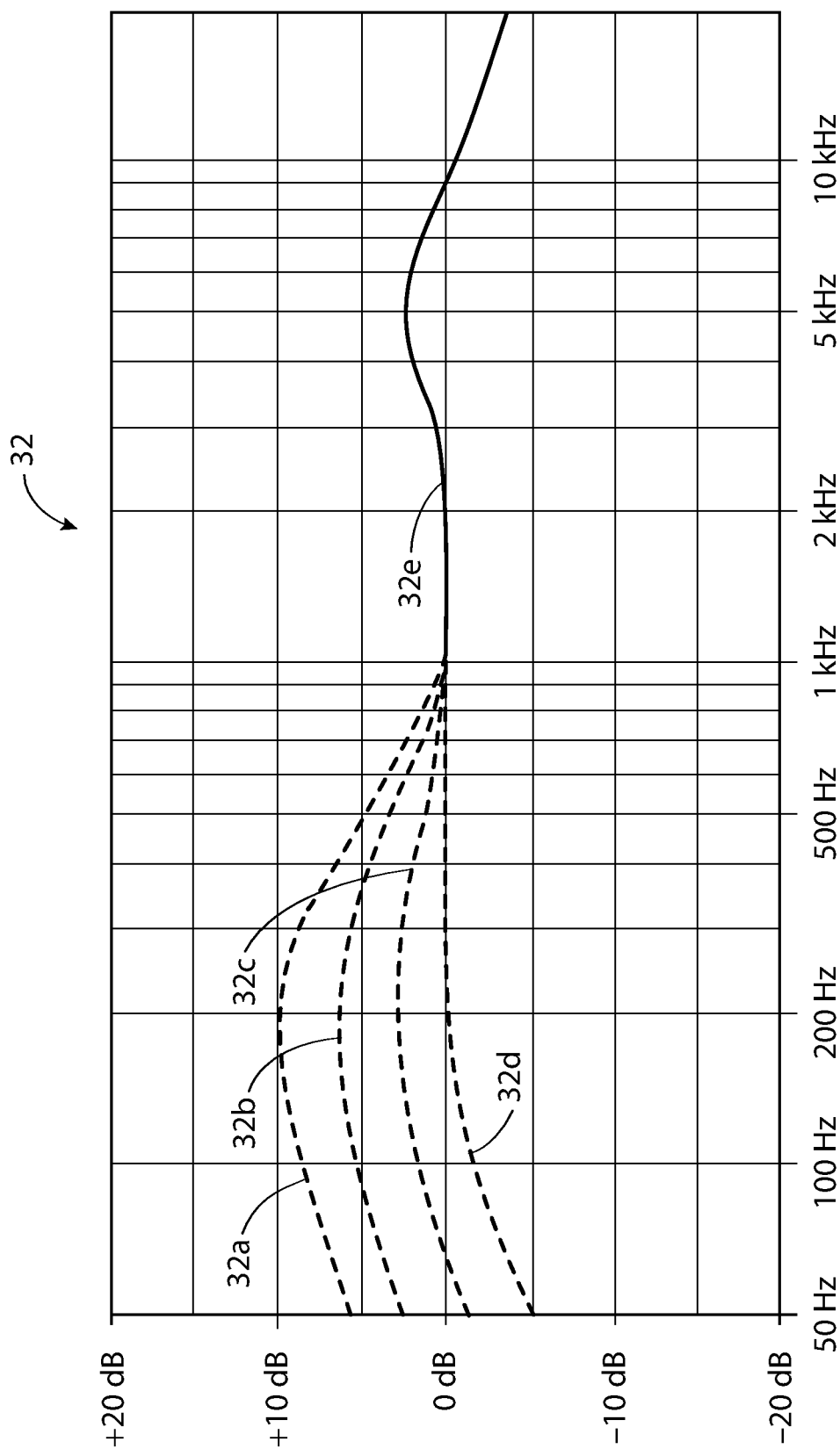
FIG. 13 illustrates a series of microphone frequency response curves, for a typical microphone, each at a given distance to demonstrate proximity effect.

As discussed in the Summary, the inventor also noted that the performance could be made more realistic by adjusting the frequency response of the vocal backing track to simulate proximity effect as the vocalist moves closer to a typical stage microphone. FIG. 13 illustrates a frequency versus level graph 32 for a typical cardioid microphone where each line illustrates the frequency response for a source at a given distance from the sound source. Frequency response curve 32a represents a distance between the microphone and sound source of 0.005 meters (0.125 inches). Frequency response curve 32b represents a distance between the microphone and sound source of 0.025 meters (0.984 inches). Frequency response curve 32c represents a distance between the microphone and sound source of 0.05 meters (2.00 inches). Frequency response curve 32a represents a distance between the microphone and sound source of 0.5 meters (23.6 inches). As shown by the frequency versus level graph 32, at close distances, frequencies between 100 Hertz (Hz.) and 300 Hz. can be significantly boosted. For example, in frequency response curve 32a the signal is boosted by approximately 12.5 dB at 200 Hz. In contrast, in frequency response curve 32d, the signal is attenuated by approximately −2.5 dB at 200 Hz. The graph frequency response curve portion 32e represented by the solid line, shows that at approximately 1.2 kHz. the frequency response of the microphone is unaffected by distance from the sound source.

The inventor discovered that he could simulate proximity effect for an improvising lip-syncing vocalist by automatically adjusting the low frequency response of the pre-recorded audio backing track, in real-time, inversely with the distance of the vocalist from the microphone to mimic or approximate proximity effect. This could be done in combination with the level-versus-distance compensation described for FIGS. 7-12. Referring to FIGS. 14-18, a proximity effect emulation module 33 (FIG. 18) dynamically increases the low frequency response of the audio data stream 8 of the pre-recorded audio backing track 9 (FIG. 18) as the stage microphone 2 (FIGS. 14-17) is moved toward the vocalist 34 (FIGS. 14-17) or dynamically decreases the low frequency response as the stage microphone 2 moves away from the vocalist 34. In addition, other frequency response changes that occur in response to distance can also be emulated. At the same time, the level-versus-distance emulation module 10 (FIG. 18) adjusts the signal level of the output of the summer 51 based on the distance between the proximity sensor 7a (FIG. 18) and the vocalist 34.

Figure 14:
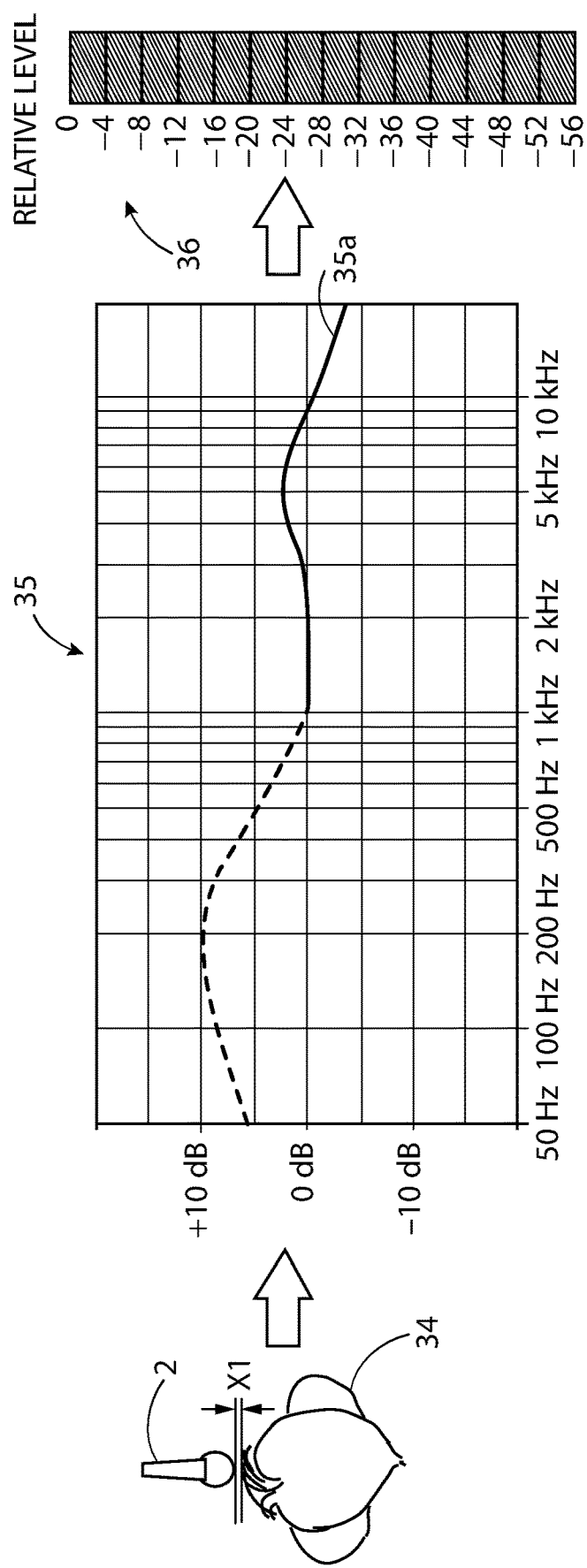
FIG. 14 illustrates combined proximity effect and level-versus-distance emulation at a distance X1 between the vocalist and the microphone.
Figure 15:
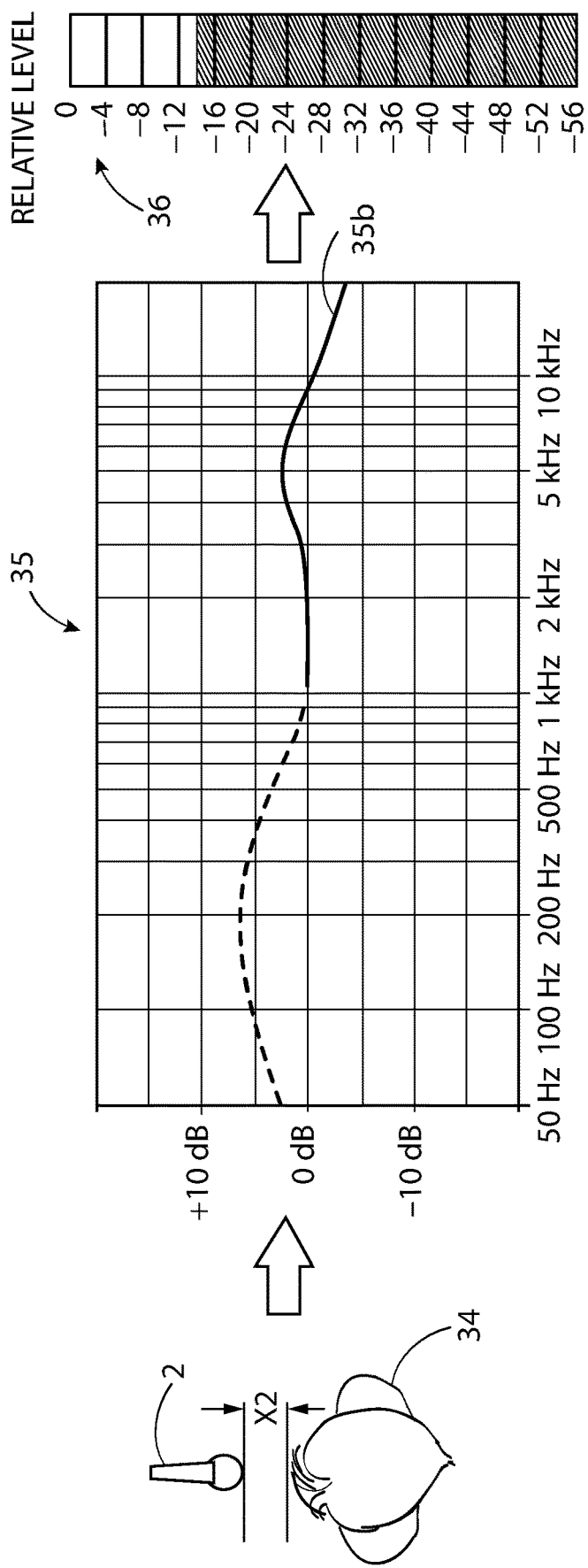
FIG. 15 illustrates combined proximity effect and level-versus-distance emulation at a distance X2 between the vocalist and the microphone.
Figure 16:
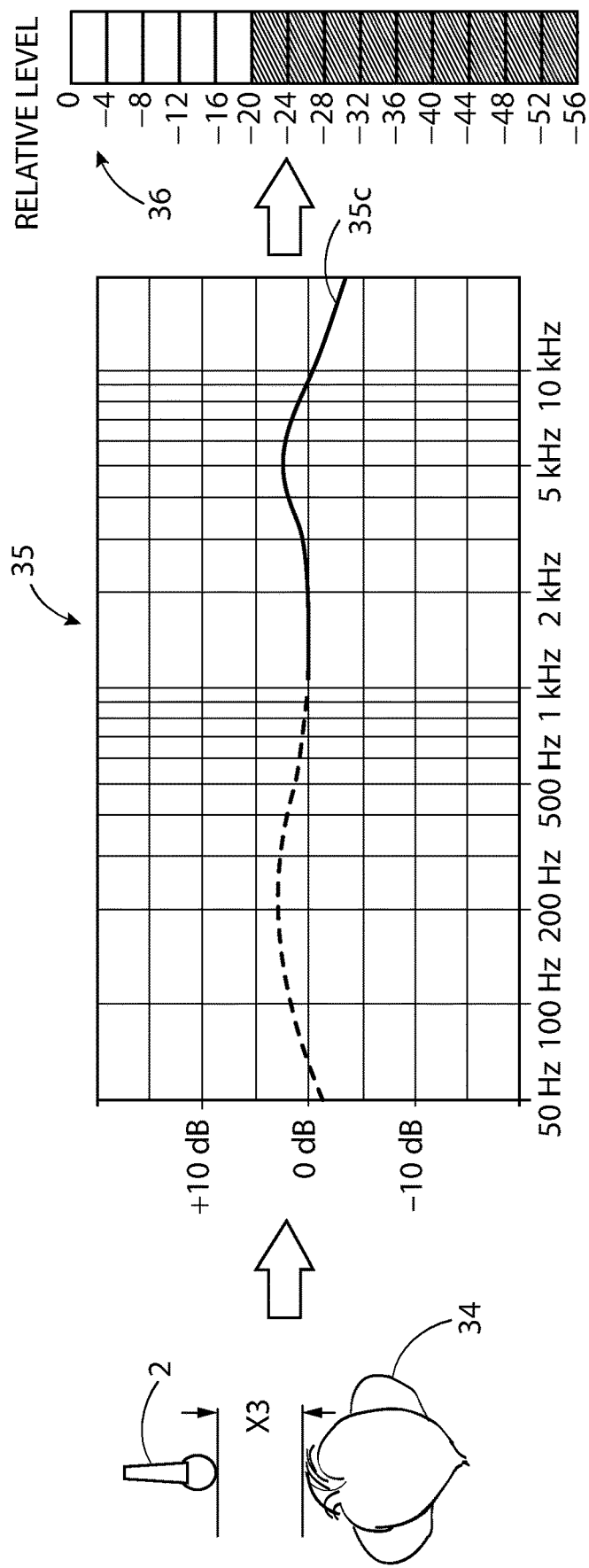
FIG. 16 illustrates combined proximity effect and level-versus-distance emulation at a distance X3 between the vocalist and the microphone.
Figure 17:
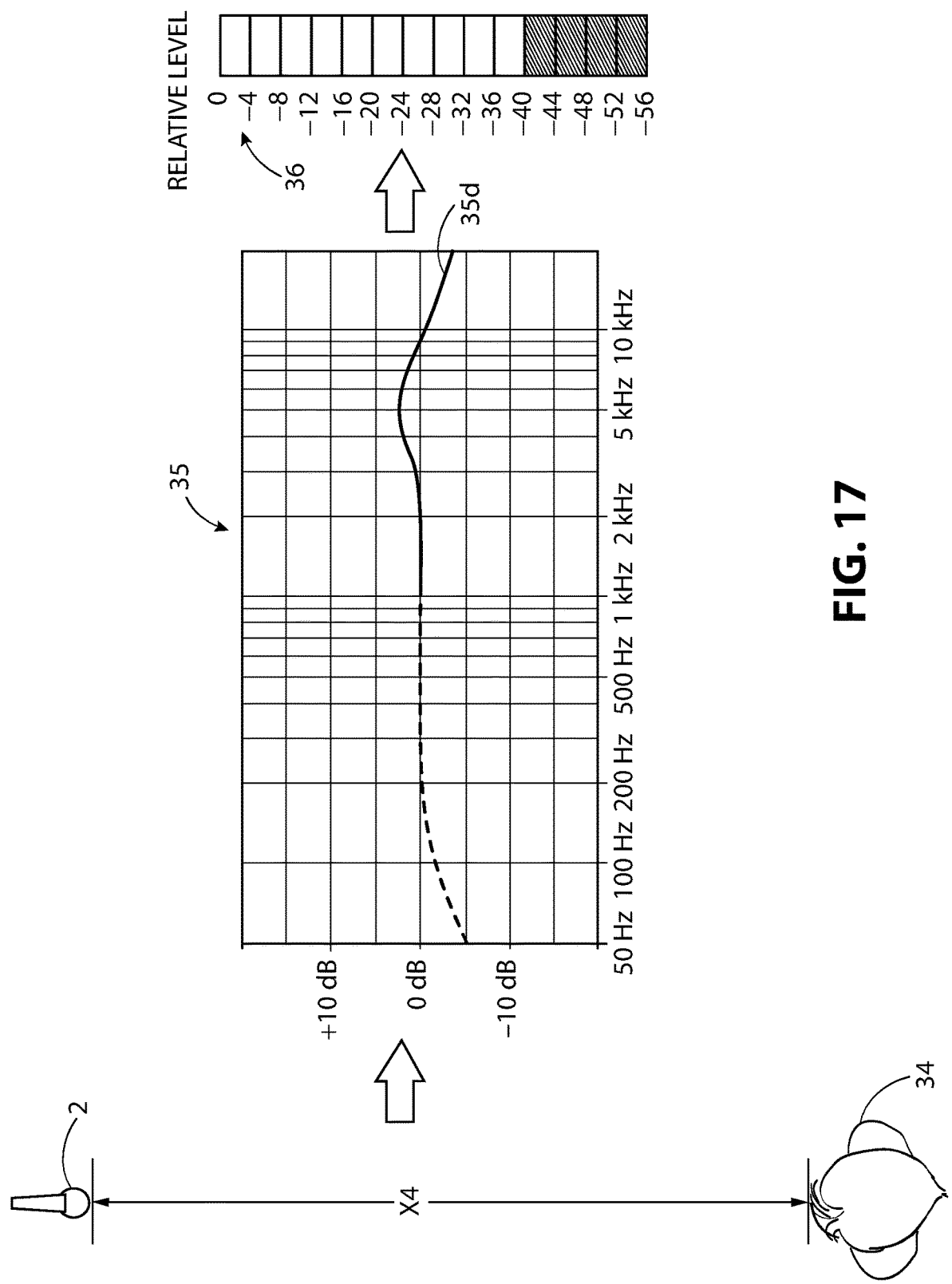
FIG. 17 illustrates combined proximity effect and level-versus-distance emulation at a distance X4 between the vocalist and the microphone.
Figure 18:
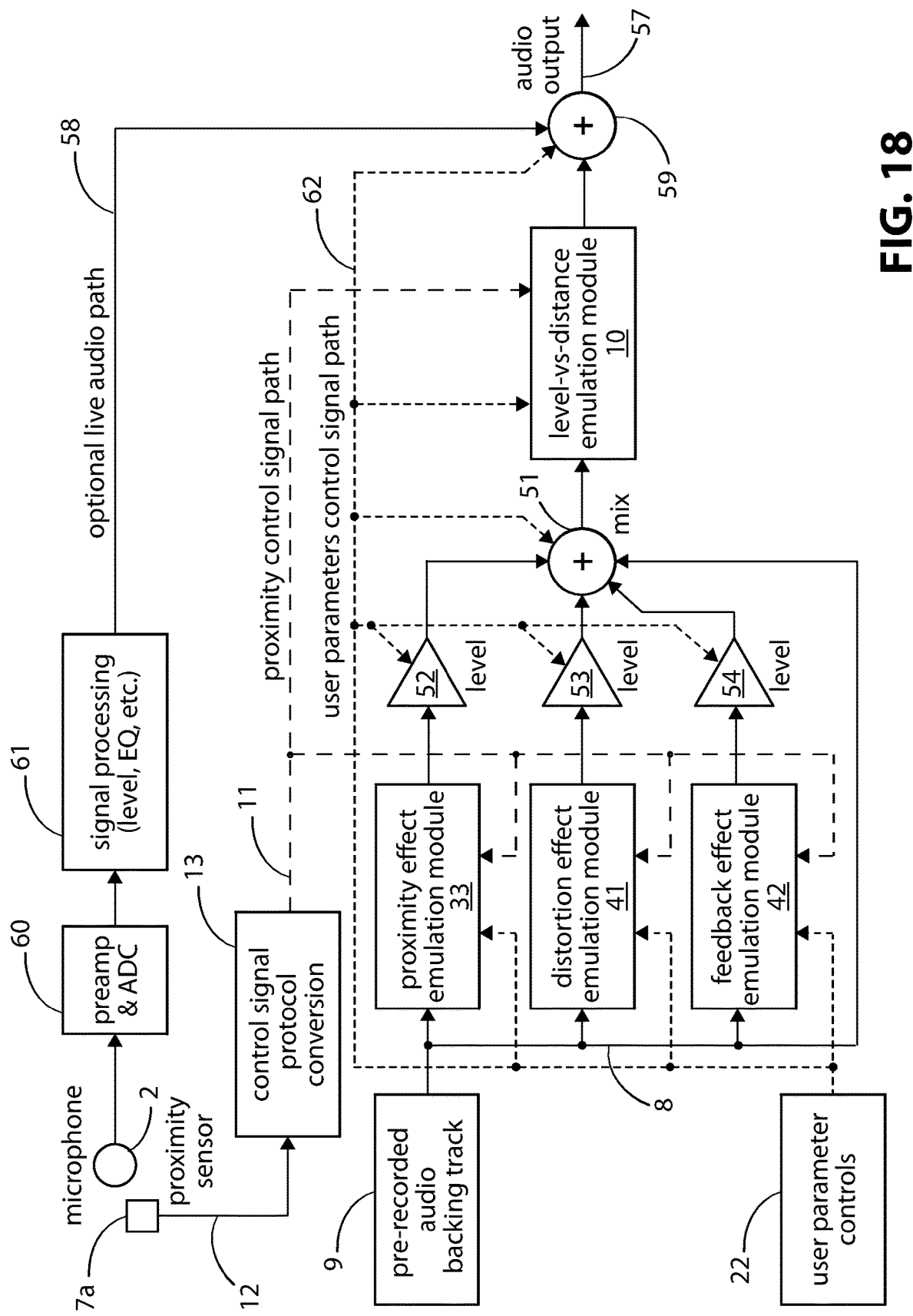
FIG. 18 illustrates a simplified block diagram of the distance-applied level, proximity effect, distortion effect, and feedback effect emulation.

FIGS. 14-17 illustrate a frequency response graph 35 and relative signal level 36, and distance between the stage microphone 2 and vocalist 34. Referring to FIGS. 14-17, for the sake of example, we can assume the same distances used in FIG. 13. That is, X1=0.005 meters (FIG. 14), X2=0.025 meters (FIG. 15), X3=0.05 (FIG. 16), and X4=0.5 meters (FIG. 17). Referring to FIGS. 14 and 18, the proximity effect emulation module 33 (FIG. 18) boosts the lower frequency portion of the frequency response curve 35a (FIG. 14) in a similar manner as frequency response curve 32a of FIG. 13. In FIG. 18, the level-versus-distance emulation module 10 adjusts the signal level of the audio data stream 8 of the pre-recorded audio backing track 9 according to the dynamic distance data stream 12 from the proximity sensor 7a. For ease of understanding, the relative signal level 36 in FIG. 14 is illustrated as 0 dB. Referring to FIGS. 15 and 18, the proximity effect emulation module 33 (FIG. 18) boosts the lower frequency portion of the frequency response curve 35b (FIG. 15) in a similar manner as frequency response curve 32b of FIG. 13. The level-versus-distance emulation module 10 decreases the relative signal level 36 to −18 dB in FIG. 15 as the proximity sensor 7a detects that the distance between the stage microphone 2 and the vocalist 34 quadrupled. Referring to FIGS. 16 and 18, the proximity effect emulation module 33 (FIG. 18) adjusts the lower frequency portion of the frequency response curve 35c (FIG. 16) in a similar manner as frequency response curve 32c of FIG. 13. The level-versus-distance emulation module 10 decreases the relative signal level 36 from −18 dB in FIG. 15 to −24 dB in FIG. 16 as the proximity sensor 7a detects that the distance between the stage microphone 2 and the vocalist 34 doubled from FIG. 15. Referring to FIGS. 17 and 18, the proximity effect emulation module 33 (FIG. 18) adjusts the lower frequency portion of the frequency response curve 35d (FIG. 17) in a similar manner as frequency response curve 32d of FIG. 13. The level-versus-distance emulation module 10 decreases the relative signal level 36 from −24 dB in FIG. 16 to −45 dB in FIG. 17 as the proximity sensor 7a detects that the distance between the stage microphone 2 and the vocalist 34 has decreased by nearly twelve times from FIG. 16.

Figure 19:
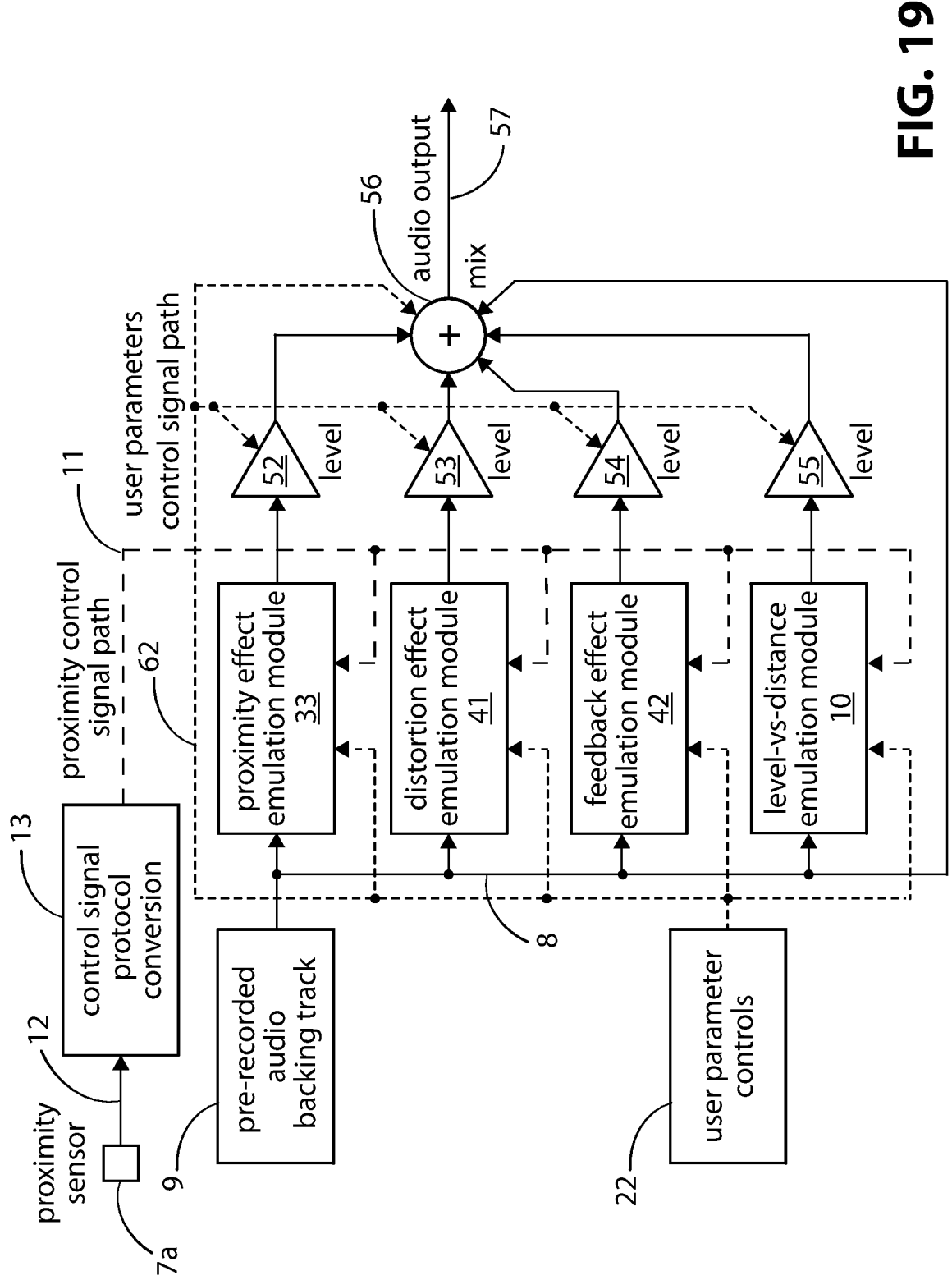
FIG. 19 illustrates an alternative simplified block diagram of the distance-applied level, proximity effect, distortion effect, and feedback effect emulation.
Figure 20:
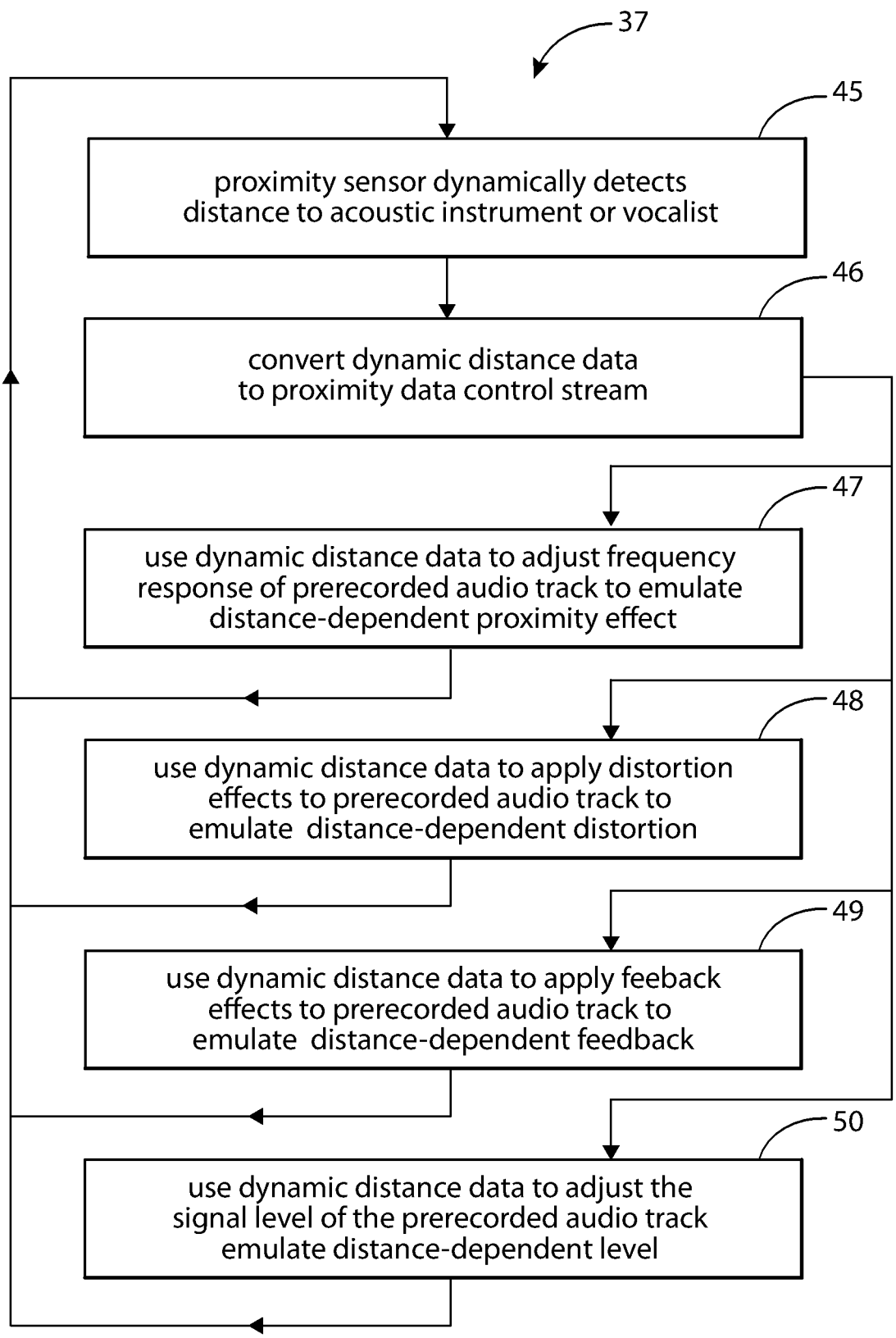
FIG. 20 illustrates a simplified flow chart for FIG. 18 or 19.

As stated in the Summary, the inventor envisions that distortion effects, typical of overloading a microphone could be simulated by dynamically detecting the distance between the microphone and the vocalist. For example, when the vocalist is too close to the microphone and singing too loudly, feedback or distortion can occur. While distortion effects and feedback are typically undesirable, a selected use of them along with emulated proximity effect and distance-based level control can add realism to a lip-synced performance. FIG. 18 shows an example of a simplified system block diagram that applies distortion effect, feedback effect, proximity effect, and distance-based level to a pre-recorded audio backing track to add realism to a lip-synced performance. FIG. 19 shows an alternative example of a simplified system block diagram that applies distance-dependent distortion effect, simulated microphone feedback, distance-dependent proximity effect, and distance-based level to a pre-recorded audio backing track to add realism to a lip-synced performance. The primary difference between the two figures being the position of the level-versus-distance emulation module 10. FIG. 18 also illustrates an optional live audio path. FIG. 20 shows a simplified flow chart 37 illustrating a process flow chart for FIG. 18 or 19.

Referring to FIGS. 18-20, in step 45 (FIG. 20), the proximity sensor 7a (FIGS. 18 and 19) dynamically detects the distance from the vocalist or acoustic instrument. This circuitry associated with the proximity sensor 7a generates the dynamic distance data stream 12 (FIGS. 18 and 19). This circuitry may be integrated within or may be separate from the proximity sensor 7a. For example, the circuitry may be housed in the proximity sensor assembly 7. In step 46 (FIG. 20), the control signal protocol conversion module 13 (FIGS. 18 and 19) converts the dynamic distance data stream 12 to a control signal 11 (FIGS. 18 and 19). The control signal can be a standard musical control protocol, such as MIDI or OSC, or other standard control protocols. In step 47 (FIG. 20), the dynamic distance data stream 12 is applied to the proximity effect emulation module 33 (FIGS. 18 and 19) to dynamically adjust the frequency response of the audio data stream 8 of the pre-recorded audio backing track 9 (FIGS. 18 and 19) to emulate distance dependent proximity effect as described in the preceding paragraphs. In step 48 (FIG. 20), the dynamic distance data stream 12 is applied to the distortion effect emulation module 41 (FIGS. 18 and 19) to dynamically apply distortion effects to the audio backing track to emulate distance dependent distortion. In step 49 (FIG. 20), the dynamic distance data stream 12 is applied to the feedback effect emulation module 42 (FIGS. 18 and 19) by dynamically adding simulated microphone feedback to the audio data stream 8 of the pre-recorded audio backing track 9 to emulate distance dependent feedback. In step 50, as illustrated in FIG. 18, the dynamic distance data stream 12 is applied to the level-versus-distance emulation module 10 to adjust the level of pre-recorded audio backing track 9 to emulate distance dependent microphone signal levels. In step 50, as illustrated in FIG. 19, the dynamic distance data stream 12 is applied to the level-versus-distance emulation module 10 to adjust the level of mix of the outputs of the proximity effect emulation module 33, the distortion effect emulation module 41 and the feedback effect emulation module 42 to emulate distance dependent microphone signal levels. Referring to FIGS. 18 and 19, the control signal protocol conversion module 13 uses the dynamic distance data stream 12 to generate a control signal 11 that controls the proximity effect emulation module 33, the distortion effect emulation module 41, the feedback effect emulation module 42, and the level-versus-distance emulation module 10. In particular, if the above discussed modules were implemented within a digital audio workstation plugin, control signal 11 could be MIDI or OSC since these U.S. patent application Ser. No. 16/377,182 Substitute Specification-Clean Version protocols are typically used to control digital audio workstation plugins. However, in some instances, the control signal protocol conversion module 13 could be bypassed or eliminated and the proximity effect emulation module 33, the distortion effect emulation module 41, the feedback effect emulation module 42, and the level-versus-distance emulation module 10 could be controlled directly by the dynamic distance data stream 12. For example, custom systems that do not conform to standard digital audio workstation protocol.

Referring to FIG. 18, the proximity effect emulation module 33, the distortion effect emulation module 41, and the feedback effect emulation module 42 each feed respective level control modules 52, 53, 54. The output of the level control modules 52, 53, 54 are mixed via a summer 51. Optionally, the audio data stream 8 of the pre-recorded audio backing track 9 can be also mixed with the outputs of the level control modules 52, 53, 54 in order to create a wet/dry mix between the audio data stream 8 of the pre-recorded audio backing track 9 and the outputs of the level control modules 52, 53, 54. The output of the summer 51 feeds the level-versus-distance emulation module 10. Referring to FIG. 19, the proximity effect emulation module 33, the distortion effect emulation module 41, the feedback effect emulation module 42, and the level-versus-distance emulation module 10 each feed respective level control modules 52, 53, 54, 55. The output of the level control modules 52, 53, 54, 55 are mixed via a summer 51. As in FIG. 18, in FIG. 19 the audio data stream 8 of the pre-recorded audio backing track 9 can be also mixed with the outputs of the level control modules 52, 53, 54, 55 in order to create a wet/dry mix between the audio data stream 8 of the pre-recorded audio backing track 9 and the outputs of the level control modules 52, 53, 54. In FIG. 19, the audio output 57 that results from summing the outputs of the level control modules 52, 53, 54 via the summer 56 can be sent to a mixing console or similar device, either via digital-to-analog conversion or directly in the digital domain.

Referring to FIG. 18, it may be desirable to provide the audience with a mixture of a live vocal performance along with the audio data stream 8 of the pre-recorded audio backing track 9 with distance-emulated effects (i.e., the proximity effect emulation module 33, the distortion effect emulation module 41, feedback effect emulation module 42, and level-versus-distance emulation module 10). For example, the live performance vocals could be used for all but challenging parts of the vocal performance. In this example, the stage microphone 2 would be a real microphone. During the challenging portions of the vocal performance, the audio data stream 8 of the pre-recorded audio backing track 9 of the vocalist with distance-emulated effects could be mixed in. Similarly, for acoustic instruments, particularly challenging parts of the live performance could be replaced by the audio data stream 8 of the pre-recorded audio backing track 9. In order to accommodate these and similar situations, a live audio signal path 58 can optionally be mixed with the output of the level-versus-distance emulation module 10 and summed 59 to create the audio output 57. The live audio signal path 58 would typically be fed by the stage microphone 2 associated with the proximity sensor 7a via a microphone preamplifier and analog-to-digital converter 60. The output of the microphone preamplifier and analog-to-digital converter 60 can directly generate the live audio signal path 58, or as illustrated, could feed a signal processing module 61 before being mixed into the summer 59. The signal processor could include typical vocal processing such as compression, noise gating, or equalization.

Referring to FIGS. 18 and 19, the proximity effect emulation module 33, the distortion effect emulation module 41, the feedback effect emulation module 42, the level-versus-distance emulation module 10, the level control modules 52, 53, 54, 55 and the summers 51, 56, 59 can be affected by user parameter controls 22 via a control signal 62, several control signals, or a control signal bus. As previously discussed, the user parameter controls 22 can be implemented as hardware controls. For example, rotary or linear potentiometers, rotary or linear encoders, switches, as well as other controls typically found on audio control interfaces. The user parameter controls 22 can be implemented as soft controls on a graphical user interface such as software controls on a digital audio workstation graphical user interface. The user parameter controls 22 can be implemented as a combination of hardware controls and soft controls. For example, a digital audio workstation with both a graphical user interface and a hardware control surface.

The level-versus-distance emulation module 10, the control signal protocol conversion module 13, the proximity effect emulation module 33, the distortion effect emulation module 41, the feedback effect emulation module 42, level control modules 52, 53, 54, 55, and associated summing and mixing can be implemented by a processor, or more than one processor, executing instructions stored a non-transitory computer readable medium such as ROM, RAM, or FLASH memory, or memory embedded in the processor. The processor can be a digital signal processor (DSP), an FPGA, a PLD, ASIC, a microprocessor, or a microcontroller, or any other processor capable of executing the instructions and performing the functions described. The pre-recorded audio backing track 9 can be stored and transmitted to the processor from memory such as a hard drive, flash memory, DVD, a dedicated digital audio storage unit, or transmitted over a network from a non-transitory computer readable medium. Alternatively, one or more of these elements can be implemented in dedicated hardware.

Figure 21:
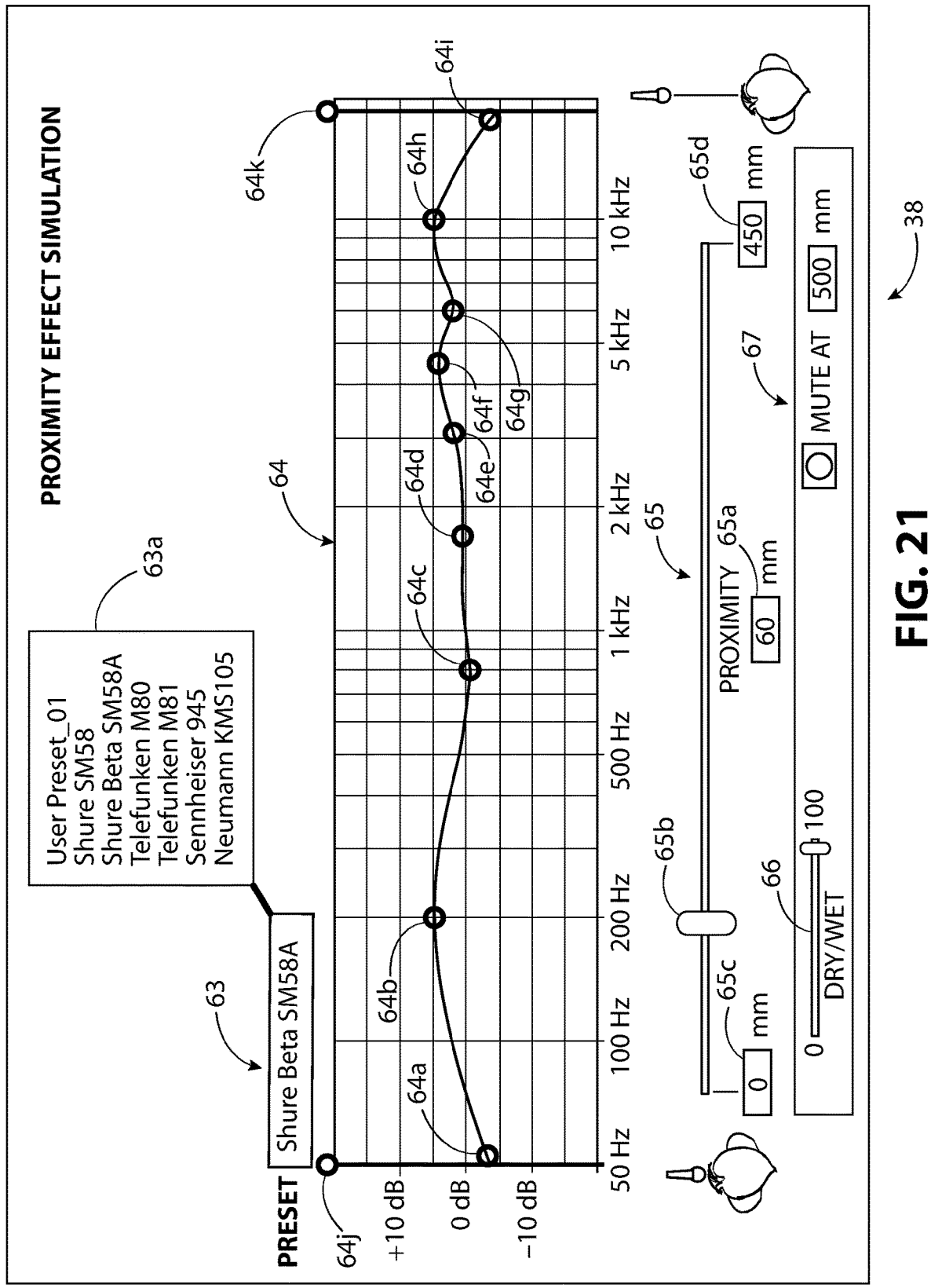
FIG. 21 illustrates a typical graphical user interface for the proximity effect emulator module of FIG. 18 or 19 shown as an audio plugin.

FIG. 21 is typical of a graphical user interface for a proximity effect plugin 38. This illustrates user parameter controls 22 typical for the proximity effect emulation module 33 of FIGS. 18 and 19. Referring to FIG. 21, the sound engineer typically selects a microphone they wish to emulate the proximity effect for from the microphone present panel 63 and pop-up panel 63a. In this case, the selected microphone is a Shure Beta SM58A. The sound engineer can view the frequency response curves on the frequency response graph 64 for a given distance, indicated by distance indicator 65a, by adjusting the slide bar 65b of the proximity slider control 65. The proximity slider control 65 also can include pop-up menus (not shown) associated with a minimum distance control 65c and a maximum distance control 65d that allows the sound engineer to set the minimum and the maximum distance limits, respectively, for the proximity effect emulation module (i.e., beyond these limits no further changes in frequency response will occur). The sound engineer typically chooses the same microphone that is being used on stage by the vocalist or musician in order to create an accurate illusion including the proximity effect for the lip-synchronized performance. However, the sound engineer is free to choose any microphone or a custom preset. If the sound engineer wishes to create a custom preset, for example, the User Preset_01, they can use the grab handles 64a, 64b, 64c, 64d, 64e, 64f, 64g, 64h, 64i and the grab bars 64j, 64k to create a custom preset for a set of frequencies response curves. In addition, the sound engineer can adjust the wet/dry ratio using a wet/dry ratio control 66. The audio data stream 8 of the pre-recorded audio backing track 9 of FIGS. 18 and 19 can be muted at a specific distance using the mute control panel 67. This can be over ridden by a similar control, if present on the dynamic distance control plugin 28.

Figure 22:
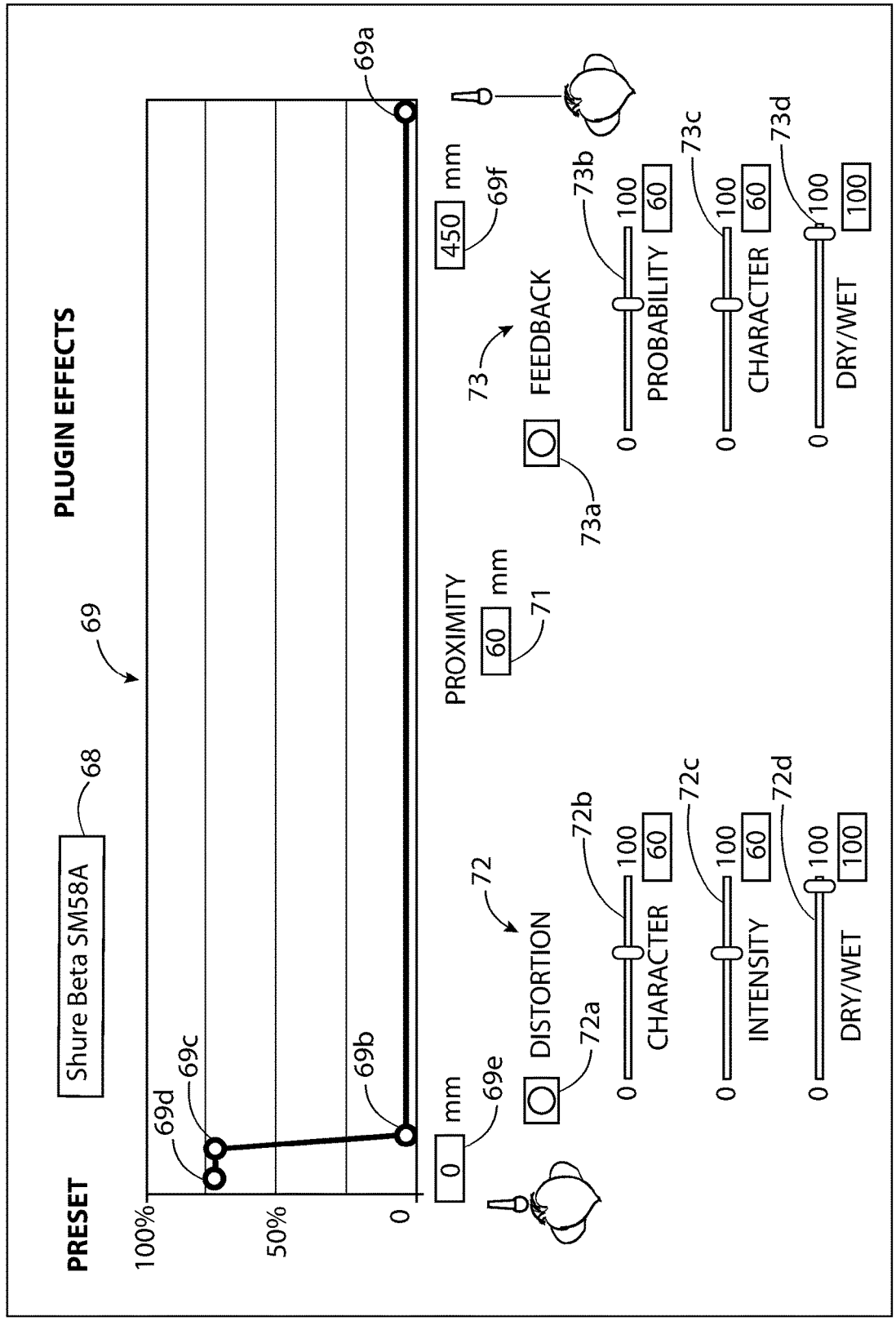
FIG. 22 illustrates a typical graphical user interface for the distortion and feedback effects emulation modules of FIG. 18 or 19 shown as an audio plugin or module.

FIG. 22 illustrates an effects plugin 40 that implements the user parameter controls 22 typical for the distortion effect emulation module 41 and feedback effect emulation module 42. The sound engineer can choose a preset from the microphone preset panel 68. The preset can be selected via a pop-up menu as described for the proximity effect plugin 38 of FIG. 21. The distance versus intensity graphic display 69 will show the activation curve for the distortion and feedback effects for the preset. Selecting the distortion button 72a from the distortion controls 72 will display the graph for the distortion effect on the distance versus intensity graphic display 69. Selecting the feedback button 73a will display the graph for the feedback effect on the distance versus intensity graphic display 69. The sound engineer can customize the curve by grab handles 69a, 69b, 69c, 69d and store this in a custom preset. The minimum and maximum distances can be set using a minimum distance control 69e and a maximum distance control 69f, respectively in a similar manner as described for the proximity effect plugin 38 of FIG. 21. The current distance between the proximity sensor 7*a* of FIGS. 1-6, and the vocalist or acoustic instrument is indicated by proximity indicator 71. The distortion controls 72 allow the sound engineer to set the character of the distortion and the intensity of the distortion with the character control 72*b* and the intensity control 72*c*. For example, the character control can control the nature and intensity of the harmonic overtones present in the distortion. The feedback controls 73 is illustrated with the probability control 73*b* and the character control 73*c*. The probability control 73*b* determines the probability that feedback will occur and the character control 73*c* controls the sonic character of the feedback (i.e., lower frequency versus high frequency squealing). Both the distortion controls 72 and feedback controls 73 include a wet/dry control 72*d*, 72*e*, respectively, to control the mix between the unmodified signal from the audio data stream 8 of the pre-recorded audio backing track 9 of FIGS. 18 and 19 and the outputs of the distortion effect emulation module 41 and the feedback effect emulation module 42 respectively.

Figure 23A:
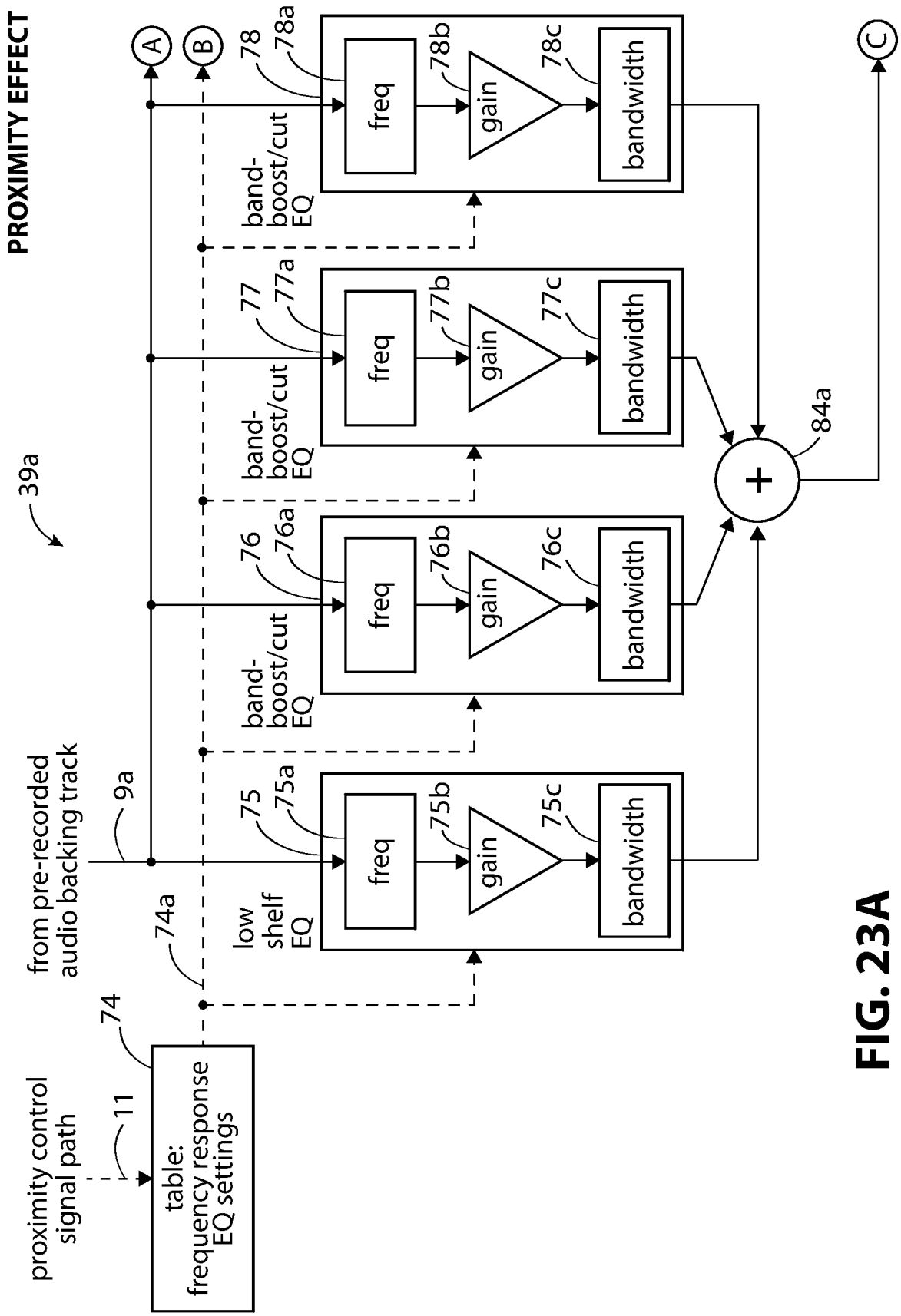
FIG. 23A illustrates a simplified block diagram of a first portion of the proximity emulation module of FIG. 18 or 19.
Figure 23B:
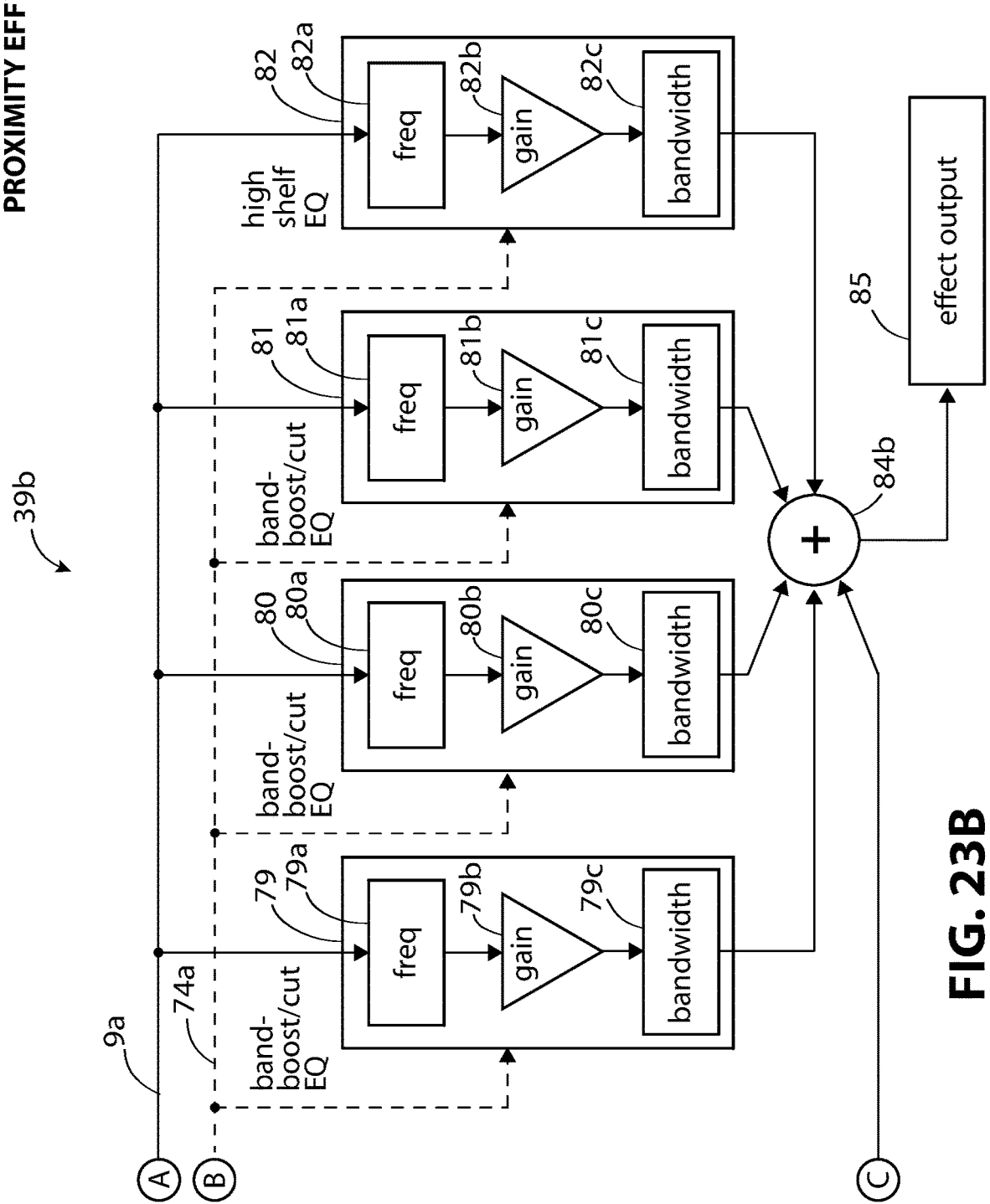
FIG. 23B illustrates a simplified block diagram of a second portion of the proximity emulation module of FIG. 18 or 19.

FIGS. 23A and 23B show an implementation of the proximity effect emulation module 33 of FIGS. 18 and 19 in a simplified block diagram 39*a*, 39*b*. FIGS. 23A and 23B should be viewed together as a single diagram with corresponding capital letters A, B, and C surrounded by a circle on each sheet representing common points or continuations from the previous sheet. Referring to FIG. 23A, based on proximity data from the control signal lithe frequency response lookup table 74 adjusts audio filters to shape the frequency response in real-time to create a distance-based frequency response curve. Referring to FIGS. 23A and 23B, the control signal 74*a* generated from the frequency response lookup table 74, controls a low-shelf equalizer 75, band-boost/cut equalizers 76, 77, 78, 79, 80, 81, and a high shelf equalizer 82. Each can include a frequency parameter, a gain parameter, and a bandwidth parameter that is controlled by the control signal 74*a* from the frequency response lookup table 74 in response to the proximity data from the control signal 11. For example, the low-shelf equalizer 75 can include a frequency parameter 75*a*, a gain parameter 75*b*, and a bandwidth parameter 75*c*. The band-boost/cut equalizers 76, 77, 78, 79, 80, 81 can include frequency parameters 76*a*, 77*a*, 78*a*, 79*a*, 80*a*, 81*a*, a gain parameter 76*b*, 77*b*, 78*b*, 79*b*, 80*b*, 81*b*, and a bandwidth parameter 76*c*, 77*c*, 78*c*, 79*c*, 80*c*, 81*c*. The high shelf equalizer 82 can include a frequency parameter 82*a*, a gain parameter 82*b*, and a bandwidth parameter 82*c*. The resulting outputs from the low-shelf equalizer 75, the band-boost/cut equalizers 76, 77, 78, 89, 80, 81, and the high shelf equalizer 82 are summed 84*a*, 84*b*, producing the proximity effect module output signal 85.

FIGS. 23A and 23B illustrates an eight-band equalizer an example of a configuration that could be used emulate proximity effect. Other configurations are possible. For example, as few as a single-band equalizer centered about the proximity boost frequency could simulate the proximity effect boost. As few as three-band equalizer: one high-frequency shelving, low-frequency shelving, and one mid-band centered about the proximity-effect boost frequency could simulate high frequency roll-off, low frequency roll-off, and proximity effect. A four-band equalizer: one high-frequency shelving, low-frequency shelving, and one mid-band centered about the proximity-effect boost frequency (typically about 200 Hz.), one mid-band centered about the presence rise frequency (typically about 5 kHz.) could emulate high frequency roll-off, low frequency roll-off, proximity effect, and the high-frequency peak common in vocal microphones known as presence. Note that with the careful use of bandwidth or Q with the high-shelf equalizer, a three-band equalizer can also low-frequency roll-off, high-frequency roll-off, proximity effect, and presence.

Figure 24:
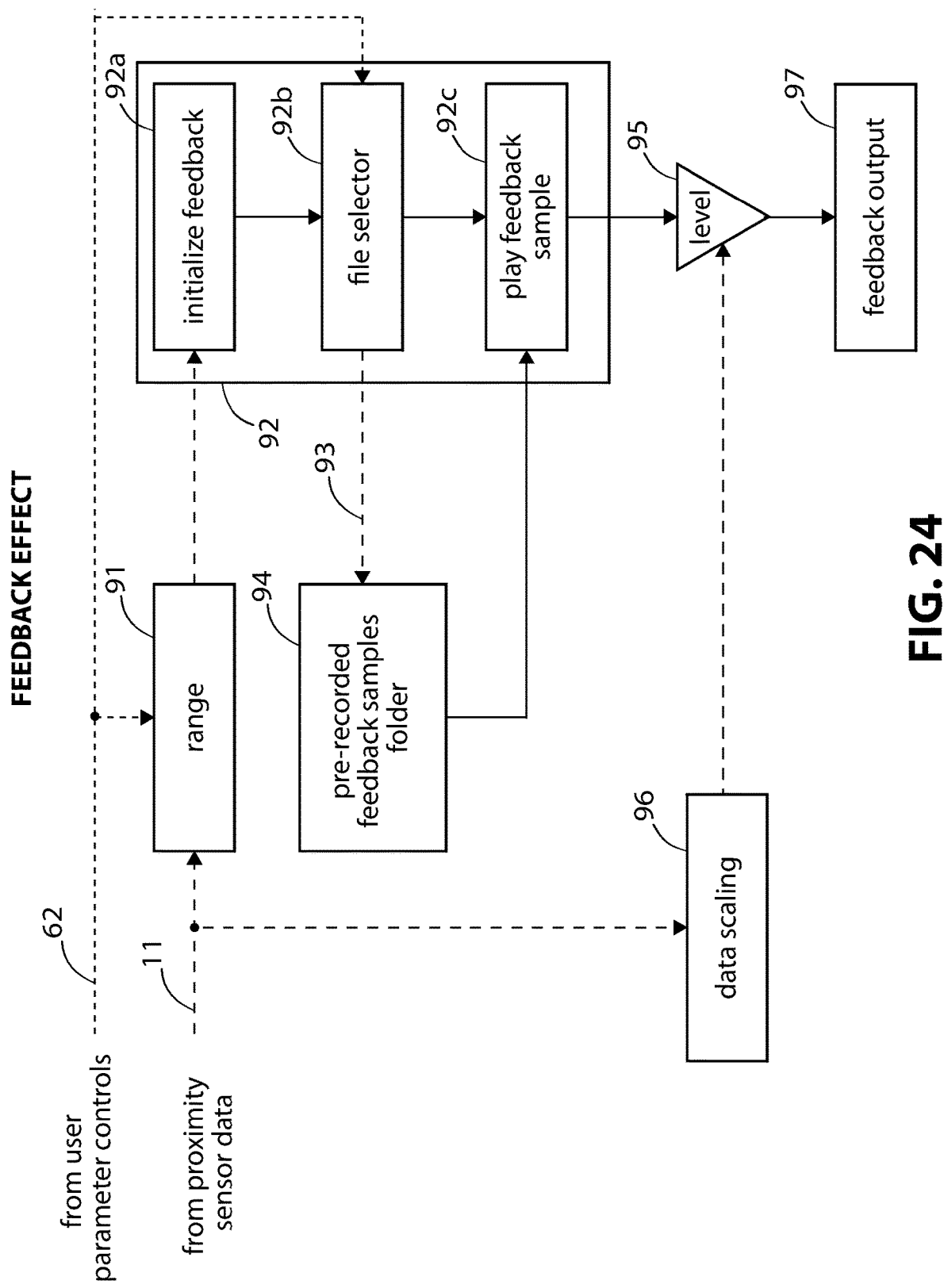
FIG. 24 illustrates a simplified block diagram of the feedback effect emulation module of FIG. 18 or 19.

FIG. 24 illustrates a simplified block diagram of the feedback effect emulation module 42 of FIGS. 18 and 19 that produces simulated microphone feedback. Referring to FIG. 24, based on proximity data from the control signal 11, a range module 91 compares the proximity data from the control signal 11 to a pre-determined distance range. The pre-determined distance range is typically determined by the control signal 62 by the user parameter controls 22 from FIGS. 18 and 19. If the proximity data is within the pre-determined range the feedback sound generator 92 initializes the feedback sequence 92*a*, selects the file via a file selector module 92*b*, selects 93 and plays a pre-recorded feedback sound sample 92*c* from the pre-recorded feedback samples folder 94. The output signal level of feedback sound generator 92 is scaled by a level control 95. A data scaling module 96 uses the proximity data from the control signal 11 to control the level control 95 and scale the feedback output 97. The file selector module 92*b* can use input from the character control 73*c* or probability control 73*b* of FIG. 22 via control signal 62 from the user parameter controls 22 of FIGS. 18 and 19. The file selector could also use a random or pseudo-random number generator to select the pre-recorded feedback sample from the pre-recorded feedback samples folder 94.

Figure 25:
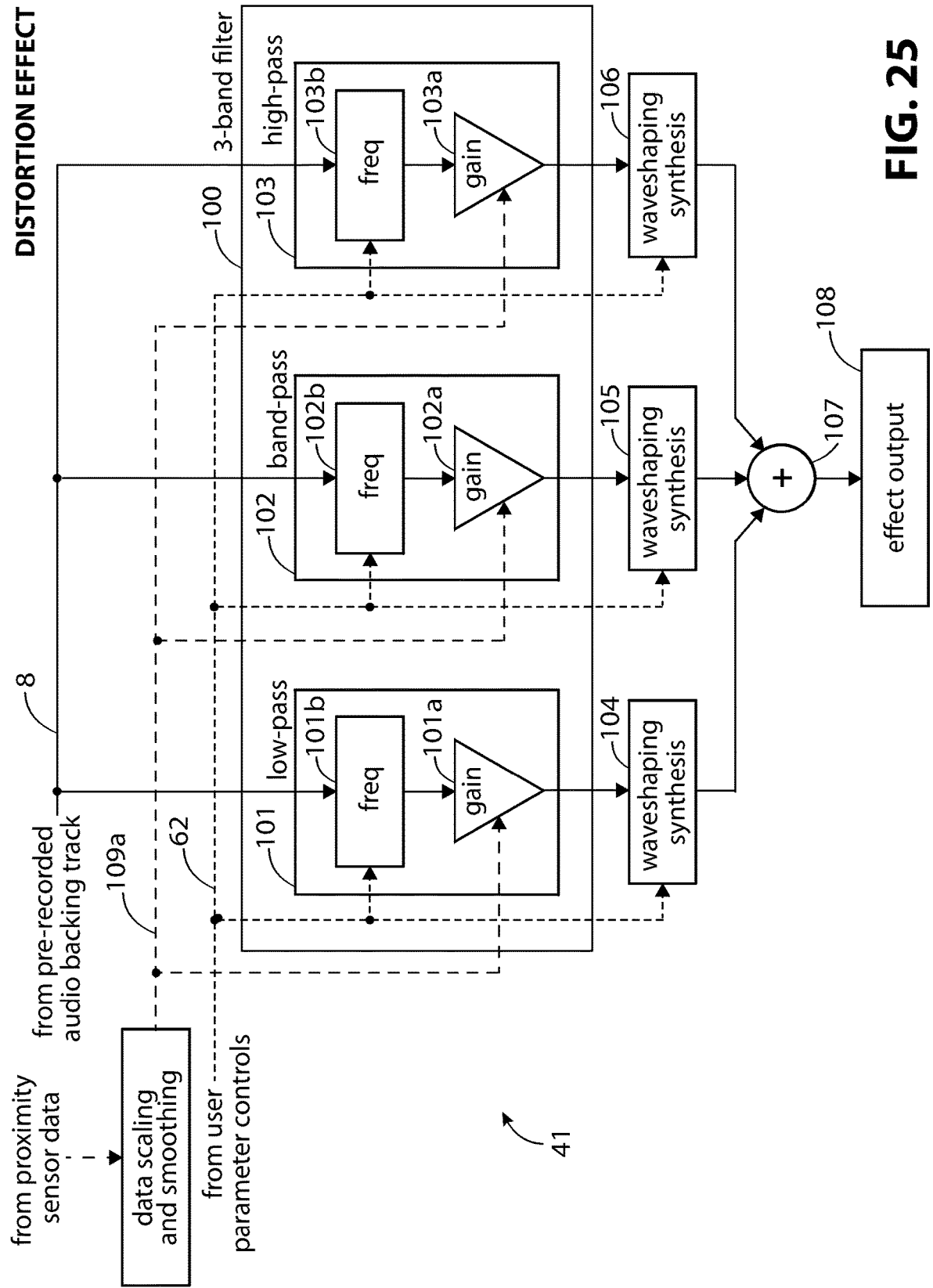
FIG. 25 illustrates a simplified block diagram of the distortion effect emulation module of FIG. 18 or 19.

FIG. 25 illustrates a simplified block diagram of a typical implementation of the distortion effect emulation module 41 illustrated in FIG. 18 or 19. Referring to FIG. 25, the distortion effect can be created by feeding the audio data stream 8 from the pre-recorded audio backing track into a multi-band audio filter 100. In FIG. 25, the multi-band audio filter 100 is illustrated as a three-band filter with a low-pass filter 101, band-pass filter 102, and high-pass filter 103. The outputs of the low-pass filter 101, band-pass filter 102, and high-pass filter 103 feed the wave-shaping synthesizers 104, 105, 106, respectively. The wave-shaping synthesizers 104, 105, 106 creates the distortion effect by adding harmonics to the low-pass filter 101, band-pass filter 102, and high-pass filter 103 outputs. The output of the wave-shaping synthesizers 104, 105, 106 are summed 107 to create the distortion effect output 108. The low-pass filter 101, band-pass filter 102, and high-pass filter 103 each include a gain adjustment 101*a*, 102*a*, 103*a* and frequency adjustment 101*b*, 102*b*, 103*b*, respectively. A control signal 109*a* from a data scaling module 109 adjusts the gain of each of the filter components based on data it receives from the control signal 11 based on the dynamic distance data stream 12 of FIG. 18 or 19. The frequency adjustments 101*b*, 102*b*, 103*b* and the wave-shaping synthesizers 104, 105, 106 can optionally be controlled by the control signal 62 from the user parameter controls 22 of FIGS. 18 and 19.

Figure 26:
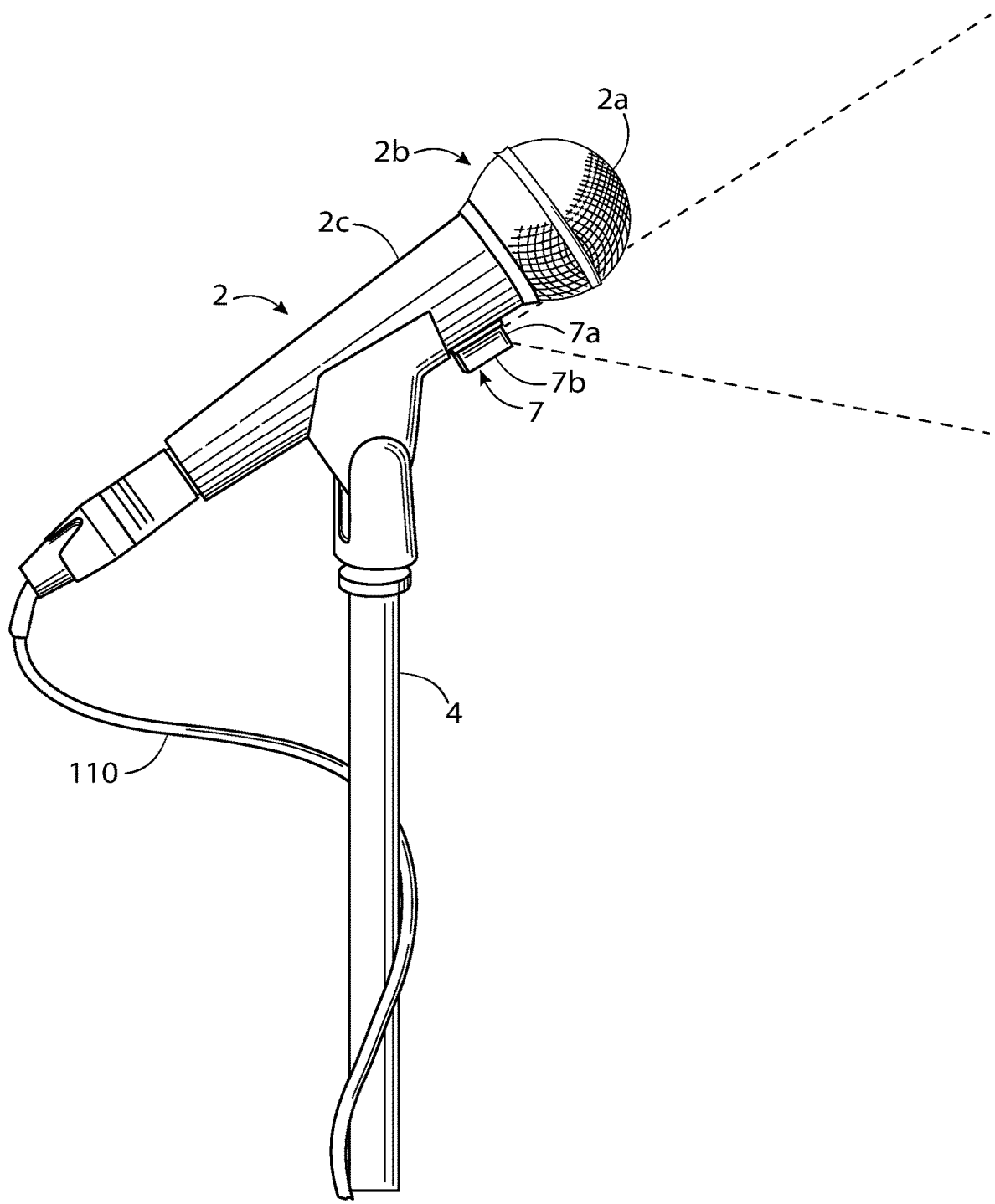
FIG. 26 illustrates a microphone and microphone stand where the proximity sensor assembly is mounted on the body of the microphone.

FIGS. 26-29 illustrate different ways the proximity sensor assembly 7 can be mounted a fixed distance from the end 2*a* of the microphone grille 2*b*. In FIG. 26 the stage microphone 2 is mounted to a microphone stand 4 and the proximity sensor assembly 7 is mounted on the microphone body 2*c*. The proximity sensor assembly 7 can include an enclosure 7*b* that houses the proximity sensor 7*a*, a circuit board to hold circuitry associated with the proximity sensor 7*a*, and a battery for supplying power to the proximity sensor and circuit board. The enclosure 7*b* can be secured to the microphone body 2*c* by any structure that allows the enclosure 7*b* to stay secured to the microphone body 2*c* under the normal operation of a live musical performance. For example, the enclosure 7*b* can be directly secured by adhesive or an adhesive strip affixed to the underside of the proximity sensor assembly 7. The enclosure 7b can be flanged with the flange screwed into the microphone body 2c. The enclosure 7b can be secured to the microphone body 2c by a tension band. The proximity sensor 7a is shown as wireless and not requiring a cable. The stage microphone 2 is shown as a wired microphone requiring a cable 110 for routing the audio signal. One advantage of this configuration is that the vocalist or performer can remove the stage microphone 2 from the microphone stand 4 during a live performance, but still be able to take advantage of proximity dependent lip-synchronized level and effects previously described because the proximity sensor 7a remains attached a fixed distance from the end 2a of the microphone grille 2b and therefore the distance to the performer's face or lips can be measured.

Figure 27:
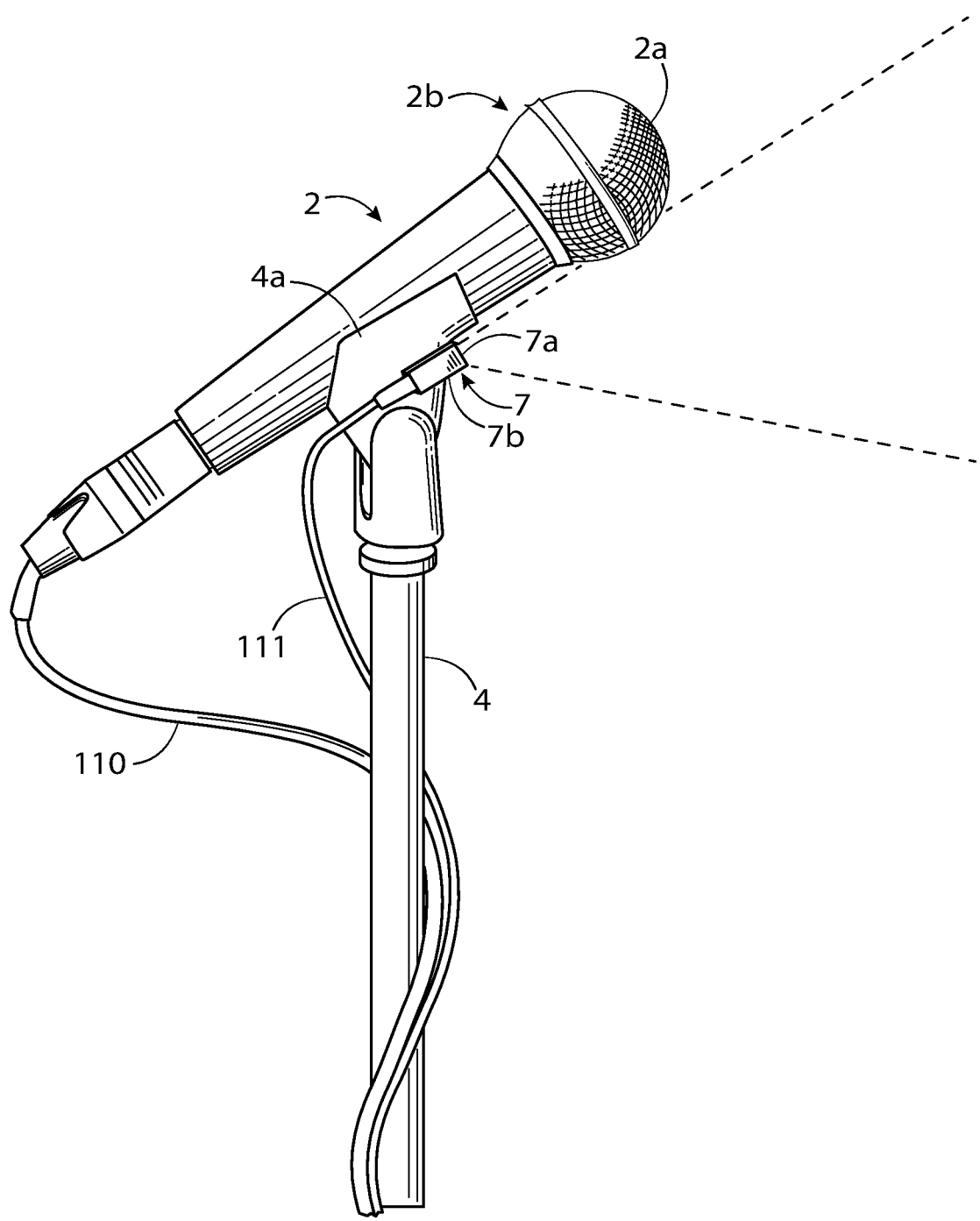
FIG. 27 illustrates a microphone and microphone stand where the proximity sensor assembly is mounted on the microphone clip.

In FIG. 27 the enclosure 7b of the proximity sensor assembly 7 is mounted to a microphone clip 4a that attaches stage microphone 2 to the microphone stand 4. Here the proximity sensor 7a and the stage microphone 2 are both shown as wired, and requiring the cables 110, 111 to transmit both the audio signal and the dynamic distance data stream 12 of FIGS. 7, 18, and 19. The enclosure 7b can be secured to the microphone clip 4a by any structure that allows the enclosure 7b to stay secured to the microphone clip 4a under the normal operation of a live musical performance. For example, the enclosure 7b can be directly secured by adhesive or an adhesive strip affixed to the underside of the proximity sensor assembly 7. The enclosure 7b can be flanged with the flange screwed into the microphone clip 4a. This arrangement requires that the stage microphone 2 remain mounted to the microphone stand 4 since the proximity sensor assembly 7 is secured to the microphone clip 4a. One advantage of this arrangement is that proximity sensor 7a is not as shadowed or potentially blocked by the microphone windscreen as in the example shown in FIG. 26.

Figure 28:
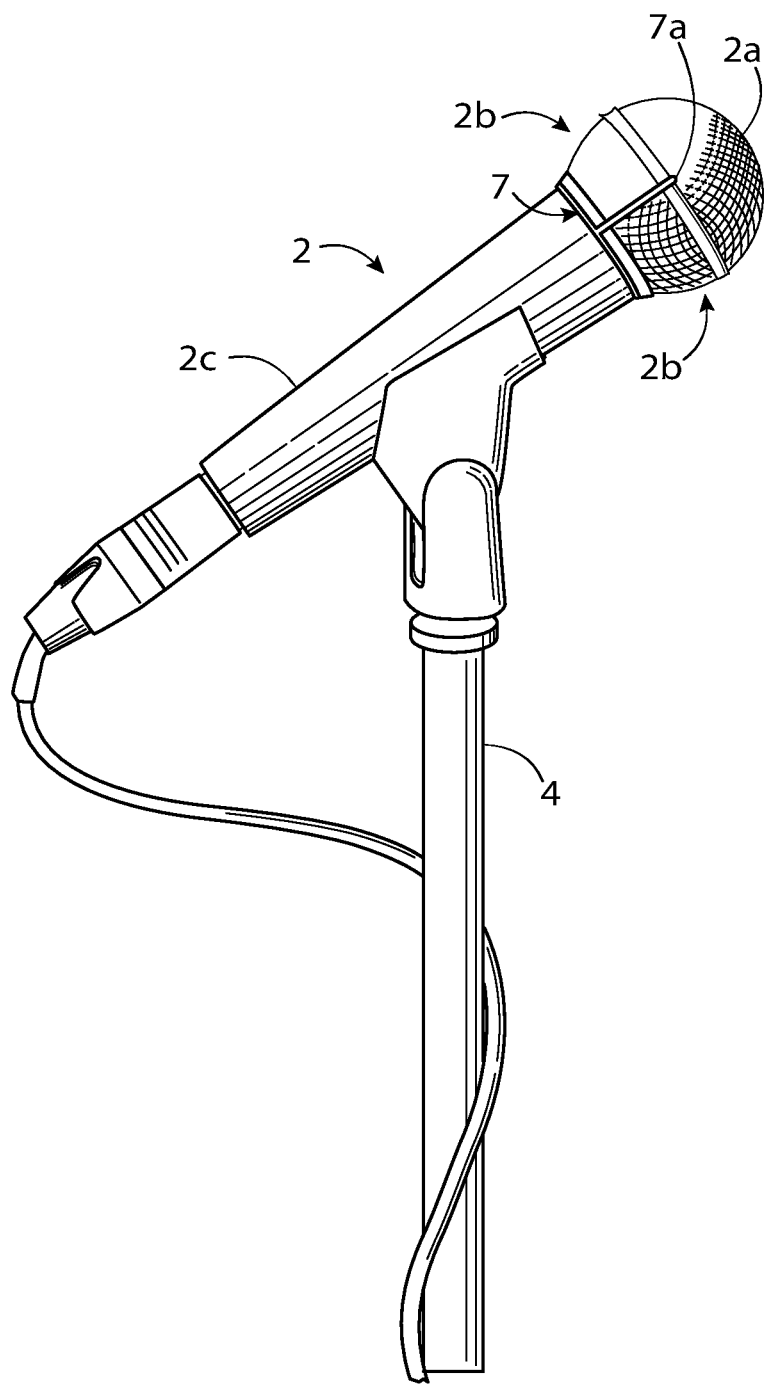
FIG. 28 illustrates a microphone and microphone stand where the proximity sensor assembly is mounted partially within the body of the microphone with the proximity sensor extending out of the microphone body and upward around the bottom half of the windscreen.

FIG. 28 illustrates a stage microphone 2 and microphone stand 4 where the proximity sensor assembly 7 is mounted partially within the body of the microphone with the proximity sensor 7a extending out of the microphone body 2c and upward around the bottom half of the microphone grille 2b. As with the example of FIG. 26, this configuration can be advantageous when the vocalist or performer uses the microphone with and without the microphone stand 4 during a performance because the proximity sensor assembly 7 is secured directly to the stage microphone 2 and therefore maintains a constant and known distance from the end 2a of the microphone grille 2b. This configuration also avoids any shadowing or blocking of the proximity sensor 7a by the microphone grille 2b.

Figure 29:
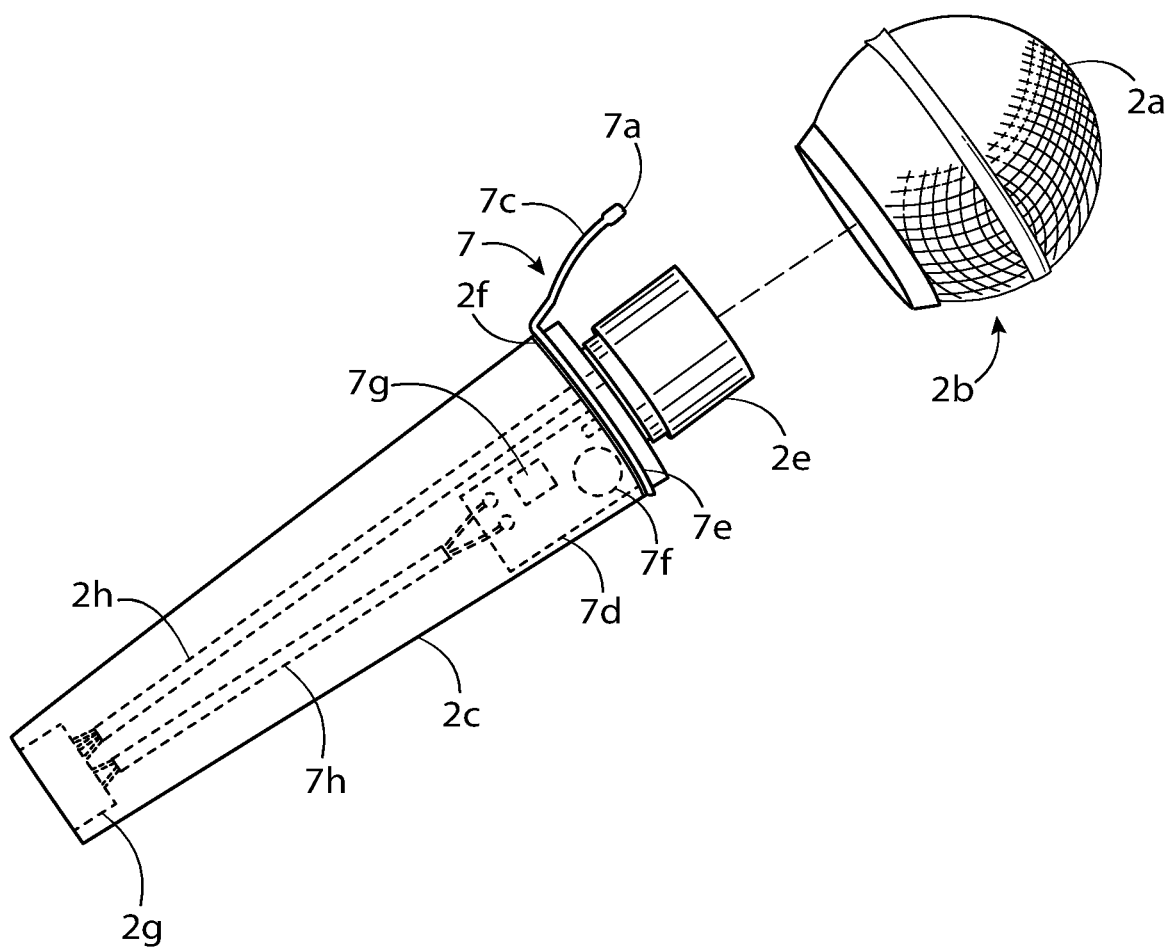
FIG. 29 illustrates a partially exploded view of the microphone and proximity sensor assembly of FIG. 27 with the hidden elements illustrated in dashed lines.

FIG. 29 illustrates a partially exploded view of the stage microphone 2 and proximity sensor assembly 7 of FIG. 28. The microphone grille 2b is exploded away revealing the microphone capsule 2e and the proximity sensor assembly 7 including elements hidden from view in FIG. 28. Hidden elements are illustrated as dashed lines. Referring to FIG. 29, the proximity sensor 7a is mounted at the end of a mounting arm 7c. The mounting arm 7c can be made of a material that is flexible but able to hold its shape. For example, the mounting arm could be made from hollow flexible conduit. This would allow electric wires to pass through the mounting arm 7c to the printed circuit board 7d that is housed within the microphone body 2c. This also allows the mounting arm 7c to be shaped by the sound engineer to conform to the outside of the microphone grille 2b. The mounting arm 7c includes a ring-shaped base 7e that seats on the windscreen mounting flange 2f. The printed circuit board 7d includes circuitry associated with the proximity sensor 7a; for example, a battery 7f or integrated circuits 7g. The integrated circuits 7g could include a microcontroller, field programmable gate array (FPGA), a programmable logic device (PLD), or a function-specific integrated circuit. Examples of function-specific integrated circuits include a I2C or I2S to USB converter or an I2C or I2S to wireless converter. The output of the printed circuit board 7d can optionally include proximity module output wires 7h that feed a microphone output connector 2g. For example, the microphone output connector 2g could be a five-pin XLR connector. A five-pin XLR connector can accommodate the internal microphone cable 2h and the proximity module output wires 7h. This configuration may be desirable where only the proximity data is being transmitted from the microphone and not a live microphone signal. If a live microphone signal is also transmitted, care should be taken to avoid cross-talk between the proximity data and the audio signal since a microphone signal typically has a signal level in the millivolt range and may be susceptible to cross-talk.

Figure 30:
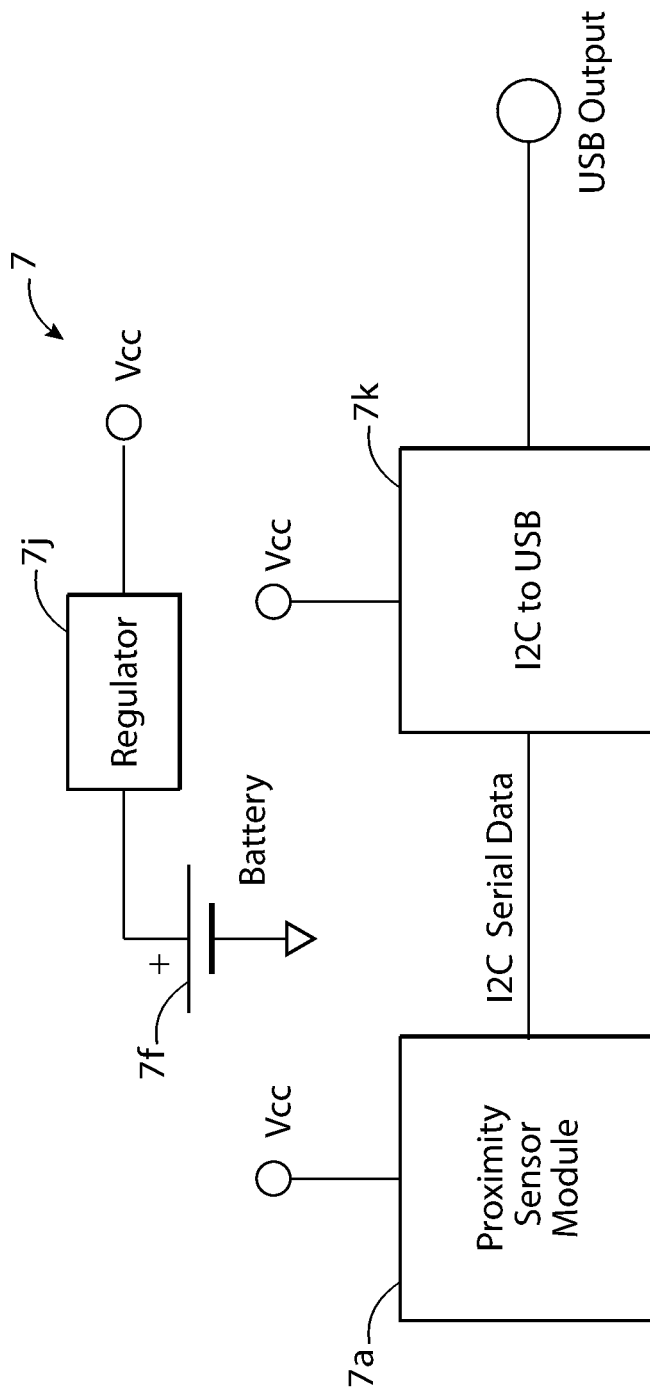
FIG. 30 illustrates a simplified electrical block diagram of the proximity sensor assembly where the proximity data is transmitted via USB or other wired computer protocols.
Figure 31:
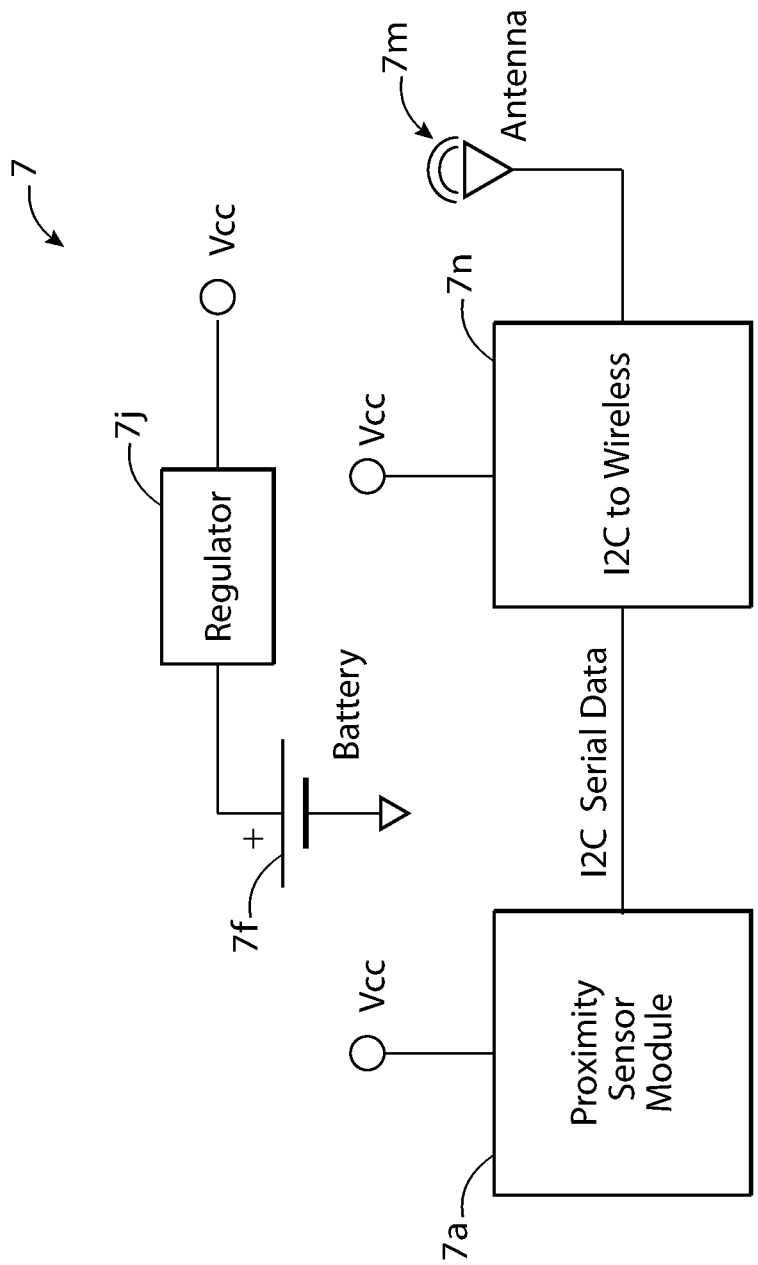
FIG. 31 illustrates a simplified electrical block diagram of the proximity sensor assembly where the proximity data is transmitted via a wireless antenna.
Figure 32:
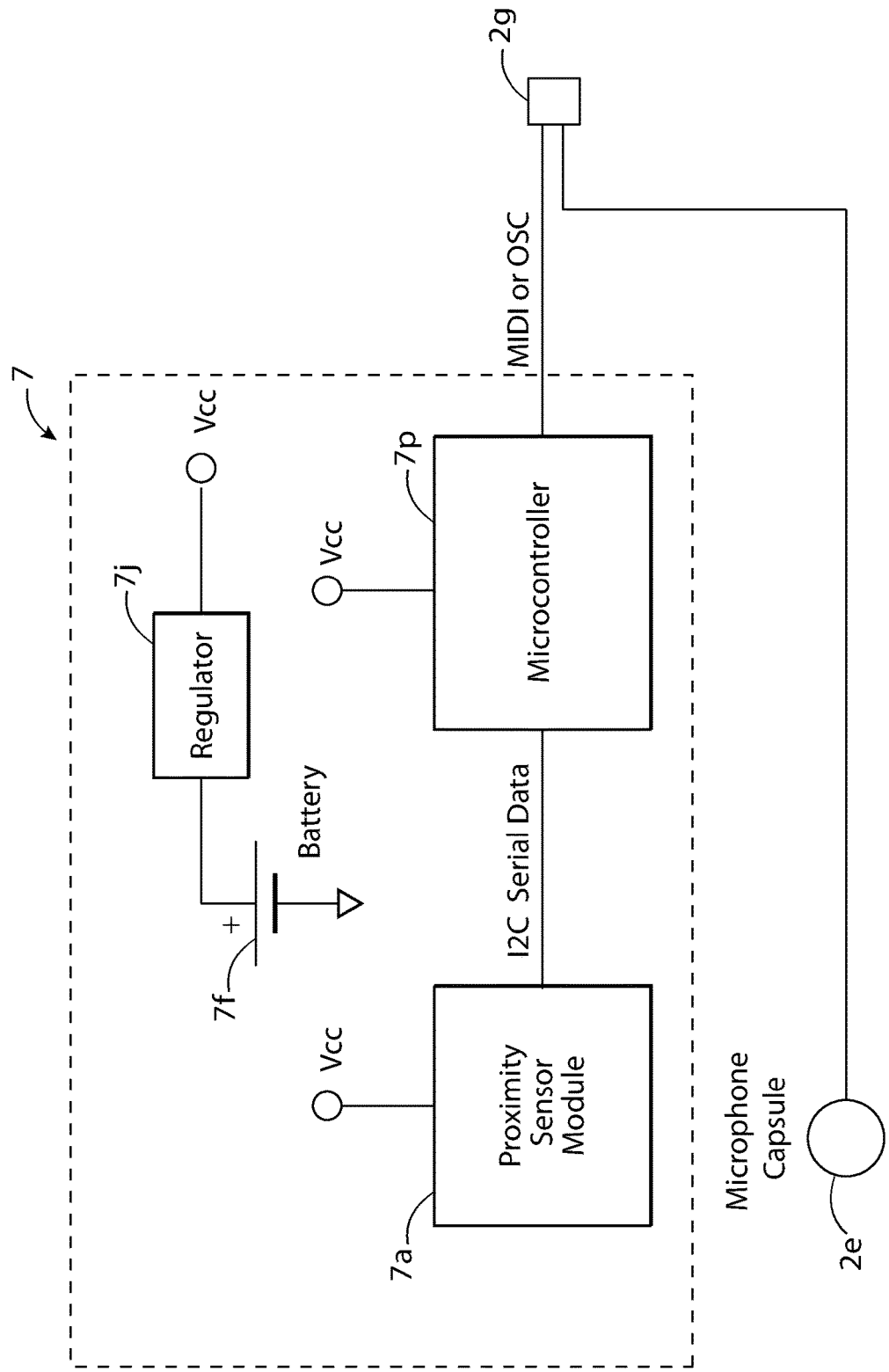
FIG. 32 illustrates a simplified electrical block diagram of the proximity sensor assembly and microphone where the proximity data is transmitted from the microphone using standard audio control protocols such as MIDI or OSC.

FIGS. 30-32 illustrate examples of simplified electrical circuit diagrams for the proximity sensor assembly 7. Referring to FIGS. 30-32, the proximity sensor 7a is typically powered by an internal power supply such as the battery 7f and voltage regulator 7j illustrated. The proximity data can be transmitted by USB or another wired computer protocol. For example, in FIG. 30 the proximity data from the proximity sensor 7a is illustrated as I2C serial data. This can be converted to USB by an I2C to USB data via a FPGA, microprocessor, PLD, or a dedicated device such as the illustrated I2C to USB serial converter 7k. Examples of I2C to USB serial converters include the MCP2221A from Microchip Technology, Inc. or a TUSB3410 from Texas Instruments Incorporated. The proximity sensor data can also be transmitted wirelessly. For example, in FIG. 31, I2C data from the proximity sensor 7a is converted to wireless data via a microcontroller or a wireless data converter 7n, such as 802.11 and transmitted via an antenna 7m. An example of a wireless data converter 7n is the CYW43903 by Cypress Semiconductor. It may be desirable to convert the proximity sensor data directly to a standard audio control protocol such as MIDI or OSC. FIG. 32 illustrates serial data from the proximity sensor 7a feeding a microcontroller 7p. The microcontroller includes instructions stored in memory such as internal or external FLASH memory that when executed cause the microcontroller to convert the serial data from the proximity sensor 7a to MIDI or OSC. FIG. 32 also illustrates an example of a simplified electrical diagram for FIG. 29 where the output of the microphone capsule 2e and the output of the microcontroller 7p can both feed the microphone output connector 2g.

Figure 33:
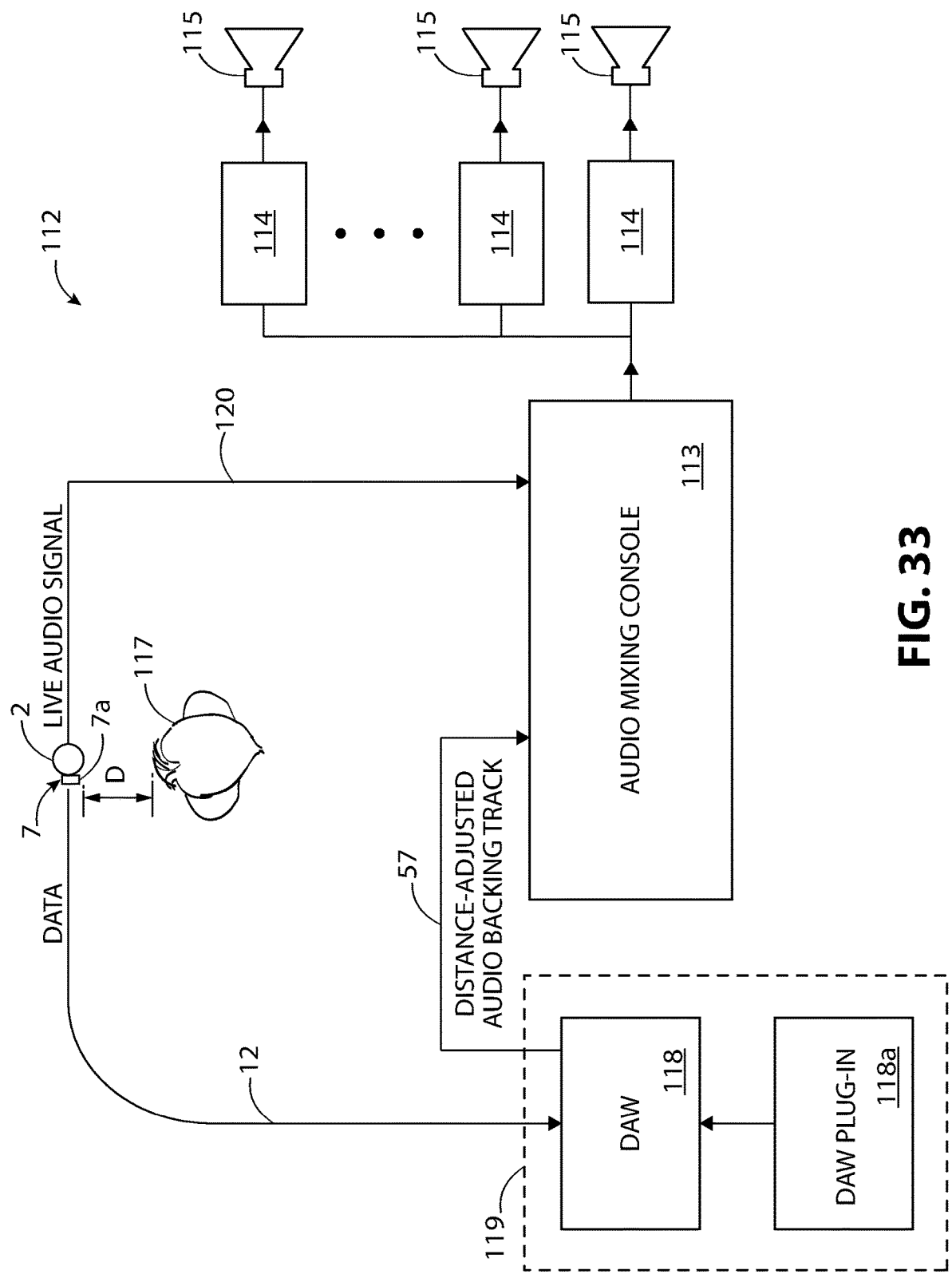
FIG. 33 illustrates a simplified system block diagram where the distance-applied level and effects emulation is processed within a digital audio workstation.
Figure 34:
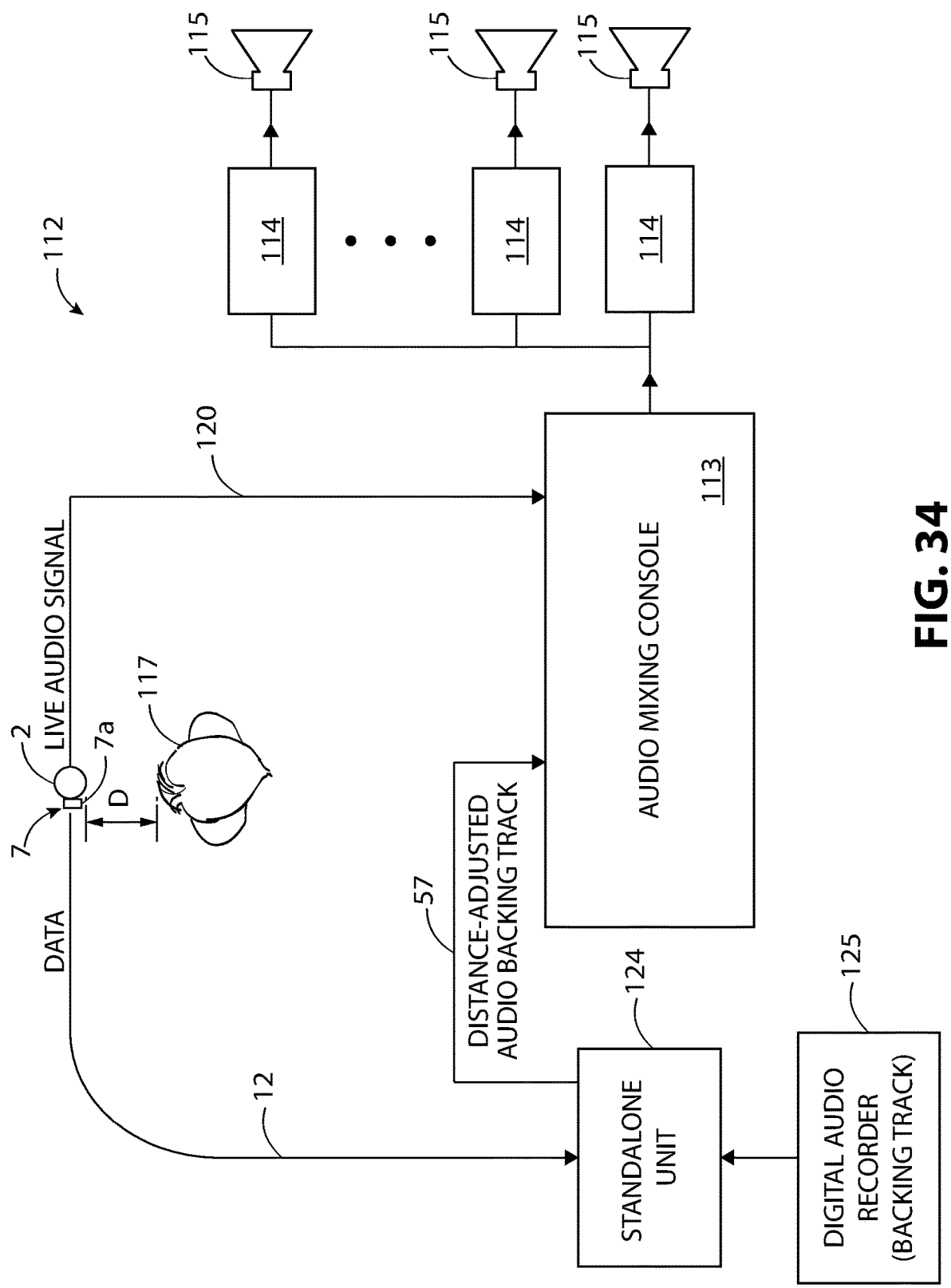
FIG. 34 illustrates a simplified system block diagram where the distance-applied level and effects emulation is processed within a standalone unit.
Figure 35:
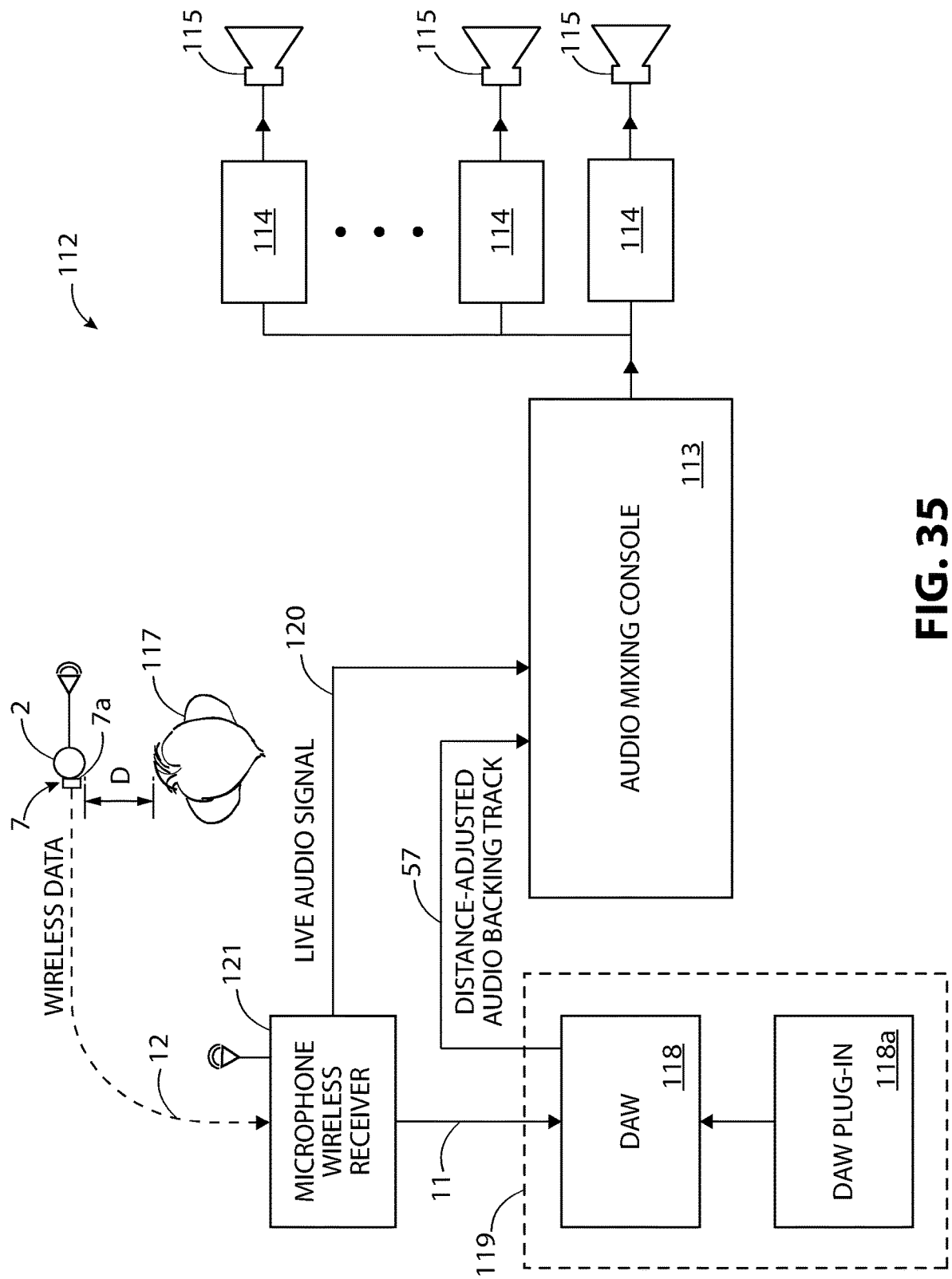
FIG. 35 illustrates a simplified system block diagram where the distance-applied level and effects emulation is processed within a digital audio workstation that receives the proximity sensor data via a wireless microphone receiver.

FIGS. 33-35 illustrate several examples of how the distance-applied level and effects emulation system can be applied in a live sound environment, which typically includes an audio mixing console 113 (i.e., a live sound mixing console or front of house mixing console), audio amplifiers 114, and speakers 115. In each of the examples, the vocalist 117 is positioned a distance D from the proximity sensor 7a of the proximity sensor assembly 7. The proximity sensor assembly 7 is mounted in a fixed distance relationship with stage microphone 2. For example, the proximity sensor assembly can be affixed to the stage microphone 2 or the microphone clip as previously described. FIG. 33 illustrates a simplified system block diagram 112 where distance-applied level and effects emulation is processed within a digital audio workstation 118 as a plugin 118a. The digital audio workstation 118 can be a standalone unit or can be hosted on a computer 119 as illustrated. Examples of digital audio workstations 118 running hosted on a computer 119 are Pro Tools by Avid Technology Inc., Ableton Live by Ableton AG, and Digital Performer by Mark of the Unicorn. The plugin 118a can be written in a standard or proprietary format. Standard formats include Virtual Studio Technology (VST), Audio Units, and TDM. The dynamic distance data stream 12, or alternatively the control signal 11, from the proximity sensor 7a can be transmitted to the computer 119 hosting the digital audio workstation 118 by wire or wirelessly; for example, by USB or 802.11. The audio output 57 feeds an input of the audio mixing console 113. This can be either an analog signal or a digital audio signal such AES/EBU. Optionally, a live audio signal 120 can feed an input channel of the audio mixing console 113 so the vocal performance can be mixed with the pre-recorded audio backing track as previously discussed.

Referring to FIG. 34, the distance-applied level and effects emulation is processed within a standalone unit 124. The standalone unit may include the pre-recorded audio backing tracks 9 of FIGS. 7, 18, and 19 in internal storage or use an external storage unit such as a hard drive, flash memory, or a digital audio recorder 125, as illustrated. The standalone unit 124 can receive the control signal 11, such as MIDI, or OSC, directly processed by proximity sensor assembly 7. Alternatively, the standalone unit 124 can receive the dynamic distance data stream 12 from the proximity sensor assembly 7 and convert it to MIDI, OSC, or other standard control signal protocol. The audio output 57 representing the audio data stream 8 of the pre-recorded audio backing track 9 of FIGS. 7, 18, and 19, with distance-applied level and effects emulation, feeds an input channel of the audio mixing console 113. The live audio signal 120, if required, can be optionally fed from the stage microphone 2 to the audio mixing console 113. The standalone unit 124 can include an integrated digital audio mixer. In that case, the live audio signal 120 can optionally be pre-mixed and the combined single sent to the audio mixing console 113.

Referring to FIG. 35, in the case of a wireless microphone, for example, the stage microphone 2 of FIGS. 1 and 2, the dynamic distance data stream 12 (or control signal 11) can be transmitted together with a wireless audio signal to a wireless microphone receiver 121. The live audio signal 120, if required can be optionally fed from the wireless microphone receiver to the audio mixing console 113. The audio output 57 from the digital audio workstation 118, that represents the distance-adjusted pre-recorded audio backing track, feeds an input channel on the audio mixing console 113. The dynamic distance data stream 12 can be fed from the wireless microphone receiver 121 to the computer 119 hosting the digital audio workstation 118 and plugin 118a. The wireless microphone receiver 121 can optionally include the control signal protocol conversion module of FIGS. 7, 18, and 19. In that case, the control signal 11, that results from the dynamic distance data stream 12, can be fed to the computer 119, as illustrated. If the digital audio workstation is a standalone device, the dynamic distance data stream 12 can be sent directly from the wireless microphone receiver 121 to the digital audio workstation 118.

Figure 36:
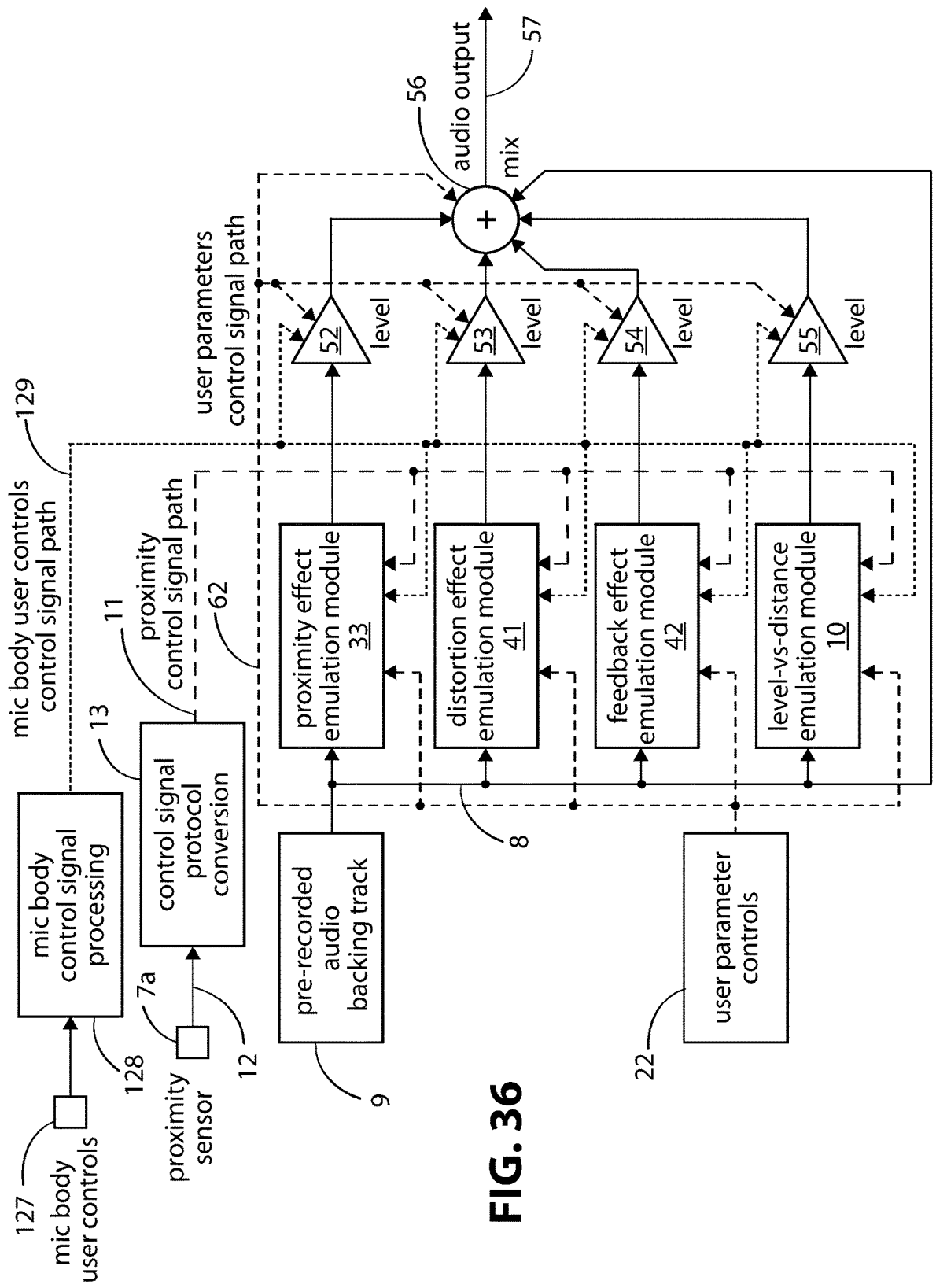
FIG. 36 illustrates an alternative simplified block diagram of the distance-applied level, proximity effect, distortion effect, and feedback effect emulation that includes user controls on the microphone.
Figure 37:
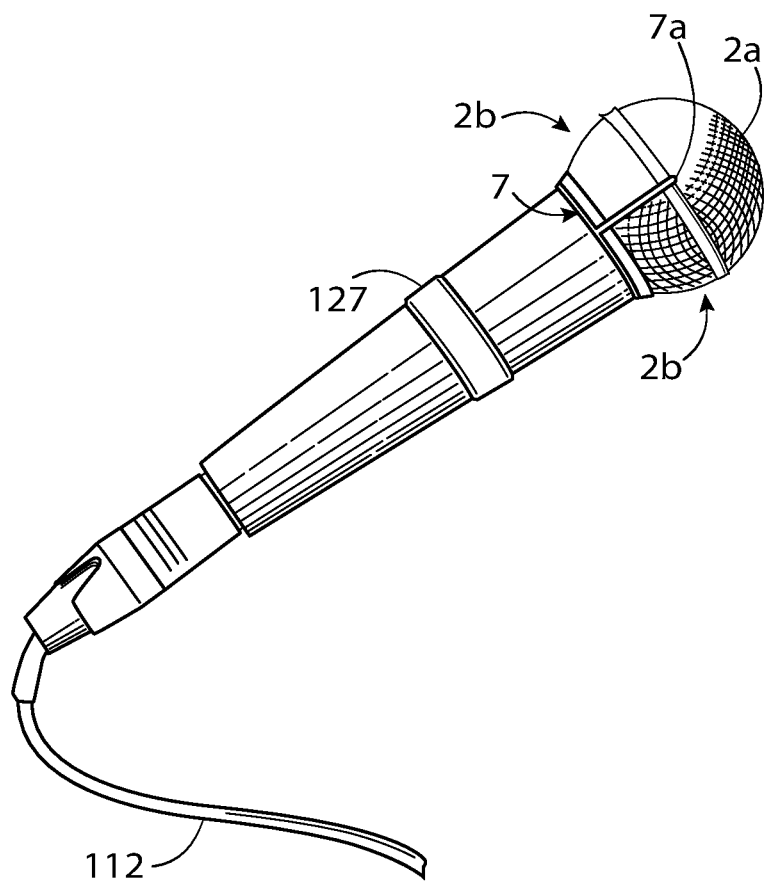
FIG. 37 illustrates a microphone with user controls on the microphone.
Figure 38:
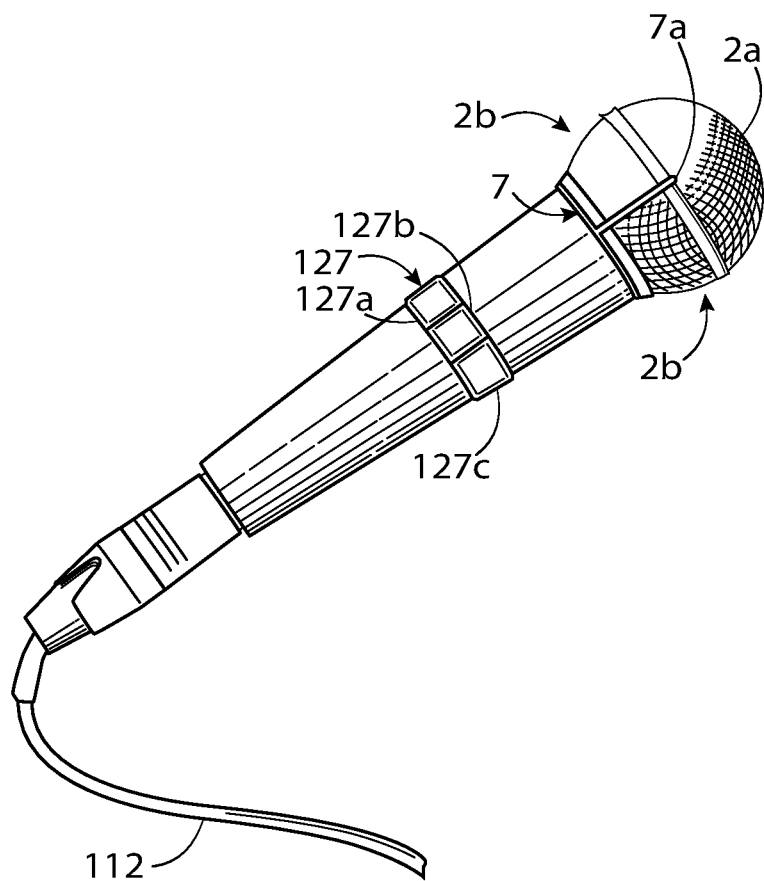
FIG. 38 illustrates a microphone with an alternative set of user controls on the microphone.

There may be circumstances where the performance can be enhanced by having the vocalist or other performer have some control over the distortion, feedback, or proximity effect. For example, the vocalist 3 of FIGS. 1 and 2 may purposely want to over exaggerate proximity effect as they move the stage microphone 2 close to their lips. FIG. 36 illustrates a block diagram of a distance-applied level and effects emulation system with user controls 127 on the stage microphone. FIGS. 37 and 38 illustrate two examples of user controls 127 mounted on the microphone body 2c of a stage microphone 2. Referring to FIGS. 37 and 38, the user controls 127 can be molded into or around the microphone body 2c as illustrated. The user controls 127 can include switches under a rubberized protective covering. Alternatively, the user controls 127 can use a force sensor or force sensors to control effect intensity; for example, to control the intensity of feedback or proximity effect. Suitable force sensors could include force sensing resistors or piezoelectric forces sensors. FIG. 37 illustrates a user control 127 surrounding the circumference of the microphone body 2c. FIG. 38 illustrates the user controls as having control zones 127a, 127b, 127c. These three control zones can be used to control different effects, for example proximity effect, feedback, or distortion. They could alternatively be used to control different parameters of a single effect. For example, the peak frequency and intensity of a proximity effect. The illustration of user control 127 in FIG. 37 or the user control 127 with three of the control zones 127a, 127b, 127c in FIG. 38 are examples of what is possible other combinations of control zones and user controls mounted to a microphone are possible. In addition, while the user control 127 in FIGS. 37 and 38 are illustrated as surrounding the circumference of the microphone body 2c, other configurations are possible, for example a simple switch secured within or on the surface of the microphone body 2c.

Referring to FIG. 36, the system diagram is nearly identical to the system diagram of FIG. 19 except for the addition of user controls 127, user control signal processing module 128, and the control signal 129. The proximity sensor 7a, the audio data stream 8, the pre-recorded audio backing track 9, the control signal 11, the control signal protocol conversion module 13, the level-versus-distance emulation module 10, the user parameter controls 22, the proximity effect emulation module 33, the distortion effect emulation module 41, the feedback effect emulation module 42, level control modules 52, 53, 54, 55, the summer 56, and the audio output 57 are as described for FIG. 19. The performer or vocalist activates the user controls 127 on the microphone body 2c of FIGS. 38 and 39. The user control data from the user controls 127 is converted into a usable control format via the user control signal processing module 128. If the user control data from the user controls 127 is already in a usable control format, this module can be eliminated. The control signal 129 can feed the proximity effect emulation module, the distortion effect emulation module, the feedback effect emulation module, or the level control modules 52, 53, 54, 55 in order to control one or more user parameters, as described above. The system diagram of FIG. 36 illustrates how the user controls 127 can be applied to the system diagram of FIG. 19. In a similar manner, the user controls 127 can be applied to the system diagram of FIGS. 7 and 18.

The inventors envision the following additional embodiments, labeled below as examples, are also within the scope of the distance-applied level and effects emulation described within this disclosure.

Example 1

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer;
a non-transitory computer readable medium including instructions stored therein that when executed by a processor cause the processor to dynamically modify an audio data stream of a pre-recorded audio backing track in response to the dynamic distance data stream.

Example 2

The system of Example 1, wherein:
the instructions stored in the non-transitory computer readable medium cause the processor to dynamically adjust a signal level of the audio data stream inversely with the distance in response to the dynamic distance data stream.

Example 3

The system of Example 1, wherein:
the instructions stored in the non-transitory computer readable medium cause the processor to dynamically adjust a signal level of the audio data stream in such a way that emulates distance-dependent changes in microphone level.

Example 4

The system of Example 1, wherein:
the instructions stored in the non-transitory computer readable medium cause the processor to dynamically adjust a low frequency response of the audio data stream inversely with the distance, in response to the dynamic distance data stream.

Example 5

The system of Example 1, wherein:
the instructions stored in the non-transitory computer readable medium cause the processor to dynamically adjust a frequency response of the audio data stream in response to the dynamic distance data stream in such a way that emulates distance-dependent proximity effect.

Example 6

The system of Example 1, wherein:
the instructions stored in the non-transitory computer readable medium cause the processor to dynamically add distortion to the audio data stream in response to the dynamic distance data stream in such a way that emulates distance-dependent microphone distortion.

Example 7

The system of Example 1, wherein:
the instructions stored in the non-transitory computer readable medium cause the processor to dynamically add simulated microphone feedback to the audio data stream in response to the dynamic distance data stream in such a way that emulates distance-dependent microphone feedback.

Example 8

A method for enhancing a lip-synchronized performance of a performer utilizing a stage microphone, comprising:
receiving a dynamic distance data stream generated by a proximity sensor, the proximity sensor secured in a fixed relationship with the stage microphone, the dynamic distance data stream representing a distance between the proximity sensor and the performer; and
dynamically modifying an audio data stream of a pre-recorded audio backing track in response to the dynamic distance data stream.

Example 9

The method of Example 8 further comprising:
adjusting a signal level of the audio data stream inversely with the distance in response to the dynamic distance data stream.

Example 10

The method of Example 8 further comprising:
dynamically adjusting a signal level of the audio data stream in such a way that emulates distance-dependent changes in microphone level.

Example 11

The method of Example 8 further comprising:
dynamically adjust a low frequency response of the audio data stream inversely with the distance in response to the dynamic distance data stream.

Example 12

The method of Example 8 further comprising:
dynamically adjusting a frequency response of the audio data stream in response to the dynamic distance data stream in such a way that emulates distance-dependent proximity effect.

Example 13

The method of Example 8 further comprising:
dynamically add distortion to the audio data stream in response to the dynamic distance data stream in such a way that emulates distance-dependent microphone distortion.

Example 14

The method of Example 8 further comprising:
dynamically adding simulated microphone feedback to the audio data stream in response to the dynamic distance data stream in such a way that emulates distance-dependent microphone feedback.

Example 15

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer;
a processor;
a memory to store computer-executable instructions that, if executed, cause the processor to dynamically modify an audio data stream of a pre-recorded audio backing track in response to the dynamic distance data stream.

Example 16

The system of Example 15, wherein:
the processor dynamically adjusts a signal level of the audio data stream inversely with the distance in response to the dynamic distance data stream.

Example 17

The system of Example 15, wherein:
the processor dynamically adjusts a signal level of the audio data stream in such a way that emulates distance-dependent changes in microphone level.

Example 18

The system of Example 15, wherein:
the processor to dynamically adjusts a low frequency response the audio data stream inversely with the distance, in response to the dynamic distance data stream.

Example 19

The system of Example 15, wherein:
the processor dynamically adjusts a frequency response of the audio data stream in response to the dynamic distance data stream in such a way that emulates distance-dependent proximity effect.

Example 20

The system of Example 15, wherein:
the processor dynamically adds distortion to the audio data stream in response to the dynamic distance data stream in such a way that emulates distance-dependent microphone distortion.

Example 21

The system of Example 15, wherein:
the processor dynamically adds simulated microphone feedback to the audio data stream in response to the dynamic distance data stream in such a way that emulates distance-dependent microphone feedback.

Example 22

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer; and a level-versus-distance emulation module dynamically adjusts a signal level of an audio data stream of a pre-recorded audio backing track in response to the dynamic distance data stream.

Example 23

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer; and a level-versus-distance emulation module dynamically adjusts a signal level of an audio data stream of a pre-recorded audio backing track in response to the dynamic distance data stream in such a way that emulates distance-dependent changes in microphone level.

Example 24

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer; and a proximity effect emulation module dynamically adjusts a low frequency response of an audio data stream of a pre-recorded audio backing track inversely with the distance in response to the dynamic distance data stream.

Example 25

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer; and
a proximity effect emulation module dynamically adjusts a frequency response of a pre-recorded audio backing track in response to the dynamic distance data stream in such a way that emulates distance-dependent proximity effect.

Example 26

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer; and
a distortion effect emulation module dynamically adds distortion to audio data stream of a pre-recorded audio backing track in response to the dynamic distance data stream in such a way that emulates distance-dependent microphone distortion.

Example 27

A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer; and
a feedback effect emulation module dynamically adds simulated microphone feedback to audio data stream of a pre-recorded audio backing track in response to the dynamic distance data stream in such a way that emulates distance-dependent microphone feedback.

Example 28

A system of Example 27, wherein:
the feedback effect emulation module includes a feedback sound generator, a range module, and a pre-recorded feedback sample;
the range module in response to the dynamic distance data stream causes the feedback sound generator to retrieve and play the pre-recorded feedback sample when the dynamic distance data stream is within a pre-determined range.

Example 29

A system of Example 27, wherein:
the feedback effect emulation module in response to the dynamic distance data stream plays a pre-recorded feedback sample when the dynamic distance data stream is within a pre-determined range.

Example 30

A stage microphone for enhancing a lip-synchronized performance of a performer, including:
a proximity sensor secured to the stage microphone;
the proximity sensor generates a dynamic distance data stream dynamically representing a distance between the proximity sensor and the performer; and
the stage microphone produces a standard audio control protocol that includes a dynamic distance data from the dynamic distance data stream.

Example 31

The stage microphone of Example 30, further including:
the stage microphone includes a microphone body;
a user control attached to the microphone body, the user control outputs a user control data; and
the standard audio control protocol includes the user control data.

Example 32

The stage microphone of Example 31, wherein the user control includes a force sensor.

Example 33

A system for enhancing a lip-synchronized performance of a performer, comprising:
a stage microphone;
a proximity sensor secured to the stage microphone;
the proximity sensor generates a dynamic distance data stream dynamically representing a distance between the proximity sensor and the performer;
the stage microphone produces a standard audio control protocol that includes a dynamic distance data from the dynamic distance data stream;
a non-transitory computer readable medium including instructions stored therein that when executed by a processor cause the processor to dynamically modify an audio data stream of a pre-recorded audio backing track in response to the dynamic distance data stream.

Example 34

The system of Example 33, wherein:
the instructions stored in the non-transitory computer readable medium cause the processor to dynamically adjust a signal level of the audio data stream inversely with the distance in response to the dynamic distance data stream.

Example 35

The system of Example 33, wherein:
the instructions stored in the non-transitory computer readable medium cause the processor to dynamically adjust a signal level of the audio data stream in such a way that emulates distance-dependent changes in microphone level.

Example 36

The system of Example 33, wherein:
the instructions stored in the non-transitory computer readable medium cause the processor to dynamically adjust a low frequency response of the audio data stream inversely with the distance, in response to the dynamic distance data stream.

Example 37

The system of Example 33, wherein:
the instructions stored in the non-transitory computer readable medium cause the processor to dynamically adjust a frequency response of the audio data stream in response to the dynamic distance data stream in such a way that emulates a distance-dependent proximity effect.

Example 38

The system of Example 33, wherein:
the instructions stored in the non-transitory computer readable medium cause the processor to dynamically add a distortion to the audio data stream in response to the dynamic distance data stream in such a way that emulates distance-dependent microphone distortion.

Example 39

The system of Example 33, wherein:
the instructions stored in the non-transitory computer readable medium cause the processor to dynamically add a simulated microphone feedback to the audio data stream in response to the dynamic distance data stream in such a way that emulates distance-dependent microphone feedback.

Example 40

The system of Example 33, further including: the stage microphone includes a microphone body;
a user control attached to the microphone body, the user control outputs a user control data; and
the standard audio control protocol includes the user control data.

Example 41

The system of Example 40, wherein the user control data modifies the audio data stream.

Example 42

The system of Example 41, wherein the user control includes a force sensor.

Example 43

The system of Example 42, wherein the user control data modifies the audio data stream in response to a force sensed from the user control.

Example 44

The system of Examples 34 or 35, further including: the stage microphone includes a microphone body;
a user control attached to the microphone body, the user control outputs a user control data; and
the standard audio control protocol includes the user control data.

Example 45

The system of Example 44, wherein the user control data modifies the signal level of the audio data stream.

Example 46

The system of Example 44, wherein the user control includes a force sensor.

Example 47

The system of Example 46, wherein the user control data modifies the signal level of the audio data stream in response to a force sensed from the user control.

Example 48

The system of Example 37, further including: the stage microphone includes a microphone body;
a user control attached to the microphone body, the user control outputs a user control data; and
the standard audio control protocol includes the user control data.

Example 49

The system of Example 48, wherein the user control data modifies the frequency response.

Example 50

The system of Example 48, wherein the user control includes a force sensor.

Example 51

The system of Example 48, wherein the user control data modifies the frequency response in response to a force sensed from the user control.

Example 52

The system of Example 38, further including: the stage microphone includes a microphone body;
a user control attached to the microphone body, the user control outputs a user control data; and
the standard audio control protocol includes the user control data.

Example 53

The system of Example 52, wherein the user control data modifies the distortion.

Example 54

The system of Example 52, wherein the user control includes a force sensor.

Example 55

The system of Example 52, wherein the user control data modifies the distortion in response to a force sensed from the user control.

Example 56

The system of Example 38, further including: the stage microphone includes a microphone body;
a user control attached to the microphone body, the user control outputs a user control data; and
the standard audio control protocol includes the user control data.

Example 57

The system of Example 56, wherein the user control data modifies the distortion.

Example 58

The system of Example 39, further including: the stage microphone includes a microphone body;
a user control attached to the microphone body, the user control outputs a user control data; and
the standard audio control protocol includes the user control data.

Example 59

The system of Example 58, wherein the user control data modifies the simulated microphone feedback.

Example 60

The system of Example 58, wherein the user control includes a force sensor.

Example 61

The system of Example 58, wherein the user control data modifies the simulated microphone feedback in response to a force sensed from the user control.

Example 62

The system of Examples 2 or 3, further comprising: a user parameter controls; and
the user parameter controls adjust a scale factor of the signal level of the audio data stream.

Example 63

The system of Examples 2 or 3, further comprising: a user parameter controls;

the user parameter controls adjust a level-versus-distance law of the signal level of the audio data stream.

The preceding figures and specification describe a system and method for creating more realistic lip syncing to pre-recorded vocal and acoustic instrument tracks during live performances (i.e. a system for enhancing a lip synchronized performance or a method for enhancing a lip synchronized performance). It is not the intent of this disclosure to limit the claimed invention to the examples, variations, and exemplary embodiments described in the specification. Those skilled in the art will recognize that variations will occur when embodying the claimed invention in specific implementations and environments. For example, the system of FIGS. 1-38 were discussed in the context of a live sound environment. These include, for example, a live concert in a stadium, amphitheater, concert hall, cruise ship, night club, or live television performance. The inventor envisions that the described system might also be useful in a broad range of applications that can benefit from realistic lip sync performances. For example, the system can also be utilized for film, pre-recorded television, or music video recording. For example, in film, pre-recorded television, or music video production, the vocalist or musicians typically lip syncs to a pre-recorded audio backing track while they stand near a microphone prop or while the vocalist holds a microphone prop. The dynamic distance data stream 12 from the proximity sensor 7a of FIG. 7, 18, or 19, for example, can be used during sound editing or post production to create more realistic lip syncing.

In FIGS. 30-32, the data transmitted from the proximity sensor 7a was illustrated as I2C. While some proximity sensors, such as the VL53LOX time-of-flight proximity sensor by ST Microelectronics or the OPT3101 from Texas Instruments output their proximity data via an I2C serial port, other time-of-flight sensors have other output data ports that one of ordinary skill in the art would readily be able to use without undue experimentation. In FIG. 30, the output is illustrated as USB. The output could also be other wired computer protocols such as Ethernet. In FIG. 31, an 802.11 output was discussed. However, other wireless protocols could readily be used such as Zigbee or BlueTooth.

Figure 3:
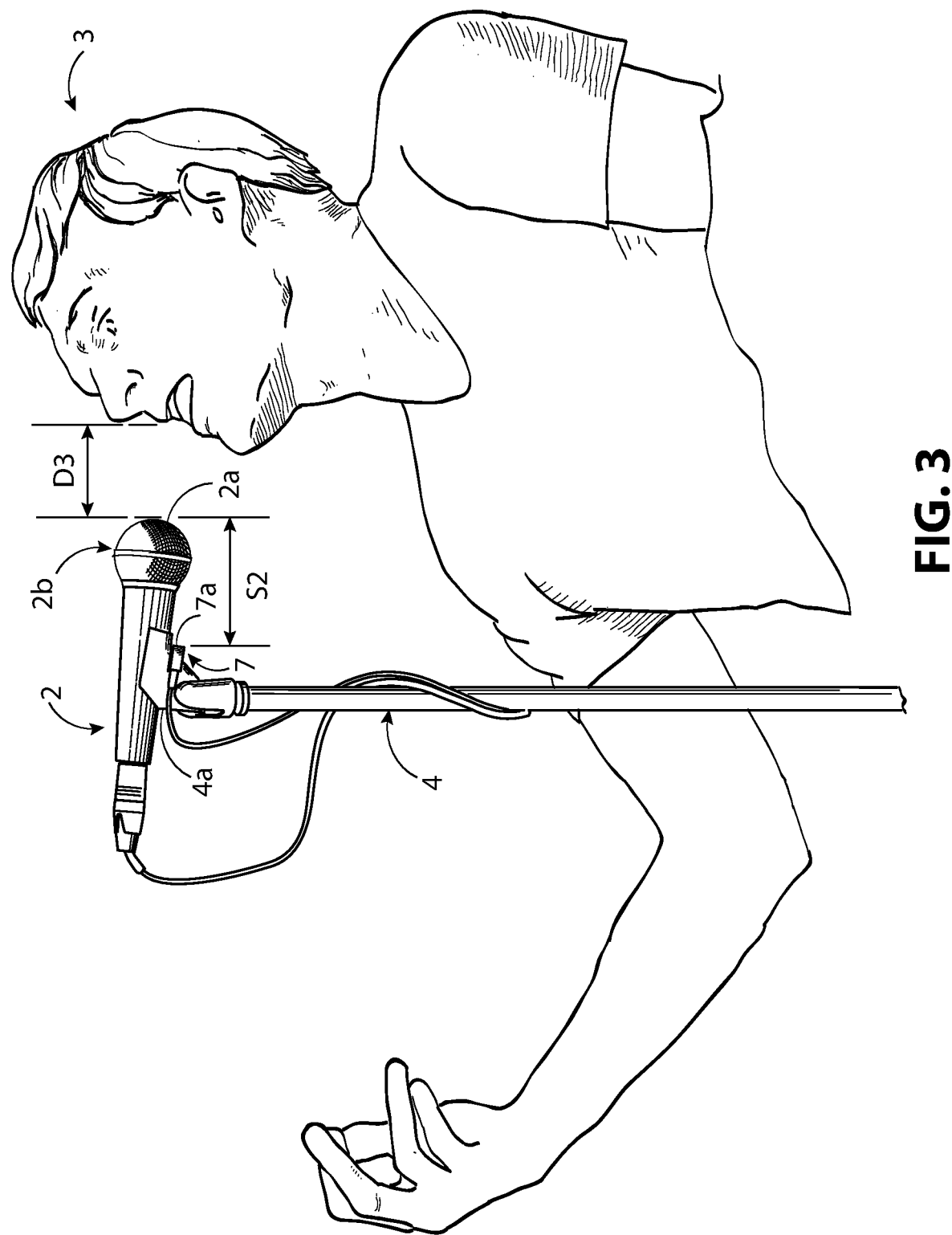
FIG. 3 illustrates a vocalist singing at a distance D3 away from the microphone, where the microphone and a proximity sensor is mounted to a microphone stand.

It is possible to implement certain features described in separate embodiments in combination within a single embodiment. Similarly, it is possible to implement certain features described in single embodiments either separately or in combination in multiple embodiments. For example, FIGS. 1 and 2 illustrate a wireless microphone and FIGS. 3 and 4 illustrate a wired microphone. The proximity sensor assembly 7 is illustrated in at least three different mounting configurations; for example, the mounting configurations of FIG. 26, 27, or 28. These mounting configurations can be used with stage microphone 2 that are both wired or wireless. In FIGS. 30 and 32, the output of the proximity sensor assembly 7 is illustrated as wired. In FIG. 31, the output of the proximity sensor assembly is illustrated as wireless. Wired or wireless configurations can be used for any of the examples of FIGS. 1-6 and can be applied to the simplified block diagrams of FIGS. 7, 18, 19, and 37. The inventor envisions that these variations fall within the scope of the claimed invention.

Any appended claims are not to be interpreted as including means-plus-function limitations, unless a claim explicitly evokes the means-plus-function clause of 35 USC § 112(f) by using the phrase "means for" followed by a verb in gerund form.

"Optional" or "optionally" is used throughout this disclosure to describe features or structures that are optional. Not using the word optional or optionally to describe a feature or structure does not imply that the feature or structure is essential, necessary, or not optional. Using the word "or," as used in this disclosure is to be interpreted as the ordinary meaning of the word "or" (i.e., an inclusive or) For example, the phrase "A or B" can mean: (1) A, (2) B, (3) A with B. For example, if one were to say, "I will wear a waterproof jacket if it snows or rains," the meaning is that the person saying the phrase intends to wear a waterproof jacket if it rains alone, if it snows alone, if it rains and snows in combination.

While the examples, exemplary embodiments, and variations are helpful to those skilled in the art in understanding the claimed invention, it should be understood that, the scope of the claimed invention is defined solely by the following claims and their equivalents.

What is claimed is:

1. A system for enhancing a lip-synchronized performance of a performer utilizing a stage microphone, comprising:
    a proximity sensor secured in a fixed relationship with the stage microphone, the proximity sensor generating a dynamic distance data stream dynamically representing a distance between the proximity sensor and the performer;
    a non-transitory computer readable medium including instructions stored therein that when executed by a processor cause the processor to dynamically modify an audio data stream of a pre-recorded audio backing track in response to the dynamic distance data stream in such a way that simulates changes in one or more audio parameters in relation to changes in distance between the stage microphone and the performer.

2. The system of claim 1, wherein:
    the instructions stored in the non-transitory computer readable medium cause the processor to dynamically adjust a signal level of the audio data stream inversely with the distance in response to the dynamic distance data stream.

3. The system of claim 1, wherein:
    the instructions stored in the non-transitory computer readable medium cause the processor to dynamically adjust a signal level of the audio data stream in such a way that simulates changes in microphone level in relation to changes in distance between the stage microphone and the performer.

4. The system of claim 1, wherein:
    the instructions stored in the non-transitory computer readable medium cause the processor to dynamically adjust a low frequency response of the audio data stream inversely with the distance, in response to the dynamic distance data stream.

5. The system of claim 1, wherein:
    the instructions stored in the non-transitory computer readable medium cause the processor to dynamically adjust a frequency response of the audio data stream in response to the dynamic distance data stream in such a way that simulates proximity effect in relation to changes in distance between the stage microphone and the performer.

6. The system of claim 1, wherein:
    the instructions stored in the non-transitory computer readable medium cause the processor to dynamically add distortion to the audio data stream in response to the dynamic distance data stream in such a way that simulates distance-dependent microphone distortion.

7. The system of claim 1, wherein:
the instructions stored in the non-transitory computer readable medium cause the processor to dynamically add simulated microphone feedback to the audio data stream in response to the dynamic distance data stream in such a way that simulates distance-dependent microphone feedback.

8. A method for enhancing a lip-synchronized performance of a performer utilizing a stage microphone, comprising:
receiving a dynamic distance data stream generated by a proximity sensor, the proximity sensor secured in a fixed relationship with the stage microphone, the dynamic distance data stream representing a distance between the proximity sensor and the performer; and
dynamically modifying an audio data stream of a pre-recorded audio backing track in response to the dynamic distance data stream in such a way that simulates changes in one or more audio parameters in relation to changes in distance between the stage microphone and the performer.

9. The method of claim 8 further comprising:
adjusting a signal level of the audio data stream inversely with the distance in response to the dynamic distance data stream.

10. The method of claim 8 further comprising:
dynamically adjusting a signal level of the audio data stream in such a way that simulates changes in microphone level in relation to changes in distance between the stage microphone and the performer.

11. The method of claim 8 further comprising:
dynamically adjust a low frequency response of the audio data stream inversely with the distance in response to the dynamic distance data stream.

12. The method of claim 8 further comprising:
dynamically adjusting a frequency response of the audio data stream in response to the dynamic distance data stream in such a way that simulates distance-dependent proximity effect.

13. The method of claim 8 further comprising:
dynamically add distortion to the audio data stream in response to the dynamic distance data stream in such a way that simulates distance-dependent microphone distortion.

14. The method of claim 8 further comprising:
dynamically adding simulated microphone feedback to the audio data stream in response to the dynamic distance data stream in such a way that simulates distance-dependent microphone feedback.

15. A system for enhancing a lip-synchronized performance of a performer utilizing a stage microphone, comprising:
a proximity sensor secured in a fixed relationship with the stage microphone, the proximity sensor generating a dynamic distance data stream dynamically representing a distance between the proximity sensor and the performer;
a processor;
a memory to store computer-executable instructions that, if executed, cause the processor to dynamically modify an audio data stream of a pre-recorded audio backing track in response to the dynamic distance data stream in such a way that simulates changes in one or more audio parameters in relation to changes in distance between the stage microphone and the performer.

16. The system of claim 15, wherein:
the processor dynamically adjusts a signal level of the audio data stream inversely with the distance in response to the dynamic distance data stream.

17. The system of claim 15, wherein:
the processor dynamically adjusts a signal level of the audio data stream in such a way that simulates changes in microphone level in relation to changes in distance between the stage microphone and the performer.

18. The system of claim 15, wherein:
the processor to dynamically adjusts a low frequency response the audio data stream inversely with the distance, in response to the dynamic distance data stream.

19. The system of claim 15, wherein:
the processor dynamically adjusts a frequency response of the audio data stream in response to the dynamic distance data stream in such a way that simulates distance-dependent proximity effect.

20. The system of claim 15, wherein:
the processor dynamically adds distortion to the audio data stream in response to the dynamic distance data stream in such a way that simulates distance-dependent microphone distortion in relation to changes in distance between the stage microphone and the performer.

21. The system of claim 15, wherein:
the processor dynamically adds simulated microphone feedback to the audio data stream in response to the dynamic distance data stream in such a way that simulates distance-dependent microphone feedback.

* * * * *